(12) United States Patent
Komoda et al.

(10) Patent No.: US 6,844,664 B2
(45) Date of Patent: Jan. 18, 2005

(54) FIELD EMISSION ELECTRON SOURCE AND PRODUCTION METHOD THEREOF

(75) Inventors: Takuya Komoda, Sanda (JP); Koichi Aizawa, Neyagawa (JP); Yoshiaki Honda, Souraku-gun (JP); Tsutomu Ichihara, Hirakata (JP); Yoshifumi Watabe, Tondabayashi (JP); Takashi Hatai, Neyagawa (JP); Toru Baba, Shijonawate (JP); Yoshiyuki Takegawa, Nara (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/258,601

(22) PCT Filed: Apr. 24, 2002

(86) PCT No.: PCT/JP02/04054

§ 371 (c)(1),
(2), (4) Date: Nov. 5, 2002

(87) PCT Pub. No.: WO02/089166

PCT Pub. Date: Nov. 7, 2002

(65) Prior Publication Data

US 2003/0102793 A1 Jun. 5, 2003

(30) Foreign Application Priority Data

| Apr. 24, 2001 | (JP) | 2001-125156 |
| Apr. 24, 2001 | (JP) | 2001-125157 |
| May 28, 2001 | (JP) | 2001-159625 |
| Oct. 26, 2001 | (JP) | 2001-329908 |

(51) Int. Cl.$^7$ .................................................. H01J 1/02

(52) U.S. Cl. .................. 313/310; 313/309; 313/336; 313/351; 313/495

(58) Field of Search ................... 313/309, 310, 313/336, 351, 495

(56) References Cited

U.S. PATENT DOCUMENTS

| 3,665,241 A | 5/1972 | Spindt et al. |
| 5,894,189 A | 4/1999 | Ogasawara et al. |
| 6,249,080 B1 | 6/2001 | Komoda et al. |

(List continued on next page.)

FOREIGN PATENT DOCUMENTS

| EP | 0989577 | 3/2000 |
| EP | 1047095 | 10/2000 |
| EP | 1094485 | 4/2001 |

(List continued on next page.)

OTHER PUBLICATIONS

English Language Abstract of JP 8–250766, published Sep. 27, 1996.

(List continued on next page.)

*Primary Examiner*—Vip Patel
(74) *Attorney, Agent, or Firm*—Greenblum & Bernstein, P.L.C.

(57) ABSTRACT

In a field emission-type electron source (10), a strong field drift layer (6) and a surface electrode (7) consisting of a gold thin film are provided on an n-type silicon substrate (1). An ohmic electrode (2) is provided on the back surface of the n-type silicon substrate (1). A direct current voltage is applied so that the surface electrode (7) becomes positive in potential relevant to the ohmic electrode (2). In this manner, electrons injected from the ohmic electrode (2) into the strong field drift layer (6) via the n-type silicon substrate (6) drift in the strong field drift layer (6), and is emitted to the outside via the surface electrode (7). The strong field drift layer (6) has: a number of semiconductor nanocrystals (63) of nano-meter order formed partly of a semiconductor layer configuring the strong field drift layer (6); and a number of insulating films (64) each of which is formed on the surface of each of the semiconductor nanocrystals (63) and each having film thickness to an extent such that an electron tunneling phenomenon occurs.

13 Claims, 26 Drawing Sheets

U.S. PATENT DOCUMENTS

| | | |
|---|---|---|
| 6,285,118 B1 | 9/2001 | Hatai et al. |
| 6,498,426 B1 | 12/2002 | Watabe et al. |
| 6,583,578 B1 | 6/2003 | Ichihara et al. |
| 6,590,321 B1 | 7/2003 | Komoda et al. |

FOREIGN PATENT DOCUMENTS

| | | |
|---|---|---|
| JP | 8-250766 | 9/1996 |
| JP | 9-259795 | 10/1997 |
| JP | 10256225 | 9/1998 |
| JP | 11329213 | 11/1999 |
| JP | 2000-100316 | 4/2000 |
| JP | 2000-306494 | 11/2000 |
| JP | 2001-6530 | 1/2001 |
| JP | 2001-189123 | 7/2001 |
| JP | 2001-189124 | 7/2001 |
| JP | 2001-210224 | 8/2001 |
| JP | 2001-283717 | 10/2001 |

OTHER PUBLICATIONS

English Language Abstract of JP 11–329213, published Nov. 30, 1999.

English Language Abstract of JP 2000–100316, published Apr. 7, 2000.

English Language Abstract of JP 9–259795, published Oct. 3, 1997.

English Language Abstract of JP 2000–306494, published Nov. 2, 2000.

English Language Abstract of JP 10–256225, published Sep. 25, 1998.

English Language Abstract of JP 2001–210224, published Aug. 3, 2001.

English Language Abstract of JP 2001–283717, published Oct. 12, 2001.

English Language Abstract of JP 2001–6530, published Jan. 12, 2001.

English Language Abstract of JP 2001–189123, published Jul. 10, 2001.

English Language Abstract of JP 2001–189124, published Jul. 10, 2001.

Fig. 20
| | | |
— Si — Si — Si —
Fig. 23
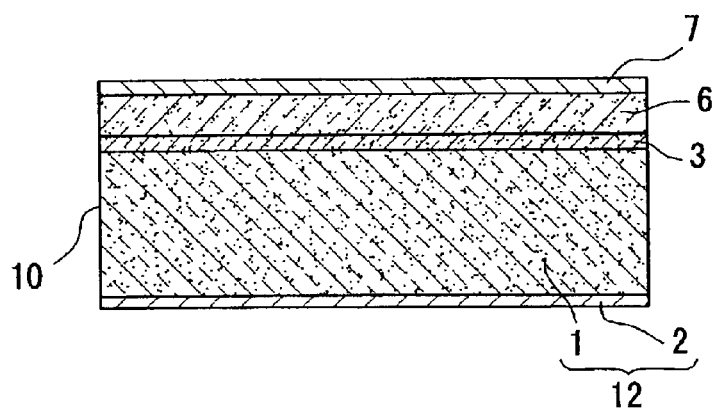
Fig. 24
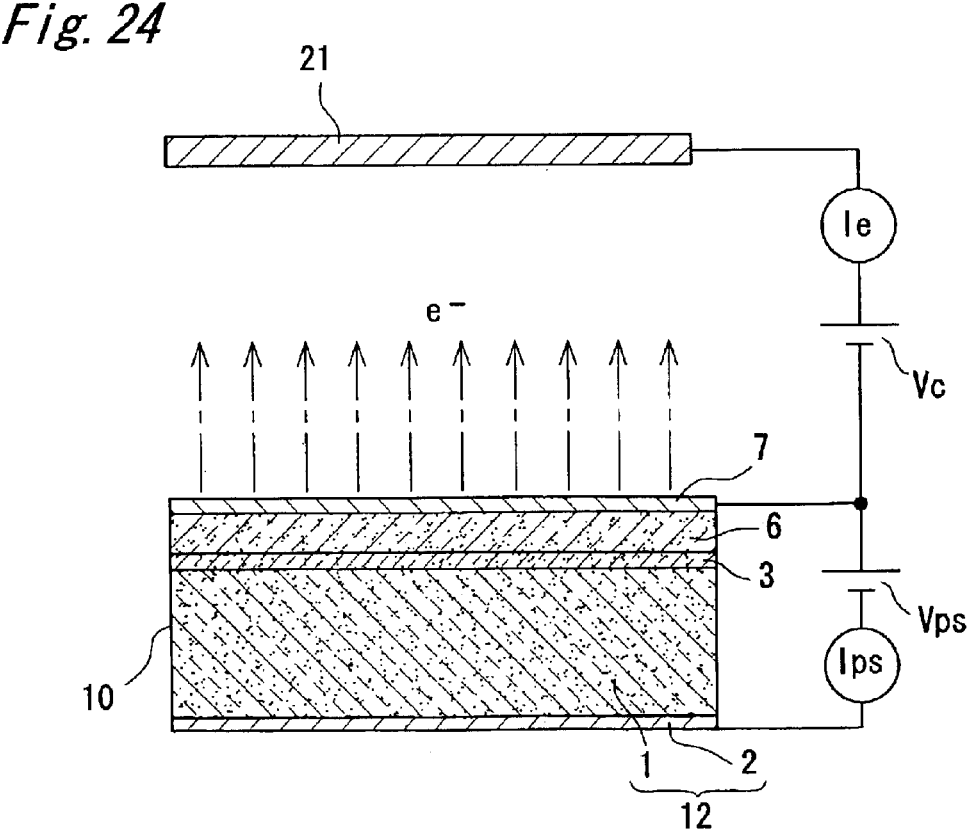

FIELD EMISSION ELECTRON SOURCE AND PRODUCTION METHOD THEREOF

TECHNICAL FIELD

The present invention relates to a field emission-type electron source which emits electron beams by means of electric field emission using semiconductor materials, and further to a manufacturing method thereof. More particularly, the present invention relates to a method and apparatus for forming insulating thin films on surfaces of semiconductor crystals when the field emission-type electron source is manufactured.

BACKGROUND OF THE INVENTION

Conventionally, as a field emission-type electron source (hereinafter, simply referred to as "electron source"), for example, there is known a Spindt type electrode disclosed in U.S. Pat. No. 3,665,241 or the like. The Spindt type electrode includes a substrate having a number of fine triangular pyramid shaped emitter chips disposed thereon; and a gate layer which is insulated relevant to the emitter chips and has emission holes for exposing the tip ends of the emitter chips. The Spindt type electrode emits electron beams through the emission holes from the tip ends of the emitter chips by applying a high voltage so that the emitter chips are negative in polarity relevant to the gate layer.

However, the Spindt type electrode is complex in manufacturing process, and it is difficult to precisely fabricate a number of triangular pyramid shaped emitter chips. Thus, for example, in the case where this is applied to a planar light emitter or display, there is such a problem that it is difficult to make its surface area larger. In addition, in the Spindt type electrode, the electric field concentrates on the tip ends of the emitter chips. Thus, in the case where the degree of vacuum around the tip ends of the emitter chips is low so that the residual gas exists, the residual gas is ionized to positive ions by means of the emitted electrons. The positive ions collide to the tip ends of the emitter chips so that the tip ends of the emitter chips are subjected to damage (for example, damage due to ion shock). Thus, there occurs such a disadvantage that the current density or emission efficiency of the emitted electrons becomes unstable, and the service lives of the emitter chips are reduced. Therefore, in order to prevent the above-mentioned disadvantage, it is required to use the Spindt type electrode in a high vacuum (about $10^{-5}$ Pa to about $10^{-6}$ Pa) condition. As the result, there is a problem that higher cost or complicated handling may result.

In order to improve the above-mentioned disadvantage, there is proposed an electron source of an MIM (Metal Insulator Metal) type or MOS (Metal Oxide Semiconductor) type. The former is a planar type electron source having a deposited structure of metal—insulating film—metal, while the latter is a planar type electron source having a deposited structure of metal—oxide film—semiconductor. In an electron source of such type, in order to improve the electron emission efficiency (that is, in order to emit much electrons), it is required to reduce the thickness of an insulating film or oxide film. However, if the thickness of the insulating film or oxide film is too small, there is a danger that insulation destruction occurs when a voltage is applied between the upper and lower electrodes of the deposited structures. Such insulation destruction must be prevented, and thus, there is a limitation in reduction of the thickness of the insulating film or oxide film. Thus, there is a problem that electron emission efficiency (lead-out efficiency) cannot be increased so much.

In recent years, there is proposed an electron source (semiconductor cool electron emission element) with its high electron emission efficiency so as to apply a voltage between a semiconductor substrate and a surface electrode, thereby emitting electrons. In the electron source, one surface of a single-crystalline semiconductor substrate such as silicon substrate is anodically oxidized, thereby forming a porous semiconductor layer (porous silicon layer). Then, on the porous semiconductor layer, a surface electrode consisting of a metal thin film (electrically conductive thin film) is formed.

However, in the electron source disclosed in Japanese Laid-open Patent Publication No. 8-250766, a popping phenomenon is likely to occur during electron emission, and non-uniformity is likely to occur in electron emission quantity. Thus, if this is applied to a planar light emitter or display device, there is a problem that non-uniform light emission is produced.

In order to solve the above-mentioned problems, for example in Japanese Patent Applications No.10-272340 and No. 10-272342 etc., the present inventors proposed an electron source in which a strong field drift layer (hereinafter simply referred to as "drift layer") where electrons injected from the electrically conductive substrate drift is interposed between the electrically conductive substrate and the metal thin film (surface electrode).

For example, as shown in FIG. 38, in an electron source 10' of such type, a drift layer 6 consisting of an oxidized porous polycrystalline silicon layer (porous polycrystalline silicon layer) on a main surface side of an n-type silicon substrate 1 that is an electrically conductive substrate. A surface electrode 7 consisting of a metal thin film (for example, metal film) is formed on the drift layer 6. In addition, an ohmic electrode 2 is formed on the back face of an n-type silicon substrate 1. A lower electrode 12 (electrically conductive substrate) is composed of the n-type silicon substrate 1 and ohmic electrode 2. In an example shown in FIG. 38, although a non-doped polycrystalline silicon layer 3 is interposed between the lower electrode 12 and the drift layer 6, there is proposed an electron source having the drift layer 6 formed on the lower electrode 12.

Then, a collector electrode 21 consisting of a transparent electrically conductive film (for example, ITO film) is disposed in opposite to the surface electrode 7. In order to emit an electron from the electron source 10', while a vacuum is provided between the surface electrode 7 and the collector electrode 21, a direct current voltage Vps is applied between the surface electrode 7 and the lower electrode 12 so that the surface electrode 7 becomes high in potential relevant to the lower electrode 12. In addition, a direct current voltage Vc is applied between the collector electrode 21 and the surface electrode 7 so that the collector electrode 21 becomes high in potential relevant to the surface electrode 7. When direct current voltages Vps and Vc are properly set, electrons injected from the lower electrode 12 drift in the drift layer 6, and are emitted via the surface electrode 7 (the single dotted chain line in FIG. 38 indicates the flow of electrons "e-" emitted through the surface electrode 7). The thickness of the surface electrode 7 is set to about 3 nm to 15 nm.

In the drift layer 6, after a non-doped polycrystalline silicon layer has been formed on the lower electrode 12, the polycrystalline silicon layer is made porous in accordance with anodic oxidization processing, thereby forming a porous polycrystalline silicon layer. Thus porous polycrystalline silicon layer is formed in accordance with a rapid thermal oxidizing technique for carrying out rapid thermal oxidization at 900° C., for example.

As shown in FIG. 39, the drift layer 6 includes: at least columnar polycrystalline silicon grains 51; thin insulating films 52; a number of silicon nanocrystals 63 of nano-meter order; and a number of insulating films 64. The grains 51 are arranged on the main surface side of the n-type silicon substrate 1 (namely, the surface electrode 7 side in the lower electrode 12). The insulating films 52 are formed on the surfaces of the grains 51. The silicon nanocrystals 63 are interposed among the grains 51. The insulating films 64 are formed on the surfaces of the silicon nanocrystals 63, each of which has a film thickness smaller than the crystalline particle size of the silicon nanocrystal 63. In short, in the drift layer 6, the surface of each grain 51 in the polycrystalline silicon layer is made porous, and a crystalline state is maintained at the center portion of each grain 51. Each grain 51 extends in the thickness direction of the lower electrode 12. Insulating films 52 and 64 are composed of silicon oxide films.

In the electron source 10', it is believed that electron emission occurs in the following model. That is, during electron emission, a direct current voltage Vps having the surface electrode 7 provided as a high potential is applied between the surface electrode 7 and the lower electrode 12, and a direct current voltage Vc having the collector electrode 21 provided as a high potential is applied between the collector electrode 21 and the surface electrode 7. When the direct current voltage Vps reaches a predetermined value (critical value), the electrons "e-" are injected from the lower electrode into the drift layer 6 due to thermal excitation. On the other hand, a majority of the electron field applied to the drift layer 6 is applied to the insulating films 64. Thus, the injected electrodes "e-" are accelerated by the strong electric field applied to the insulating films 64. Then, the electrons "e-" drift in the drift layer 6 in an orientation indicated by the arrow A in FIG. 39 from a region between the grains 51 toward the surface, tunnel the surface electrode 7, and are emitted into the vacuum.

In this manner, in the drift layer 6, the electrons injected from the lower electrode 12 are accelerated and drift in the electric field applied to the insulating films 64 without being hardly diffused at the silicon nanocrystals 63. Then, the electrons are emitted via the surface electrode 7 (ballistic type electron emission phenomenon). At this time, a heat generated in the drift layer 6 is radiated via the grains 51. Thus, popping phenomenon does not occur during electron emission, and the electrons can be constantly emitted. The electrons arrived at the surface of the drift layer 6 are believed to be hot electrons. The electrons easily tunnel the surface electrode 7, and are emitted into the vacuum.

In the meantime, in the electron source 10', the lower electrode 12 is composed of the n-type silicon substrate 1 and ohmic electrode 2. However, as shown in FIG. 40, for example, there is proposed an electron source 10" in which the lower electrode 12 consisting of a metal material is formed on one surface of an insulating substrate 11 consisting of a glass substrate. In FIG. 40, constituent elements common to the electron source 10' shown in FIG. 38 are designated by like reference numbers. A description thereof is omitted here. In the electron source 10" shown in FIG. 40 as well, electrons can be emitted in a process similar to a case of the electron source 10' shown in FIG. 38.

In the electron sources 10' and 10", in general, a current flowing between the surface electrode 7 and the lower electrode 12 is referred to as a diode current Ips, and a current flowing between the collector electrode 21 and the surface electrode 7 is referred to as an emission current (emission electron current) Ie. As a rate (Ie/Ips) of the emission current Ie to the diode current Ips increases, electron emission efficiency ((Ie/Ips)×100[%]) increases. In the electron sources 10' and 10", even if the direct current voltage Vps applied between the surface electrode 7 and the lower electrode 12 is defined as a low voltage of about 10 V to 20 V, electrons can be emitted. In addition, as the direct current voltage Vps increases, the emission current Ie increases.

In the meantime, in a process for manufacturing the electron sources 10' and 10", the step of forming the drift layer 6 consists of the film forming step, anodic oxidization processing step, and oxidizing step. In the film forming step, a non-doped polycrystalline silicon layer is formed as a semiconductor layer on one surface of the lower electrode 12. In the anodic oxidization processing step, a polycrystalline silicon layer is made porous in accordance with anodic oxidization processing step, thereby forming a porous polycrystalline silicon layer that contains the polycrystalline silicon grains 51 and silicon nanocrystals 63. In the anodic oxidization processing step, there is employed a mixture solution obtained by mixing a hydrogen fluoride water solution and ethanol at substantially 1:1 as an electrolytic solution employed for anodic oxidization. In the oxidizing step, the porous polycrystalline silicon layer is rapidly thermally oxidized in accordance with the rapid thermal oxidization technique that is a high temperature process, and thin insulating films (silicon oxide films) 52 and 64 are formed respectively on the surfaces of the grains 51 and silicon nanocrystals 63.

In addition, as shown in FIG. 41, in the oxidizing step, a substrate temperature is risen from room temperature to a heat treatment temperature (for example, 900° C.) in dry oxygen by employing a lamp annealing device, for example. Then, the substrate temperature is held at this heat treatment temperature by a predetermined heat treatment time (for example, 1 hour), thereby oxidizing the porous polycrystalline silicon layer. Then, the substrate temperature is lowered to room temperature.

There is proposed an electron source formed of a nitride porous polycrystalline silicon layer instead of an oxidized porous polycrystalline silicon layer. Further, there is proposed an electron source formed of the oxidized or nitrided porous single-crystalline silicon layer as well.

In a conventional electron source comprising such a drift layer, it is possible to increase an area and to ensure cost reduction. In the case where an electron source of such type is applied as an electron source of a display, the surface electrode or lower electrode (electrically conductive substrate) may be properly patterned. However, in such a conventional electron source, the following problems occur.

(Problem 1)

In the conventional electron source of such type, there is a problem that there increases a deviation in characteristics such as electron emission efficiency, dielectric strength, service life between manufactured lots. As a result of detailed study of such cause, it has been found that this deviation is caused by a deviation in thickness of the silicon oxide film that is an insulating film.

(Problem 2)

As has been described previously, a rapid thermal oxidization technique is employed in the oxidizing step. However, in order to form the silicon oxide films 52 and 64 with their good film quality on the surface of all the grains 51 and silicon nanocrystals 63, there can be employed the oxidizing step for oxidizing a porous polycrystalline silicon layer in an electrolytic solution consisting of water solution such as sulfuric acid or nitric acid in accordance with an electrochemical oxidation technique.

By employing the electrochemical oxidization technique, a process temperature can be reduced as compared with the case of employing the rapid thermal oxidization technique. Thus, a resistance on a substrate material is reduced. In the case of employing a glass substrate, a non-alkali glass substrate or low alkali glass substrate and the like with its low heat resistance temperature and modest price can be employed as compared with a quartz glass substrate. Therefore, there is an advantage that a larger area for the electron sources 10' and 10" and cost reduction can be achieved more efficiently.

However, in the conventional electron source manufactured by oxidizing the porous polycrystalline silicon layer in accordance with an electrochemical oxidization technique, there is a problem that the dielectric strength is low as compared with the electron source oxidized and manufactured in accordance with the rapid thermal oxidization technique. This is because an $SiO_2$ film formed in accordance with the electrochemical oxidization technique is much in water content or strain as compared with that formed in accordance with the rapid thermal oxidization technique. In the electron sources 10' and 10" manufactured by oxidizing the porous polycrystalline silicon layer in accordance with the rapid thermal oxidization technique as well, it is desired that the electron emission efficiency, dielectric strength, and service life be improved more remarkably. However, as the result of a variety of analytical evaluations (such as photo luminescence measurement, sectional TEM observation, or XPS composition analysis, for example) regarding the drift layer 6, the following findings were obtained. That is, the film thickness of the silicon oxide film 64 increases as the film is closer to the surface of the drift layer 6, the silicon nanocrystal 63 is destroyed, and the silicon nanocrystal 63 does not exist in the vicinity of the surface of the drift layer 6. Thus, in the conventional electron sources 10' and 10", there is a danger that a part of the electrons injected into the drift layer 6 are diffused or captured by the silicon oxide film 64 which is larger than the film thickness (degree of mean free path of electrons) to an extent such that an electron tunneling phenomenon occurs. In this case, there is a danger that the electron emission efficiency is lowered, and the dielectric strength and service life is reduced.

(Problem 3)

In anodic oxidization processing, a mixture solution between hydrogen fluoride water solution and ethanol is utilized as an electrolytic solution. Thus, as shown in FIG. 42, the porous polycrystalline silicon layer formed in accordance with anodic oxidization processing is terminated by a hydrogen atom on its top surface. Further, it is believed that water is adsorbed on the surface of the porous polycrystalline silicon layer.

If the porous polycrystalline silicon layer formed in accordance with anodic oxidization processing is oxidized on a temperature profile as shown in FIG. 41, a hydrogen atom remains or Si—OH coupling occurs, as shown in FIG. 43. Thus, there is a problem that an oxide film with its fine structure consisting of $SiO_2$ is hardly produced, and the dielectric strength is lowered. Further, there is a problem that a fluorine atom as well remains in the drift layer 6 other than the hydrogen atom. In addition, the content of hydrogen in the drift 6 is comparatively large in quantity. Thus, there is a danger that the distribution of hydrogen in the drift layer 6 changes with an elapse of time (for example, a hydrogen atom desorbs from the surface of the drift layer 6), and the stability of electron emission efficiency with an elapse of time is impaired.

(Problem 4)

When a comparatively inexpensive glass substrate (such as no-alkali glass substrate, a low alkali glass substrate, or soda lime glass substrate, for example) is employed as an insulating substrate 11 in the electron source 10", as compared with a quartz glass substrate, although a heat resistance temperature of the insulating substrate 11 is lowered, cost reduction can be achieved. Because of this, it is believed that the temperature of forming the porous silicon layer is lowered (for example, set to 600° C. or less).

However, in the case of forming the polycrystalline silicon layer at a comparatively low temperature, the crystalline properties of the polycrystalline silicon layer is impaired as compared with the polycrystalline silicon layer formed at a comparatively high temperature, and a large number of defects occurs. As a result, there is a problem that a number of defects contained in the drift layer 6 increases, the electron emission characteristics are impaired, and the reliability is lowered. For example, if a defect exists in the silicon oxide films 52 and 64 each in the drift layer 6, the dielectric strength of the silicon oxide films 52 and 64 each is lowered, and the dielectric strength of the electron source is lowered. Alternatively, the electron emission efficiency is lowered because of electron diffusion.

(Problem 5)

In the conventional electron sources 10' and 10", in the case where these sources are continuously driven for a long time, there is problem that the diode current Ips decreases with an elapse of time, and concurrently, the emission current Ic decreases as well. As a cause thereof, it is believed that an electron is captured by a trap in an insulating film 64, an electric field in the insulating film 64 is alleviated, and the tunneling probability of electrons is lowered.

Further, in the above-described manufacturing method, there is employed a process requiring a comparatively high heat treatment temperature (for example, 900° C.) and a comparatively long heat treatment time (for example, 1 hour) in the oxidizing step. Thus, there is a problem that the process time is extended. Further, there is a problem that a non-alkali glass substrate or low alkali glass substrate with its low heat resistance temperature, which is comparatively inexpensive as compared with a quartz glass substrate, can not be employed as an insulating substrate 11.

(Problem 6)

In the conventional electron sources 10' and 10", although an electron can be emitted constantly with high efficiency, it is desired to more remarkably improve the electron emission characteristics such as electron emission efficiency or the reliability such as dielectric strength. However, in the electron sources 10' and 10", it is believed that there exists a defect caused by a manufacturing process in the drift layer 6. For example, in the case where a defect exists in the silicon nanocrystal 63 or silicon oxide films 52 and 64 and the like, there is a problem that the lowering of electron emission efficiency due to electron diffusion or the lowering dielectric strength and the like is caused.

DISCLOSURE OF THE INVENTION

The present invention has been achieved to solve the above-mentioned problems. It is an object of the present invention to provide an electron source and a manufacturing method thereof with high efficiency and high reliability that can be employed for a flat panel display element, a planar light source, or a solid vacuum device and the like, and that can emit electron beams in accordance with preferable electric field emission.

It is another object of the present invention to provide an electron source and a manufacturing method thereof making it easy to design the dielectric strength and the service life.

It is a still another object of the present invention to provide a method and apparatus for forming insulation thin films capable of forming insulation thin films with high dielectric strength as compared with the prior art, or alternatively, to provide an electron source capable of extending the service life as compared with the prior art.

It is a still another object of the present invention to provide a method of manufacturing the electron source capable of achieving cost reduction and capable of improving the electron emission characteristics and reliability such as electron emission efficiency.

The electron source (field emission-type electron source) according to the present invention includes: an electrically conductive substrate; a drift layer (strong field drift layer) formed on the electrically conductive substrate; and a surface electrode formed on the drift layer. The drift layer has a number of semiconductor nanocrystals of nano-meter order formed partly of a semiconductor layer configuring the drift layer, and has a number of insulating films each of which is formed on the surface of each of the semiconductor nanocrystals, the films having film thickness smaller than the crystalline particle size of the semiconductor nanocrystals. The insulating film formed on the surface of each of the semiconductor nanocrystal has film thickness (degree of mean free path of electrons) in which an electron tunneling phenomenon occurs when an electron field is applied. In this manner, a voltage is applied between the surface electrode and the electrically conductive substrate so that the surface electrode becomes high in potential, whereby the electrons injected from the electrically conductive substrate into the drift layer drift in the drift layer, and are emitted via the surface electrode.

In this electron source, it is possible to reduce diffusion of the electrons in each insulating film, and to reduce the difference of thickness of the insulating films in the drift layer. Thus, it is easy to design dielectric strength and lifetime in electron source.

In this electron source, it is preferable that the water contained in the insulating film formed on the surface of each of the semiconductor nanocrystals is substantially 0 (substantially free of water). In this case, a defect or strain and the like that adversely affects electrical characteristics of the electron source is alleviated, and thus, insulating films with high dielectric strength and extended service life can be formed.

In this electron source, it is preferable that a compound layer or alloy layer consisting of a semiconductor and metal is interposed on a critical surface between the semiconductor layer configuring the drift layer and the electrically conductive substrate. In addition, it is preferable that the semiconductor layer is substantially crystallized on the critical surface between the semiconductor layer configuring the drift layer and the electrically conductive substrate. In those cases, a barrier layer or high resistance layer between the semiconductor layer and electrically conductive substrate can be reduced, and thus, the electron emission efficiency and reliability are improved.

A method of manufacturing an electron source according to the present invention is a process for manufacturing the above electron source according to the present invention.

This electron source manufacturing method to form the insulating films on the surfaces of the semiconductor nanocrystals is carried out by any one of the electrochemical method, rapid thermal oxidization technique, rapid thermal nitriding technique, and rapid thermal oxidizing and nitriding technique or a combination thereof. By employing this manufacturing method, the film thickness of the insulating films can be obtained as thickness (degree of mean free path of electrons) if the electron tunneling phenomenon occurs.

In the method of manufacturing the electron source, after the insulating films have been formed on the surfaces of the semiconductor nanocrystals, it is preferable that annealing processing at a temperature of 700° C. or less be carried out in a vacuum, inert gas, foaming gas, or nitrogen gas. In this case, the water contained in the insulating film formed on the surface of each of the semiconductor nanocrystals can be set to substantially 0. Further, a barrier layer or high resistance layer between the semiconductor layer and the electrically conductive substrate can be reduced, and thus, the electron emission efficiency and reliability are improved.

In the method of manufacturing this electron source, after the insulating films have been formed on the surfaces of the semiconductor nanocrystals, it is preferable that a heat treatment be carried out in accordance with a rapid heating technique at a temperature of 600° C. in atmosphere containing oxide species or nitride species. In this case, a defect or strain and the like, which adversely affect electrical characteristics of the electron source can be alleviated, and insulating films with high dielectric strength and extended service life can be formed. Further, a barrier layer or high resistance layer between the semiconductor layer and the electrically conductive substrate can be reduced, and thus, the electron emission efficiency and reliability are improved.

In this electron source manufacturing method, after the semiconductor nanocrystals have been formed, it is preferable that annealing processing be carried out in a vacuum or inert gas. In this case, a defect caused by impurities such as hydrogen or fluorine contained in a drift layer can be reduced as compared with a case of oxidizing a porous semiconductor layer while water or the like is adsorbed on the porous semiconductor layer immediately after anodic oxidization processing. In this manner, a fine oxide film can be formed, and there can be obtained an electron source with its small change of electron emission efficiency with an elapse of time, high dielectric strength, and high reliability. Further, a barrier layer or high resistance layer between the semiconductor layer and the electrically conductive substrate can be reduced, and thus, the electron emission efficiency and reliability are improved.

In this electron source manufacturing method, after the semiconductor layer has been formed on the electrically conductive substrate, it is preferable that annealing processing be carried out in a vacuum or inert gas. In this case, a compound layer or alloy layer consisting of a semiconductor and a metal can be interposed on a critical surface between the semiconductor layer and the electrically conductive substrate. Alternatively, the semiconductor layer can be almost crystallized on a critical surface between the semiconductor layer and the electrically conductive substrate. In this manner, a barrier layer or high resistance layer between the semiconductor layer and the electrically conductive substrate can be reduced, and thus, the electron emission efficiency and reliability can be improved.

In this electron source manufacturing method, after the insulating films have been formed on the surfaces of the semiconductor nanocrystals, there may be carried out one or plural times at least two steps of (a) the above step of carrying out the annealing processing at the temperature of 700° C. or less in a vacuum, inert gas, foaming gas, or nitride gas; (b) the above step of carrying out the heat treatment in accordance with the rapid heating technique at the temperature of 600° C. or more in atmosphere containing oxide species or nitride species; and (c) the above step of carrying out the annealing processing in accordance with the rapid heating technique at the temperature of 600° C. or more in the inert gas atmosphere, respectively (for example, (a)→(b), (a)→(c), (a)→(b)→(b), (a)→(b)→(c), (a)→(c)→(b) or the like).

In this electron source manufacturing method, it is preferable to carry out the annealing processing in hydrogen, hydrogen radical emission processing or hydrogen radical emission annealing processing at least at one period after forming the semiconductor layers, after forming the semiconductor nanocrystals, and after forming the insulating films on the surfaces of the semiconductor nanocrystals. In this case, hydrogen radicals are emitted to the top surface on one surface side of the electrically conductive substrate, and thus, a defect existing in the drift layer can be made passive or reduced, and the electron emission characteristics and reliability of the electron source can be improved. Further, the barrier or high resistance layer between the semiconductor layer and the electrically conductive substrate can be reduced, and thus, the electron emission efficiency and reliability are improved.

BRIEF DESCRIPTION OF THE DRAWINGS

The present invention will be fully understood by the following detailed description and accompanying drawings. In the accompanying drawings, common constituent elements are designated by like reference numerals.

FIG. 20 is a view showing a termination aspect of a top surface of a porous polycrystalline silicon layer after the annealing processing.

FIG. 23 is a schematic cross section showing an electron source according to Embodiment 6 of the present invention.

FIG. 24 is a view showing an operation of the electron source shown in FIG. 23.

DESCRIPTIONS OF THE PREFERRED EMBODIMENTS

Figure 1:
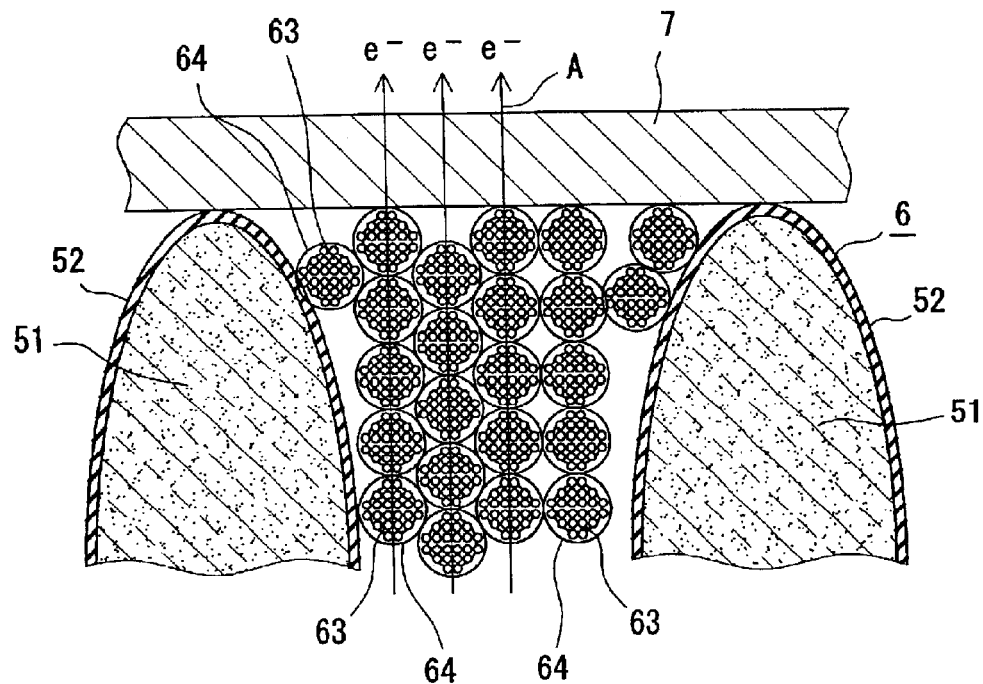
FIG. 1 is a schematic cross section showing essential portions of an electron source according to Embodiment 1 of the present invention.

The present application is based on Japanese Patent Application No. 2001-125156, Japanese Patent Application No. 2001-125157, Japanese Patent Application No. 2001-159625, and Japanese Patent Application No. 2001-329908, the contents of which are fully incorporated therein.

Hereinafter some embodiments of the present invention will be specifically described. Elements common to the embodiments, that is, elements whose configuration and function are substantially identical to each other, are designated by common reference numerals. A duplicate description thereof is principally omitted here.

(Embodiment 1)

Hereinafter, Embodiment 1 of the present invention will be described. In Embodiment 1, as an electrically conductive substrate (lower electrode), there is employed a single-crystalline n-type silicon substrate whose resistivity is comparatively close to a resistivity of a conductor (for example, a (100) substrate whose resistivity is 0.01 Ωcm to 0.02 Ωcm).

Figure 2:
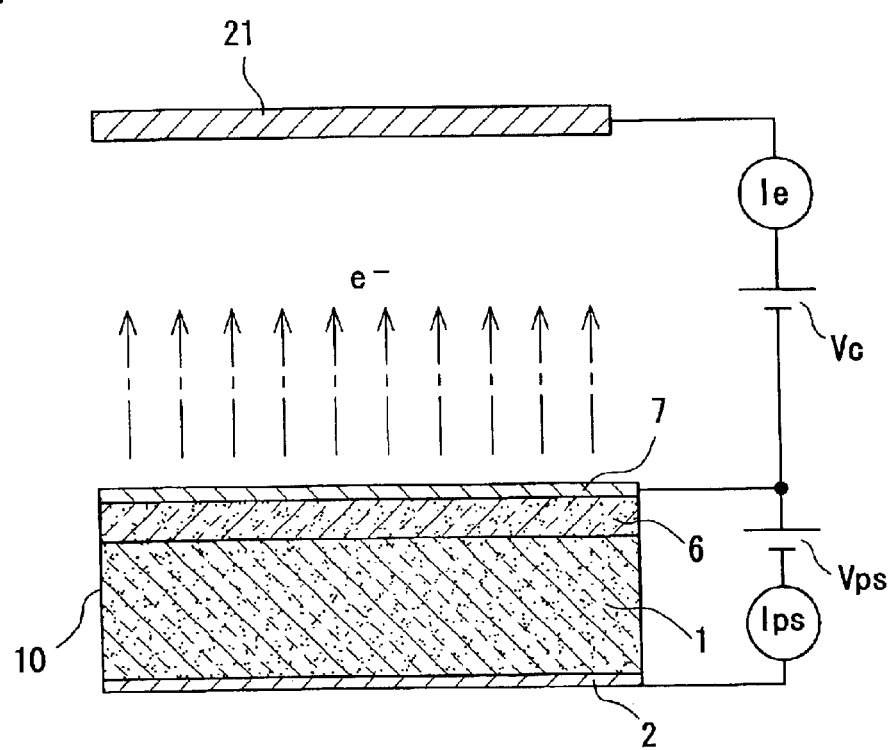
FIG. 2 is a view showing an operation of the electron source shown in FIG. 1.

As shown in FIG. 2, in an electron source 10 (field emission-type electron source) according to Embodiment 1, a drift layer 6 (strong field drift layer) consisting of an oxidized porous polycrystalline silicon layer is formed on a main surface side of an n-type silicon substrate 1 that is an electrically conductive substrate. A surface electrode 7 is formed on the drift layer 6. An ohmic electrode 2 is formed on the back surface of the n-type silicon substrate 1. In Embodiment 1, the n-type silicon substrate 1 configures an electrically conductive substrate.

A material with its small work function is employed for a material for the surface electrode 7. The thickness of the surface electrode 7 is set to 10 nm. However, the thickness thereof is not limited to this value, and may be thickness such that an electron passing through the drift layer 6 can be tunneled. The thickness of the surface electrode 7 may be set to about 3 nm to 15 nm.

The surface electrode 7 is composed of a first thin film layer consisting of a metal film formed on the drift layer 6 and a second thin film layer consisting of a metal film deposited on the first thin film layer. As a material for the first thin film later on the drift layer 6, for example, there may be employed a material having intimacy with the drift layer 6, the material being capable of preventing diffusion between the second thin film layer and the drift layer 6 such as chrome, nickel, platinum, titanium, iridium. As a material for the second thin film layer, there may be employed gold with its low resistance and high stability with an elapse of time. In Embodiment 1, chrome (Cr) is employed as a material for the first thin film layer. The film thickness of the first thin film layer is set to 2 nm. As a material for the second thin film layer, gold (Au) is employed. The film thickness of the second thin film layer is set to 8 nm. In Embodiment 1, although the surface electrode 7 is composed of a two-layered metal film, this electrode may be composed of one or three or more layered metal film instead of this film.

In the electron source 10, the surface electrode 7 is disposed in a vacuum, and a collector electrode 21 is disposed in opposite to the surface electrode 7. Then, a direct current voltage Vps is applied so that the surface electrode 7 becomes positive in polarity relevant to the n-type silicon substrate 1 (ohmic electrode 2), and a direct current voltage Vvc is applied so that the collector electrode 21 becomes positive in polarity relevant to the surface electrode 7. In this manner, electrons injected from the n-type silicon substrate 1 drift in the drift layer 6, and are emitted via the surface electrode 7 (the single dotted chain line in FIG. 2 indicates the flow of electrons "e-" emitted through the surface electrode 7). As a ratio of the emission current (emission electron current) Ie flowing between the collector electrode 21 and the surface electrode 7 to the diode current Ips flowing between the surface electrode 7 and the n-type silicon substrate 1 (ohmic electrode 2) is greater, the electron emission efficiency increases.

As shown in FIG. 1, the drift layer 6 according to Embodiment 1 is composed of: at least, columnar polycrystalline silicon grains 51; thin silicon oxide films 52 formed on the surfaces of the grains 51; a number of silicon nanocrystals 63 of nano-meter order interposed between the grains 51; and a number of silicon oxide films 64 formed on the surfaces of the silicon nanocrystals 63, each of which is an insulating film with film thickness that is smaller than the crystalline particle size of the silicon nanocrystal 63. In short, the surface of each grain 51 is made porous in the drift layer 6, and the crystalline state is maintained at the center portion of each grain. It is desirable that the thickness of the silicon oxide film 64 formed on the surface of the silicon nanocrystal 63 is set at the film thickness to an extent such that an electron tunneling phenomenon occurs (degree of mean free path of electrons: the degree of mean free path of electrons in $SiO_2$ is about 3 nm), for example, about 1 nm to 3 nm.

In the electron source 10 according to Embodiment 1, it is believed that electron emission occurs in the following model. That is, the surface electrode 7 is disposed in a vacuum. Then, between the surface electrode 7 and the n-type silicon substrate 1 (ohmic electrode 2), with the surface electrode 7 being positive in polarity, the direct current voltage Vc is applied. In addition, at the same time, between the collector electrode 21 and the surface electrode 7, with the collector electrode 21 being positive in polarity, the direct current voltage Vps is applied. When the direct current voltage Vps reaches a predetermined value (critical value), electrons "e-" are injected due to thermal excitation from the n-type silicon substrate 1 serving as an electrically conductive substrate to the drift layer 6. On the other hand, a majority of the electron field applied to the drift layer 6 is applied to the silicon oxide films 64. Thus, the injected electrons "e-" are accelerated by the strong electric field applied to the silicon oxide film 64. Then, the electrons drift in a region between the grains 51 in the drift layer 6 toward the surface in an orientation indicated by the arrow A in FIG. 1, tunnel the surface electrode 7, and are emitted into the vacuum. In this manner, in the drift layer 6, the electrons injected from the n-type silicon substrate 1 are accelerated and drift in the strong electric field applied to the silicon oxide film 64 without being diffusing in the silicon nanocrystal 63, and are emitted via the surface electrode 7 (ballistic type electron emission phenomenon). A heat generated in the drift layer 6 is emitted via the grains 51. Thus, a popping phenomenon does not occur during electron emission, and electrons can be constantly emitted. The electrons arrived at the surface of the drift layer 6 are believed as hot electrons, easily tunnel the surface electrode 7, and are emitted in the vacuum.

Hereinafter, a method of manufacturing the electron source 10 according to Embodiment 1 will be described with reference to FIG. 3A to FIG. 3D.

Figure 3A:
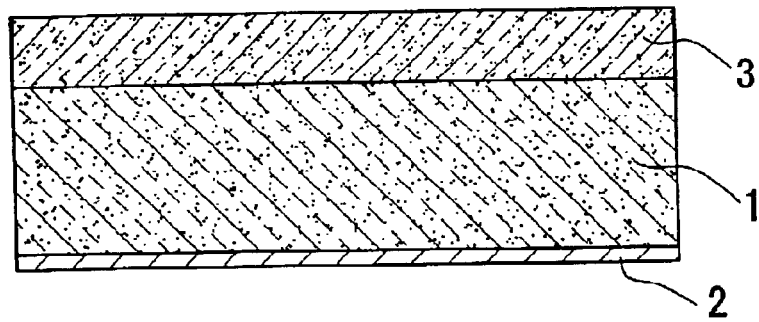
FIG. 3A to FIG. 3D are schematic cross sections each showing the electron source shown in FIG. 1 or an intermediate body in the middle of the manufacture, and show a method of manufacturing the electron source.

First, after an ohmic electrode 2 has been formed on the back surface of an n-type silicon substrate 1, a non-doped polycrystalline silicon layer 3 is formed as a semiconductor layer on a main surface of the n-type silicon substrate 1, and a structure shown in FIG. 3A is obtained. As a method of film forming the polycrystalline silicon layer 3, for example, there may be employed a CVD technique (such as LPCVD technique, plasma CVD technique, or catalytic CVD technique, for example), a sputtering technique, or a CGS (Continuous Grain Silicon) technique and the like.

Figure 3B:
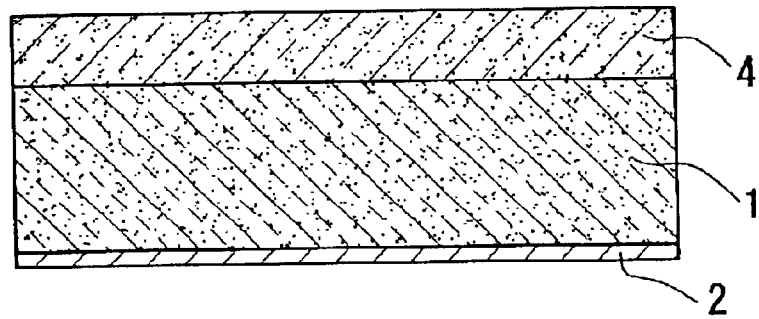

After the non-doped polycrystalline silicon layer 3 has been formed, the polycrystalline silicon layer 3 is made porous in accordance with the anodic oxidation processing step, whereby a porous polycrystalline silicon layer 4 that is a porous semiconductor layer is formed, and a structure shown in FIG. 3B is obtained. In the anodic oxidation processing step, there is employed an anodic oxidation processing vessel that contains an electrolytic solution consisting of a mixture solution obtained by mixing 55 wt. % of hydrogen fluoride water solution and ethanol at substantially 1:1. Then, with a platinum electrode (not shown) being negative in polarity and the n-type silicon substrate 1 (ohmic electrode 2) being positive in polarity, while light emission is carried out for the polycrystalline silicon layer 3, anodic oxidization is carried out at a constant current. In this manner, the porous polycrystalline silicon layer 4 is formed. The thus formed porous polycrystalline silicon layer 4 contains polycrystalline silicon grains and silicon nanocrystals. In Embodiment 1, although all of the polycrystalline silicon layer 3 is made porous, the layer may be partially made porous.

Figure 3C:
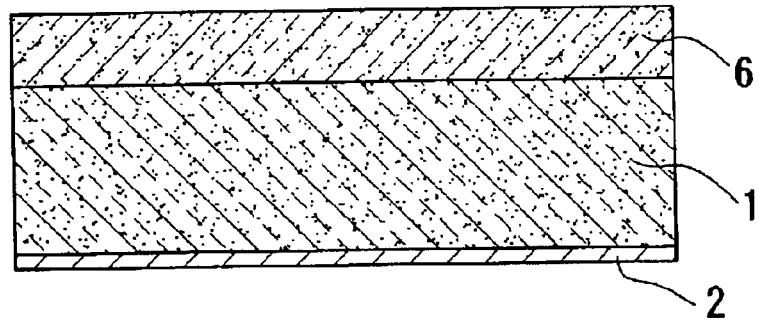

After the anodic oxidization processing step has terminated, the porous polycrystalline silicon layer 4 is oxidized in accordance with the oxidizing step, whereby the drift layer 6 consisting of the oxidized porous polycrystalline silicon layer is formed, and a structure shown in FIG. 3C is obtained. In the oxidizing step, the porous polycrystalline silicon layer 4 is oxidized in a rapid heating technique, whereby a drift layer 6 is formed, the drift layer containing the grains 51, silicon nanocrystals 63, and silicon oxide films 52 and 64. A lamp annealing device is employed in the oxidizing step using the rapid heating technique. In this case, while $O_2$ gas atmosphere is produced in a furnace, the substrate temperature is risen from the room temperature to a predetermined oxidization temperature (for example, 900° C.) at a predetermined temperature rise velocity (for example, 80° C./sec). Then, the substrate temperature is maintained by a predetermined oxidization time (for example, 1 hour), and rapid thermal oxidization (RTO) is carried out. Then, the substrate temperature is lowered to the room temperature. In Embodiment 1, although the temperature rise velocity is set to 80° C./sec, the temperature rise velocity may be set to 80° C./sec or more, and it is preferable that the velocity be set to 150° C./sec or more. A reason for thus setting the temperature rise velocity will be described later. In Embodiment 1, the oxidization step is provided as the insulating film forming step of forming the silicon oxide films 64, which are insulating films, on the surfaces of the silicon nanocrystals 63 that are semiconductor nanocrystals.

Figure 3D:
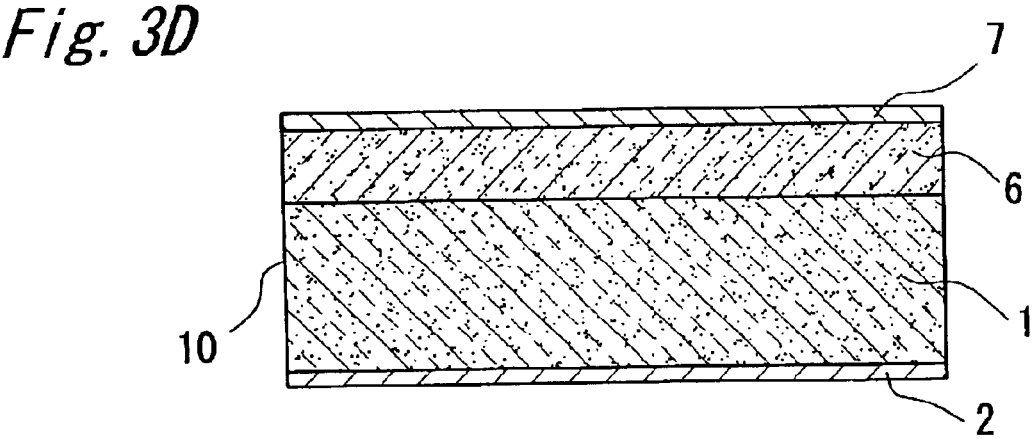

After the drift layer 6 has been formed, a first thin film layer consisting of a metal film (chrome film in Embodiment 1) is deposited on the drift layer 6 in accordance with an electron beam vapor deposition technique. Further, a second thin film layer consisting of a metal film (gold film in Embodiment 1) is deposited on the first thin film layer in accordance with the electron beam vapor deposition technique. In this manner, a surface electrode 7 consisting of the first thin film layer and the second thin film layer is formed, and an electron source 10 with its structure shown in FIG. 3D is obtained. In Embodiment 1, although the surface electrode 7 is formed in accordance with the electron beam vapor deposition technique, a method of forming the surface electrode 7 is not limited to the electron beam vapor deposition technique, and a sputtering technique may be employed, for example.

In the meantime, the present inventors have obtained a finding that, as a result of search, a condition for the oxidizing step using the rapid heating technique, in particular, a temperature rise velocity affects a deviation between lots of characteristics such as electron emission efficiency, dielectric strength, or service life.

Then, the present inventors carried out analytical evaluation of the drift layer 6 of the electron source 10 by setting the temperature rise velocity in the rapid heating technique to 80° C./sec. Specifically, there were carried out: a structural evaluation in the vicinity of the surface of the drift layer 6 in accordance with a photoluminescence technique (PL technique); observation and element analysis of a structure of a drift layer surface vicinity portion using a sectional TEM (Transmission type Emission Microscope); and dimensional measurement of the existing quantity of the drift layer constituent element relevant to the depth direction by using X-ray photo-electron spectroscopy (XPS technique). Further, similar analytical evaluation was carried out for an electron source (drift layer) according to Comparative Example as well. The electron source according Comparative Example was manufactured by setting the temperature rise velocity in the rapid heating technique to 20° C./sec which is lower than 80° C./sec. As a result, in Comparative Example in which the temperature velocity was set to 20° C./sec, in the drift layer, an $SiO_2$ film was formed from the surface (critical surface with surface electrode 7) to a depth of about 100 nm, and the presence of silicon nanocrystal was not verified. In contrast, in the drift layer in the electron source 10 in which the temperature rise velocity was set to 80° C./sec, which is comparatively high, it was found that the silicon nanocrystals 63 exist in a region to the depth of about 100 nm from the surface as well.

Hereinafter, a result f each analytical evaluation will be described. First, a result obtained by observation and element analysis caused to a sectional TEM for a structure in the vicinity of a surface, respectively, will be described with respect to the drift layer 6 of the electron source 10 according to Embodiment 1 and the drift layer according to Comparative Example. By evaluation caused by the sectional TEM, in the drift layer 6 of the electron source 10, the columnar grains of the polycrystalline silicon and the silicon nanocrystals of nano-meter order were verified. In contrast, in the drift layer according to Comparative Example, $SiO_2$ films were formed over the whole region from the surface to a depth of about 100 mm, and the columnar grains of the polycrystalline silicon were verified only in a region deeper than 100 nm.

Figure 4:
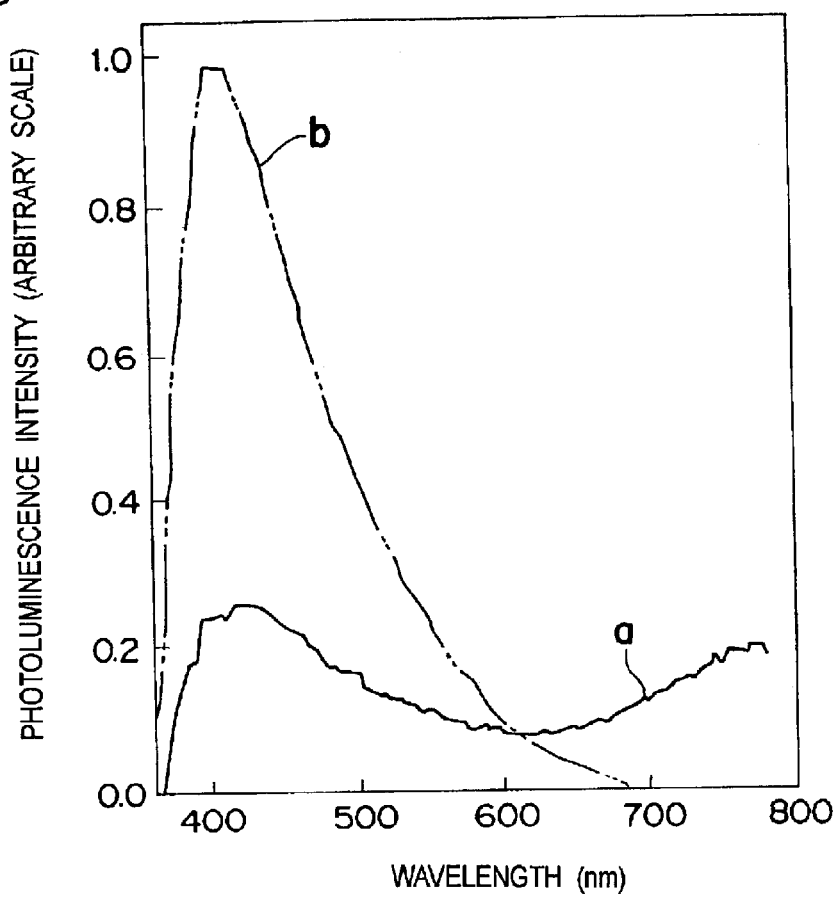
FIG. 4 is a light emission spectrum using the photoluminescence intensity of the electron source shown in FIG. 1 and Comparative Examples, and shows characteristics of the photoluminescence measurement relevant to the wavelength.

Now, a result of structural evaluation in the vicinity of the surface of the drift layer in accordance with the PL technique will be described with reference to FIG. 4. FIG. 4 shows light emission spectra measured by emitting light of 325 nm in wavelength from a He—Cd laser. "a" in FIG. 4 indicates the light emission spectra of the drift layer 6 according to Embodiment 1, and "b" indicates the light emission spectra of the drift layer according to Comparative Example. An invasion length of the light emitted from the He—Cd laser into the drift layer 6 is within the range of 100 nm in the depth direction from the surface of the drift layer 6. Therefore, the light emission spectra of each of "a" and "b" in FIG. 4 indicates light emission spectra from a shallow region in the vicinity of the surface. In general, the light emission from the silicon oxide films is referred to as an F band, and is known to have a peak in the proximity of 430 nm to 540 nm. In addition, the light emission from the silicon nanocrystals is referred to as an S band, and is known to have a peak in the vicinity of 650 nm to 800 nm. As is evident from FIG. 4, in the drift layer 6 according to Embodiment 1, the peak believed to be light emission from the silicon nanocrystals 63 and the peak believed to be light emission from the silicon oxide films are observed. In contrast, in the drift layer according to Comparative Example, only the peak believed to be light emission from the silicon oxide films is observed. That is, in the region from the surface of the drift layer 6 according to Comparative Example to the depth of about 100 nm, silicon nanocrystals hardly exist, a majority or all of which are believed to be silicon oxide films. This result coincides by the analysis result caused by the sectional TEM.

Figure 5:
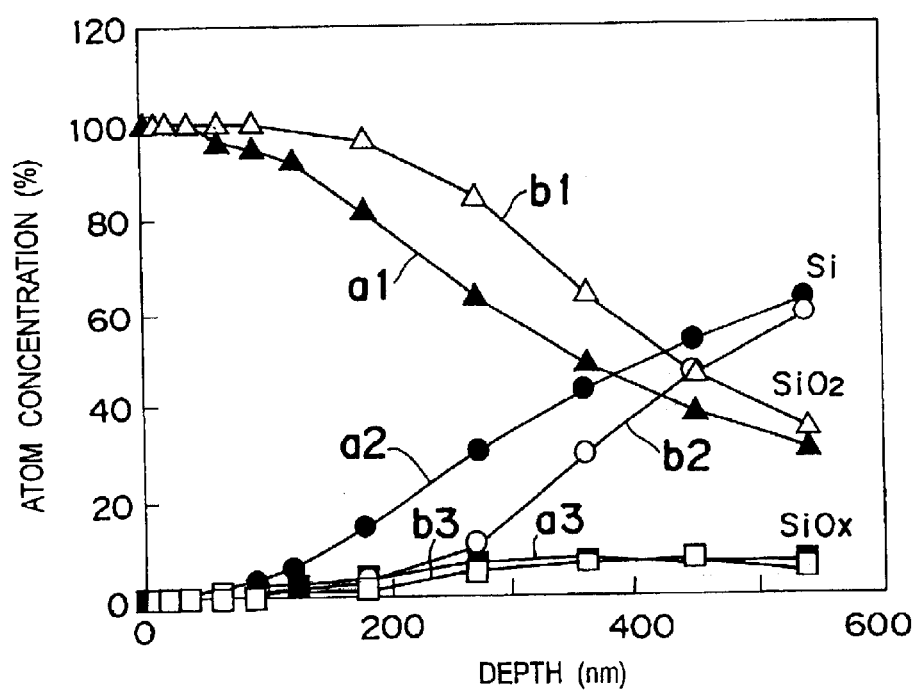
FIG. 5 is a graph showing a direction in the depth direction of constituent elements using the X-ray photoelectronic spectroscopy of the electron source shown in FIG. 1 and Comparative Examples, and shows characteristics of the atom concentration relevant to the depth.

Now, a result of distribution measurement in the depth direction concerning an existence quantity of drift layer constituent elements in accordance with the XPS technique will be described with reference to FIG. 5. The horizontal axis of FIG. 5 indicates the depth from the surface of the drift layer 6. The vertical axis of FIG. 5 indicates the atom concentration. "a1", "a2", and "a3" in FIG. 5 indicate the measurement result relevant to the drift layer 6 according to Embodiment 1. In addition, "b1", "b2", and "b3" indicate the measurement result relevant to the drift layer according to Comparative Example. Here, "a1" and "b1" indicate the distribution in the depth direction of $SiO_2$, "a2" and "b2" indicate the distribution in the depth direction of Si, and "a3" and "b3" indicate the distribution in the depth direction SiOx. As is evident from FIG. 5, in the drift layer 6 according to Embodiment 1, Si and $SiO_2$ are observed in the region in which the depth from the surface is shallower than 100 nm. In contrast, in the drift layer according to Comparative Example, Si is not observed in the region which is shallower than 100 nm from the surface, and only $SiO_2$ is observed. This result coincides with the analysis result caused by the sectional TEM.

Figure 6A:
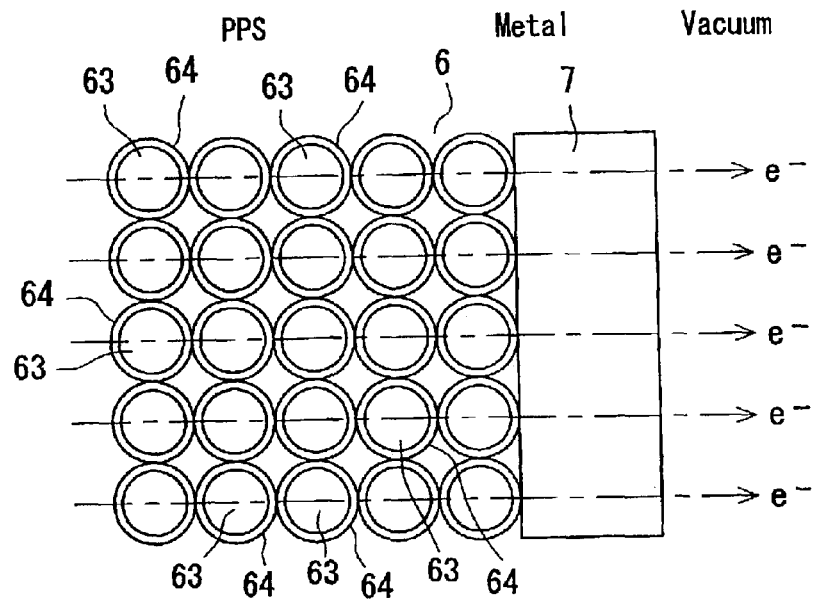
FIG. 6A and FIG. 6B are views each showing an electron emission principle of the electron source shown in FIG. 1.
Figure 6B:
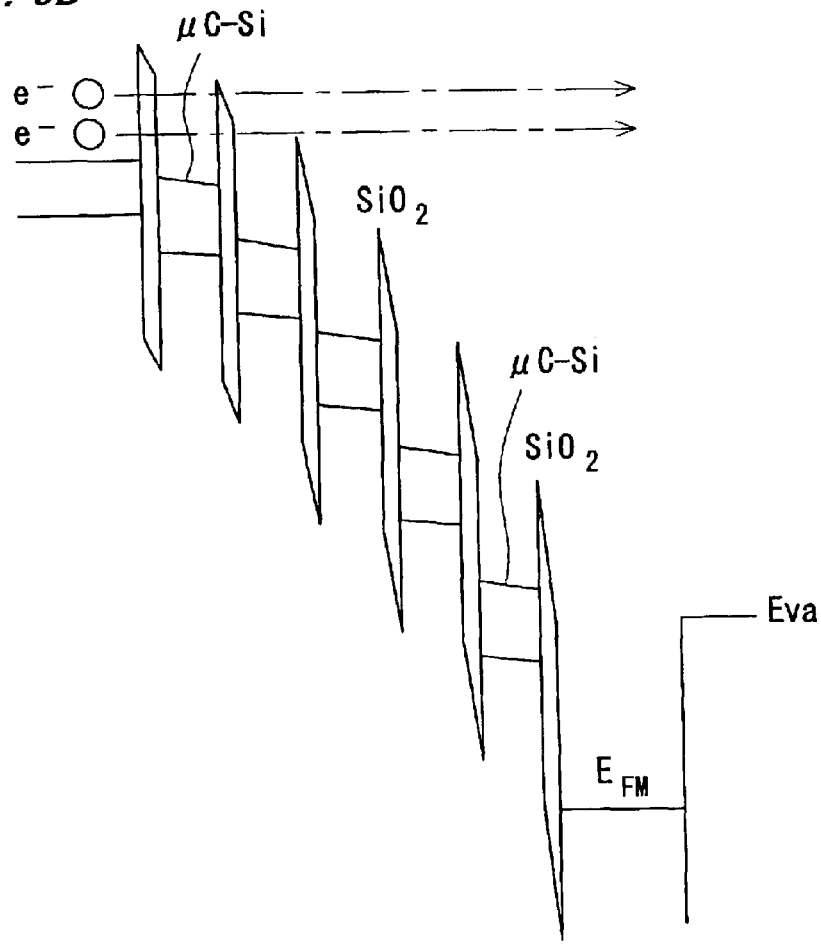

From the above analysis result, as shown in FIG. 6A and FIG. 6B, in the drift layer 6 according to Embodiment 1, it is believed that the silicon nanocrystals 63 having the silicon oxide films 64 formed on the surface thereof are contained in the vicinity of the surface of the drift layer 6 as well. Then, it is believed that the electrons "e-" injected into the drift layer 6 are accelerated by the strong electric field applied to the silicon oxide films 64, drift in the orientation (right side) indicated by the arrow in FIG. 6A with hardly colliding with the silicon nanocrystals 63, reach the surface of the drift layer 6, tunnel the surface electrode 7, and are emitted into the vacuum (the single dotted chain light in FIG. 6A indicates the flow of electrons "e-"). "PPS" described at the upper part of FIG. 6A indicates the drift layer 6, "Metal" indicates the surface electrode 7, and "Vacuum" indicates a vacuum. In addition, FIG. 6B is an energy band chart illustrating a principle of electron emission. "$SiO_2$" in FIG. 6B indicates silicon oxide films 64, "$\mu c$-Si" indicates silicon nanocrystals 63 of nano-meter order, "$E_{FM}$" indicates the Fermi level of the surface electrode 7, and "Eva" indicates the vacuum level.

Figure 7A:
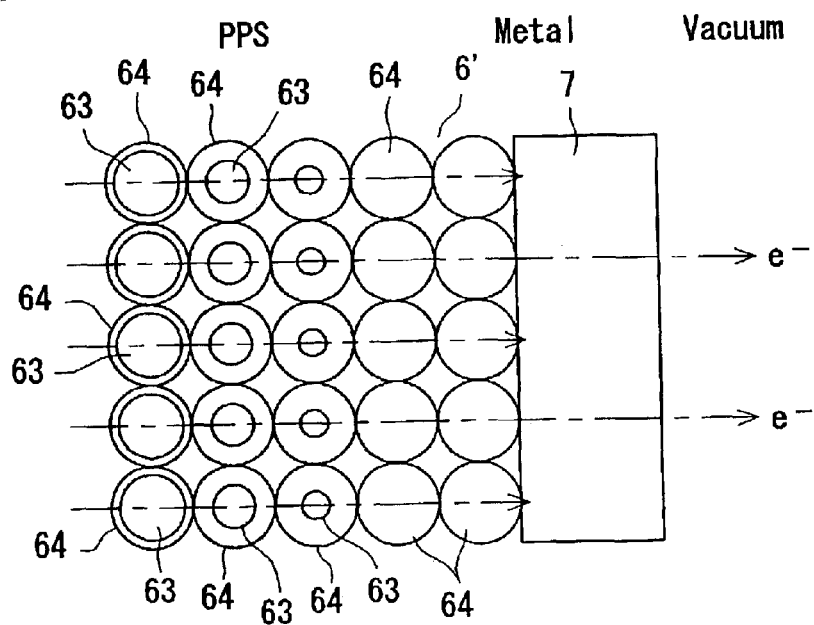
FIG. 7A and FIG. 7B are views each showing an electron emission principle of an electron source according to Comparative Examples.
Figure 7B:
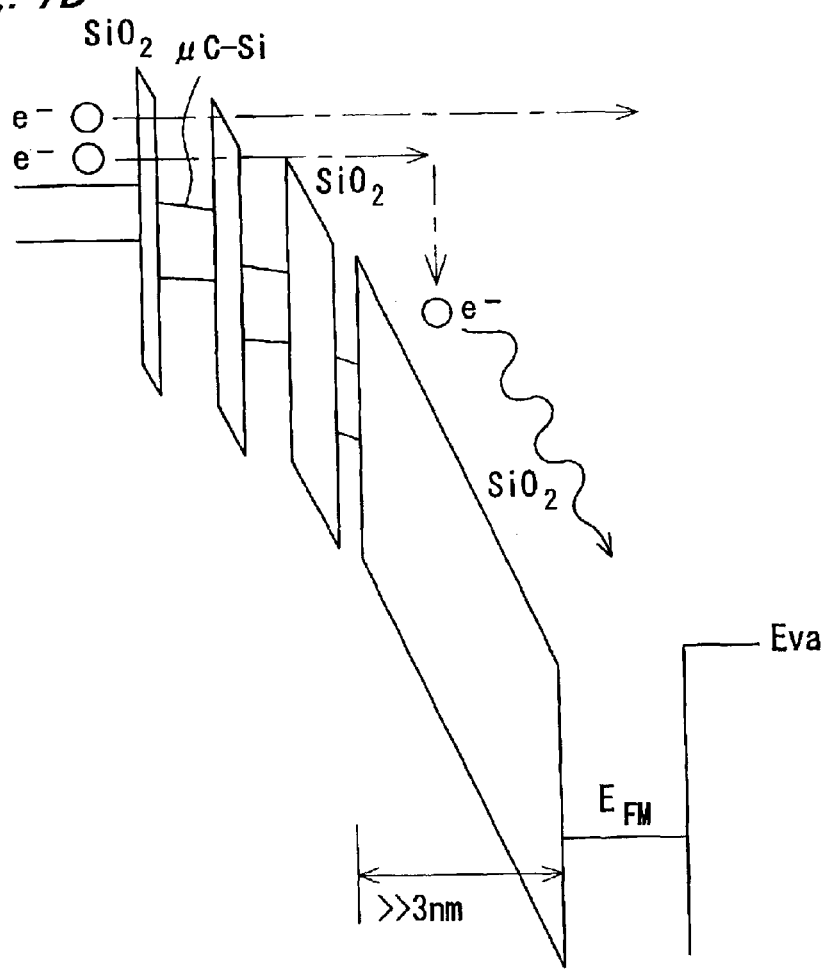

On the other hand, as shown in FIG. 7, in the drift layer according to Comparative Example (hereinafter, referred to as "drift layer 6'"), the film thickness of each of the silicon oxide films 64 increases as the film is close to the surface of the drift layer 6', and the silicon nanocrystals 63 are destroyed. In the vicinity of the surface, any silicon nanocrystals 63 do not exist. Thus, a part of the electrons "e-" injected in the drift layer 6' are diffused or absorbed by the silicon oxide films 64 each of which has a film thickness (degree of mean free pass of electrons) larger than the film thickness to an extent such that an electron tunneling phenomenon occurs. Thus, it is believed that the electron emission efficiency is lowered, and the dielectric strength and service life are lowered.

Figure 8B:
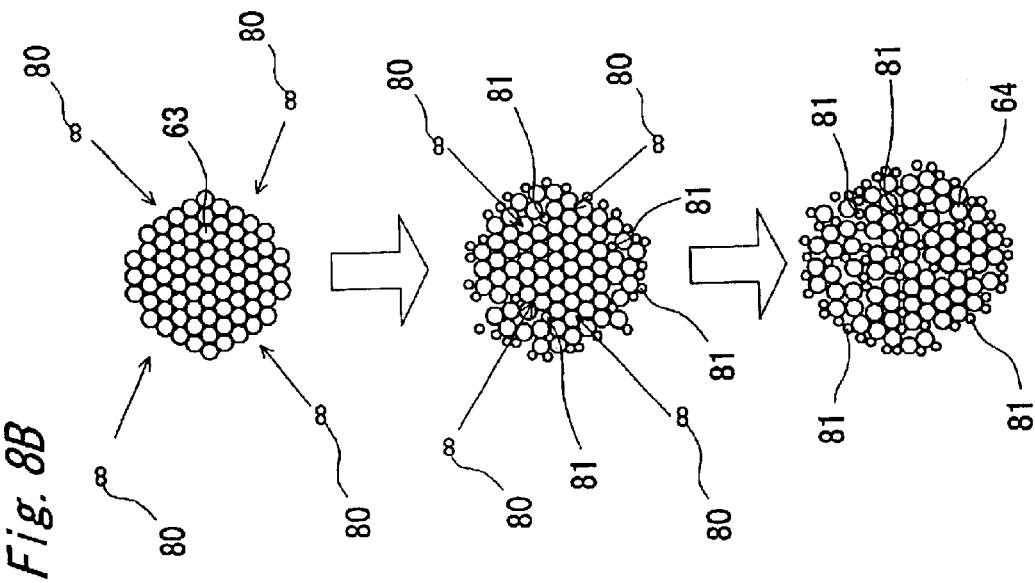
FIG. 8A and FIG. 8B are views each showing an oxidization process in the electron source shown in FIG. 1 and that according to Comparative Examples.
Figure 8A:
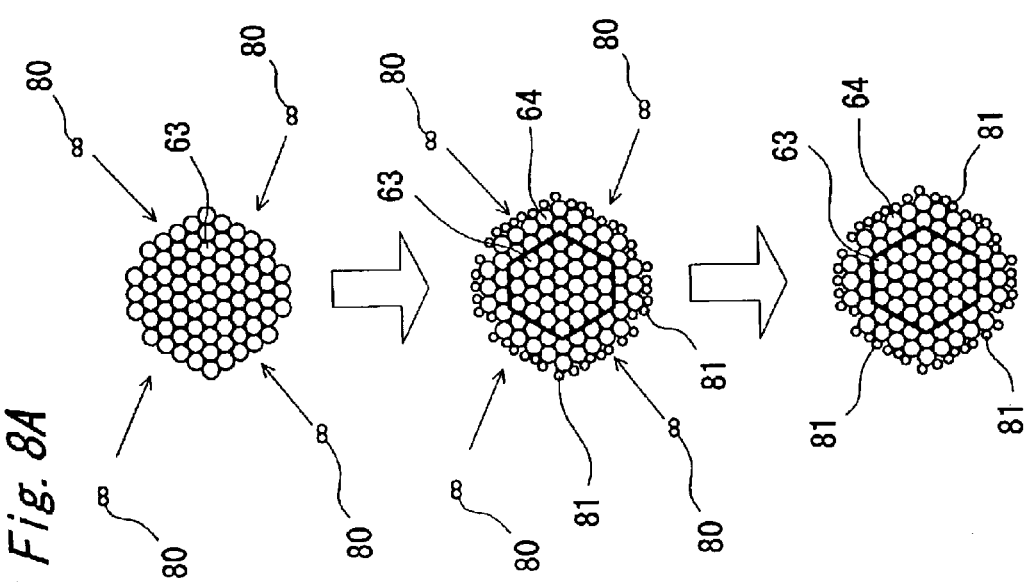

In the drift layer 6 according to Embodiment 1, the silicon nanocrystals 63 exist in the vicinity of the surface as well. In contrast, in the drift layer 6' according to Comparative Example, the following model is believed to be responsible for destruction of the silicon nanocrystals 63 in the vicinity of the surface. That is, in Embodiment 1, in the oxidizing step after the anodic oxidization processing step, as shown in FIG. 8A, an oxygen molecule 80 reaches the periphery of the silicon nanocrystal 63. At this time, a temperature rise velocity is comparatively high (80° C./sec), and thus, the silicon oxide films 64 are formed within a short time on the surfaces of the silicon nanocrystals 63 formed in accordance with anodic oxidization. Thus, diffusion of an oxygen atom 81 into the center portion of the silicon nanocrystal 63 is inhibited. In this manner, it is believed that the silicon oxide film 64 having film thickness (degree of mean free path of electrons) in which an electron tunneling phenomenon occurs is formed only on the surface of the silicon nanocrystal 63. On the other hand, in Comparative Example as well, in the oxidizing step after anodic oxidization processing step, as shown in FIG. 8B, the oxygen molecule 80 reaches the periphery of the silicon nanocrystal 63. However, the temperature rise velocity is comparatively low (20° C./sec), and thus, the oxygen atom 81 diffuses to the center portion of the silicon nanocrystal 63 formed in accordance with anodic oxidization, and the entirety of the silicon nanocrystal 63 is oxidized. This is because the silicon nanocrystal 63 is destroyed.

Figure 9:
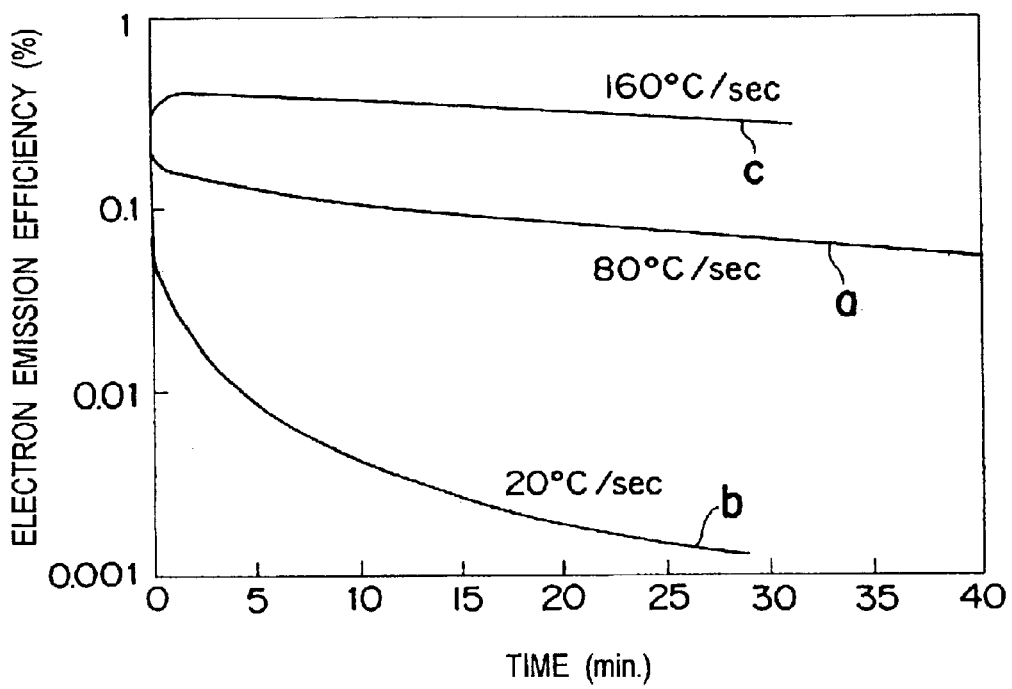
FIG. 9 is a graph showing a change with an elapse of time, of electron emission efficiency in the electron source shown in FIG. 1 and that according to Comparative Examples.

FIG. 9 shows a change with en elapse of time, of a respective electron emission efficiency when the temperature rise velocity is set to 80° C./sec, 160° C./sec, and 20° C./sec. The vertical axis of FIG. 9 indicates electron emission efficiency, and the horizontal axis indicates an elapsed time. "a" in FIG. 9 indicates a case in which the temperature rise velocity is set to 80° C./sec, "b" indicates a case in which the velocity is set to 20° C./sec, and "c" indicates a case in which the velocity is set to 160° C./sec. As is evident from FIG. 9, in Embodiment 1, the electron emission efficiency is high and a change with an elapse of time of the electron emission efficiency is reduced as compared with Comparative Example. In this manner, the service life is extended. In addition the temperature rise velocity is increased from 80° C./sec to 160° C./sec, whereby the electron emission efficiency is increased more remarkably.

A change with an elapse of time, of the electron emission efficiency shown in FIG. 9 can be fitted by a function (hereinafter, referred to as "damping function") that damps relevant to an elapsed time in an exponential function manner. That is, an initial value of the electron emission efficiency (hereinafter, referred to as "initial electron emission efficiency") is defined as $\eta 0$, a time constant is defined as $\tau$, a proportional coefficient (linear filter) is defined as $\gamma$, and an elapsed time is defined as t, the electron emission efficiency in an arbitrarily elapsed time "t" can be approximated in the following formula 1. As a value of time constant $\tau$ increases, the service life of the electron source increases.

$$\eta = \eta 0 \cdot \exp((-t/\tau) \cdot \gamma) \qquad \text{Formula 1}$$

Figure 10:
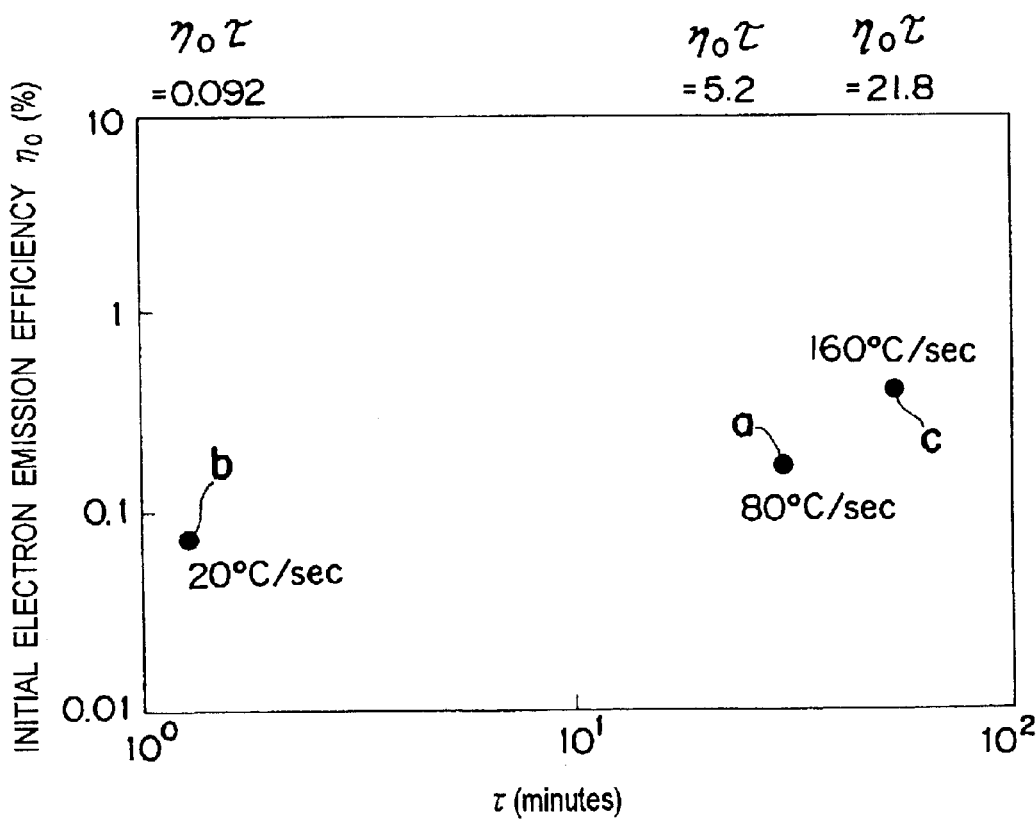
FIG. 10 is a view showing electron emission characteristics of the electron source shown in FIG. 1 and that according to Comparative Example.

FIG. 10 shows a relationship between the initial electron emission efficiency $\eta 0$ and the time constant $\tau$ obtained by being fitted by the damping function. The vertical axis of FIG. 10 indicates the initial electron emission efficiency $\eta 0$, and the horizontal axis indicates the time constant $\tau$. "a" in FIG. 10 indicates a case in which the temperature rise velocity is set to 80° C./sec, "b" indicates a case in which the temperature rise velocity is set to 20° C./sec, and "c" indicates a case in which the temperature rise velocity is set to 160° C./sec. According to FIG. 10, as the temperature rise velocity increases, it is found that the initial electron emission efficiency $\eta 0$ and the time constant $\tau$ increase. Namely, as the temperature rise velocity increases, the electron emission efficiency can be improved, and the service life can be extended. Here, assuming that the characteristic evaluation of the electron source is carried out by a multiple $\eta 0 \cdot \tau$ between the initial electron emission efficiency $\eta 0$ and the time constant $\tau$, it is believed that the characteristics of the electron source is more excellent as the value of $\eta 0 \cdot \tau$ increases. The value of $\eta 0 \cdot \tau$ is 0.092 in "b", 5.2 in "a", and 21.8 in "c". The temperature rise velocity is increased from 20° C./sec to 80° C./sec, it is found that the value of $\eta 0 \cdot \tau$ is larger by 50 times as compared with a case of 20° C./sec. Therefore, the temperature rise velocity is set to 80° C./sec or more, whereby the electron emission efficiency can be improved, and the service life can be extended as compared with a case of 20° C./sec. Further, the temperature rise velocity is set to 150° C. or more, whereby the electron emission efficiency can be improved more remarkably, and the service life can be extended more significantly. Although the temperature rise velocity is restricted by performance of a manufacturing apparatus (for example, lamp annealing device) employed in the rapid heating technique, it is currently known that the temperature rise velocity can be increased to about 400° C./sec.

With the method of manufacturing the electron source 10 according to Embodiment 1, the thickness of the silicon oxide films 64 that are insulating films in the drift layer 6 can be set at the film thickness to an extent such that an electron tunneling phenomenon occurs. Thus, electron diffusion in the silicon oxide films 64 can be reduced, and a deviation of thickness of the silicon oxide films 64 in the drift layer 6 can be reduced. In this manner, the design of the dielectric strength and service life is made easy, the dielectric strength can be improved, and the service life can be extended. Further, the electron emission efficiency can be improved.

(Embodiment 2)

Hereinafter, Embodiment 2 of the present invention will be described. In Embodiment 2, as an electrically conductive substrate, there is employed a substrate on which an electrically conductive layer consisting of a metal film (for example, tungsten film) is provided on one surface of an insulating substrate consisting of a glass substrate (for example, quartz glass substrate).

Figure 11:
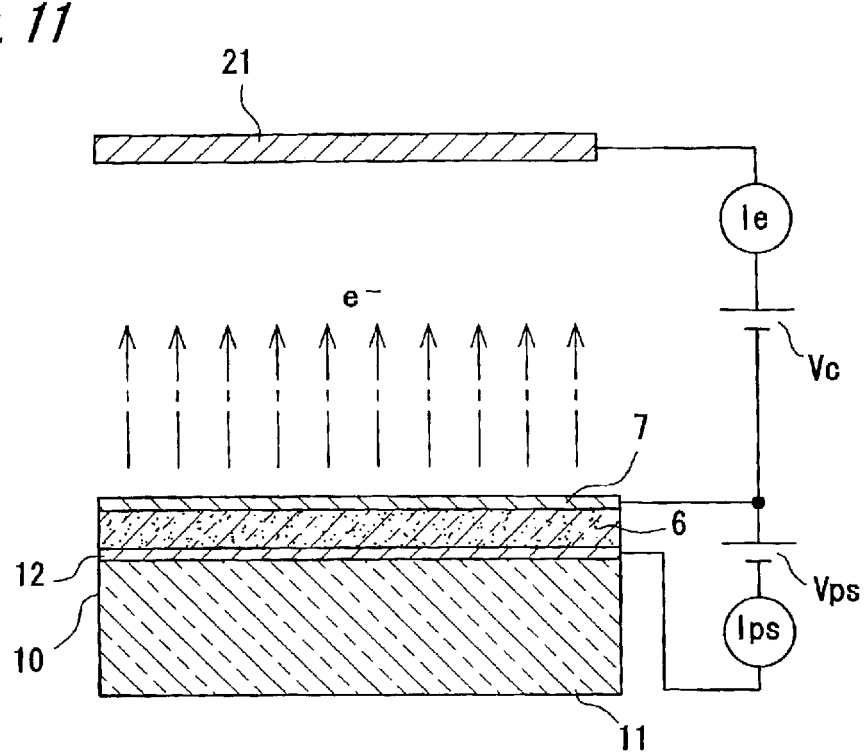
FIG. 11 is a view showing an operation of an electron source according to Embodiment 2 of the present invention.

As shown in FIG. 11, in an electron source 10 according to Embodiment 2, a drift layer 6 consisting of an oxide porous polycrystalline silicon layer is formed on an electrically conductive layer 12 on an insulating substrate 11. A surface electrode 7 is formed on the drift layer 6. A configuration of the surface electrode 7 is similar to that of Embodiment 1.

In order to emit electrons from the electron source 10, a collector electrode 21 is arranged so as to be opposite to the surface electrode 7, and a vacuum state is established between the surface electrode 7 and the collector electrode 21. Then, a direct current voltage Vps is applied between the surface electrode 7 and the electrically conductive layer 21 so that the surface electrode 7 becomes positive in polarity (high potential) relevant to the collector electrode 21, and a direct current voltage Vc is applied between the collector electrode 21 and the surface electrode 7 so that the collector electrode 21 becomes positive in polarity relevant to the surface electrode 7. When the direct current voltages Vps and Vc are properly set, the electrons injected from the electrically conductive layer 12 drift in the drift layer 6, and are emitted via the surface electrode 7 (the single dotted chain line in FIG. 11 indicates the flow of electrons "e-" emitted through the surface electrode 7). The electrons arrived on the surface of the drift layer 6 are believed to be hot electrons, easily tunnel the surface electrode 7, and are emitted into the vacuum. In the electron source 10 according to Embodiment 2 as well, as in the electrode 10 according to Embodiment 1, as a ratio of the emission current Ie to the diode current Ips(=Ie/Ips) increases, the electron emission efficiency increases.

The configuration and function of the drift layer 6 is similar to those of Embodiment 1. That is, the drift layer 6 is composed of, at least, grains 51, silicon oxide films 52, a number of silicon nanocrystals 63, and a number of silicon oxide films 64 (refer to FIG. 1). In addition, in the drift layer 6, the surface of each grain is made porous, and a crystalline state is maintained at the center portion of each grain. The thickness of each of the silicon oxide films 64 is set at the film thickness to an extent such that an electron tunneling phenomenon occurs (degree of mean free path of electrons), for example, about 1 nm to 3 nm.

In the electron source 10 according to Embodiment 2 as well, it is believed that the electron emission occurs in a model similar to the case of the electron source 10 according to Embodiment 1. That is, the direct current voltage Vps is applied between the surface electrode 7 and the electrically conductive later 12 with the surface electrode 7 being positive in polarity, and the direct current voltage Vc is applied between the collector electrode 21 and the surface electrode 7 with the collector electrode 21 being positive in polarity, whereby the electrons "e-" injected from the electrically conductive layer 12 into the drift layer 6 by thermal excitation drift, tunnel the surface electrode 7, and are emitted into the vacuum.

In the case where the electron source 10 according to Embodiment 2 is utilized as an electron source of a display, the lower electrode (electrically conductive substrate) or surface electrode 7 and the like may be properly patterned.

A method of manufacturing the electron source 10 according to Embodiment 2 will be described with reference to FIG. 12A to FIG. 12D.

Figure 12A:
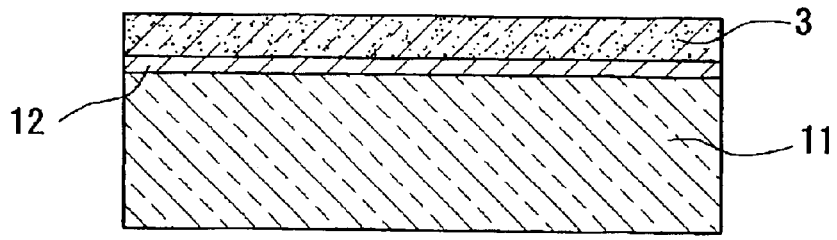
FIG. 12A to FIG. 12D are schematic sectional views each showing an electron source shown in FIG. 11 or an intermediate body in the middle of the manufacture, and show a method of manufacturing the electron source.

First, on one surface side of an insulating substrate 11, an electrically conductive layer 12 consisting of a metal layer (for example, tungsten film) is formed, and an electrically conductive substrate is fabricated in accordance with a sputtering technique or the like. Then, on a main surface side of the electrically conductive substrate (on the electrically conductive layer 12), a non-doped polycrystalline silicon layer 3 is formed as a semiconductor layer, and a structure shown in FIG. 12A is obtained. As a method of film forming the polycrystalline silicon layer 3, for example, there may be employed a CVD technique (such as LPCVD technique, plasma CVD technique, or catalytic CVD technique, for example), a sputtering technique, or a CGS (Continuous Grain Silicon) technique.

Figure 12B:
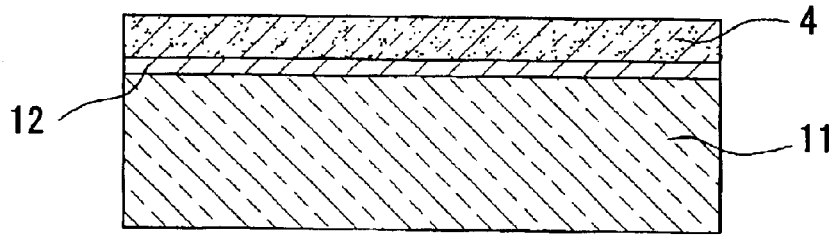

After the non-doped polycrystalline silicon layer 3 has been formed, the polycrystalline silicon layer 3 is made porous in accordance with the anodic oxidization processing step, whereby a porous polycrystalline silicon layer 4 that is a porous semiconductor layer is formed, and a structure shown in FIG. 12B is obtained. In the anodic oxidization processing step, there is employed an anodic oxidization processing vessel that contains an electrolytic solution consisting of a mixture solution obtained by mixing 55 wt. % of hydrogen fluoride water solution and ethanol at substantially 1:1. Then, with a platinum electrode (not shown) being negative in polarity and the electrically conductive layer 12 being a positive layer, while light emission is carried out for the porous polycrystalline silicon layer 3, anodic oxidization processing is carried out at a constant current. In this manner, a porous polycrystalline silicon layer 4 is formed. The porous polycrystalline silicon layer 4 contains polycrystalline silicon grains and silicon nanocrystals. In Embodiment 2, although entire polycrystalline silicon layer 3 is made porous, the layer may be partially made porous.

Figure 12C:
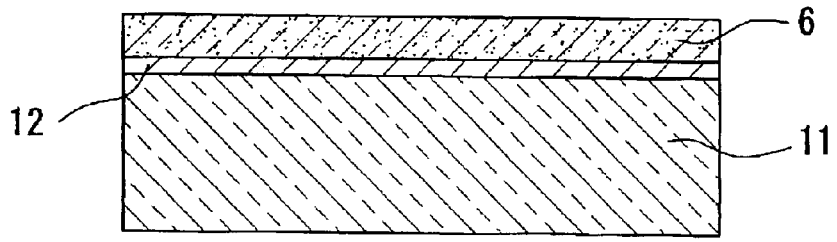

After the anodic oxidization processing step has terminated, the porous polycrystalline silicon layer 4 is oxidized, whereby a drift layer 6 consisting of an oxidized porous polycrystalline silicon layer is formed, and a structure shown in FIG. 12C is obtained. In the oxidizing step, the porous polycrystalline silicon layer 4 is oxidized in accordance with the rapid heating technique, whereby a drift layer 6 containing the grains 51, the silicon nanocrystals 63 and silicon oxide films 52 and 64 is formed. In the oxidizing step using the rapid heating technique, as is the case of Embodiment 1, $O_2$ gas atmosphere is produced inside of a furnace by employing a lamp annealing device, and the substrate temperature is risen from the room temperature to a predetermined oxidization temperature (for example, 900° C.) by a predetermined temperature rise velocity (for example, 80° C./sec). Then, the substrate temperature is maintained for a predetermined oxidization time (for example, 1 hour), and rapid thermal oxidization (RTO) is applied. Then, the substrate temperature is lowered to the room temperature. In Embodiment 2, although the temperature rise velocity is set to 80° C./sec, the temperature rise velocity may be set to 80° C./sec or more, as is the case of Embodiment 1, it is preferable that the velocity be set to 150° C./sec or more. In Embodiment 2 as well, as is the case of Embodiment 1, the oxidizing step is provided as the insulating film forming step of forming the silicon oxide films 64 that are insulating films on the surfaces of the silicon nanocrystals 63 that are semiconductor nanocrystal.

Figure 12D:
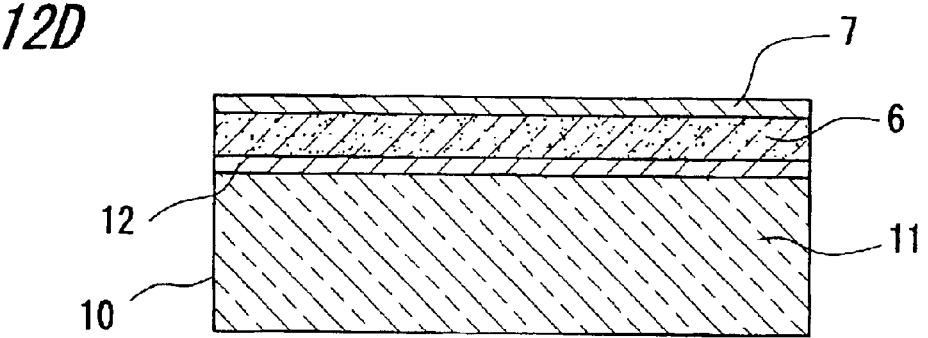

After the drift layer 6 has been formed, a first thin film layer consisting of a metal film (chrome film in Embodiment 2) is deposited on the drift layer 6 in accordance with the electron beam vapor deposition technique. Further, a second thin film layer consisting of a metal layer (gold layer in Embodiment 2) is deposited on the first thin film layer in accordance with the electron beam vapor deposition technique. In this manner, the surface electrode 7 consisting of the first thin film layer and the second thin film layer is formed, and the electron source 10 with its structure shown in FIG. 12D is obtained. In Embodiment 2, although the surface electrode 7 is formed in accordance with the electron beam vapor deposition technique, a method of forming the surface electrode 7 is not limited to the electron beam vapor deposition technique, and a sputtering technique may be employed, for example.

In this manner, with the method of manufacturing the electron source 10 according to Embodiment 2, the thickness of the silicon oxide film 64 that is an insulating film in the drift layer 6 can be provided as the film thickness to an extent such that an electron tunneling phenomenon occurs (degree of mean free path of electrons). Thus, electron diffusion in the silicon oxide films 64 each can be reduced, and a deviation of the thickness of the silicon oxide films 64 in the drift layer 6 can be reduced. In this manner, the design of the dielectric strength and service life is made easy. Therefore, the dielectric strength can be improved, and the service life can be extended. Further, the electron emission efficiency can be improved.

In the meantime, in Embodiments 1 and 2, the drift layer 6 is composed of the oxidized porous polycrystalline silicon layer. However, the drift layer 6 may be composed of a nitrided porous polycrystalline silicon layer or an oxi-nitrided porous polycrystalline silicon layer. Alternatively, this layer may be composed of the other oxide, nitride, or oxi-nitride porous semiconductor layer.

In the case where the drift layer 6 is formed of the nitrided porous polycrystalline silicon layer, there may be employed a nitriding step (insulating film forming step) of nitriding the porous polycrystalline silicon layer 4 in accordance with the rapid heating technique in which the temperature rise velocity is set as in the embodiments by employing $NH_3$ gas, for example, instead of the oxidizing step (insulating firm forming step) of carrying out oxidization in accordance with the rapid heating technique employing $O_2$ gas. In this case, the silicon oxide films 52 and 64 each in FIG. 1 are provided as silicon nitride films.

In the case where the drift layer 6 is formed of the oxi-nitride porous polycrystalline silicon layer, there may be employed the oxidization and nitriding (insulating film forming step) of oxidizing/nitriding the porous polycrystalline silicon layer 4 in accordance with the rapid heating technique in which the temperature rise velocity is set as in the embodiments by employing a mixture gas between $O_2$ gas and gas containing nitrogen such as $NH_3$ gas, $N_2O$ gas, NO gas, or $N_2$ gas, for example, instead of the step of oxidizing the porous polycrystalline silicon layer 4 in accordance with the rapid heating technique. In this case, the silicon oxide films 52 and 64 in FIG. 1 are provided as silicon oxi-nitride films.

In addition, in the case where the drift layer 6 is formed of the oxi-nitride porous polycrystalline silicon layer, as the insulating film forming step of forming an insulating film consisting of a silicon oxi-nitride film, there may be employed: the oxide film forming step of forming a silicon oxide film that is an oxide film on the surface side of the silicon nanocrystal 63 in accordance with the rapid heating technique in which the temperature rise velocity is set as in the embodiments; and the nitriding processing step of nitriding the silicon oxide film formed in accordance with the oxide film forming step, thereby forming a silicon oxi-nitride film that is an oxidized and nitrided film.

In the case where the silicon nitride film or silicon oxi-nitride film is employed as an insulating film formed on the surface side of the silicon nanocrystal 63 that is a semiconductor film crystal, the dielectric strength is improved as compared with a case employing the silicon oxide film. In addition, in the case where a laminate film between the silicon oxide film and the silicon nitride film is employed as an insulating film as well, the dielectric strength is improved as compared with a case of employing the silicon oxide film.

After forming the drift layer 6 in the method of manufacturing the electron source 10 according to Embodiments 1 and 2 each, foaming processing for compensating for a defect in the drift layer 6 is carried out before forming the surface electrode 7, whereby the defect of the insulating film can be compensated for. In this manner, the dielectric strength can be improved more remarkably, and the service life can be extended more significantly. Foaming processing may be carried out by rising the substrate temperature to a predetermined temperature (for example, 450° C.) in a mixture gas consisting of at least $H_2$ and $N_2$. In accordance with such foaming processing, it is possible to prevent the thickness of the insulating film from being larger than that before foaming processing or impurities from being introduced. Further, a defect of the insulating film can be compensated for at a comparatively low temperature as compared with the substrate temperature using the rapid heating technique.

In the insulating film forming step according to Embodiments 1 and 2, the insulating film is formed by employing the rapid heating technique. However, the silicon oxide film 64 that is an insulating film may be formed in accordance with an electrochemical method. In this case, for example, by employing the oxidization processing vessel that contains an electrolytic solution (such as 1 M of $H_2SO_4$, 1 M of $HNO_3$, or aqua regia, for example), with a platinum electrode (not shown) being negative in polarity and a lower electrode (n-type silicon substrate in Embodiment 1 or electrically conductive layer 12 in Embodiment 2) being positive in polarity, a constant current is supplied, whereby the porous polycrystalline silicon layer 4 may be oxidized. In this manner, the drift layer 6 containing the grains 51, silicon nanocrystals 63, and silicon oxide films 52 and 64 can be formed. Of course, the insulating film formed in accordance with the electrochemical method may be provided as a nitride film such as silicon oxide film or an oxi-nitride film such as silicon oxi-nitride film.

When the insulating film was formed in such an electrochemical method, it was verified that the insulating film with film thickness to an extent such that an electron tunneling phenomenon occurs (degree of mean free path of electrons) can be formed and that the silicon nanocrystals 63 are not destroyed. However, the result that the electron emission efficiency is low and the service life is short was obtained as compared with a case in which the insulating film was formed in accordance with the rapid heating technique in which the temperature rise velocity was set to 80° C./sec. In addition, it was verified that the silicon oxide film formed in accordance with the electrochemical method contains a large amount of water as compared with the silicon oxide film formed in accordance with the rapid heating technique.

Therefore, in the insulating film forming step of forming each insulating film, after the insulating film has been electrochemically formed, the insulating film is formed in accordance with the rapid heating technique, whereby the water of the silicon oxide film can be removed, and the electron emission characteristics can be improved. In other words, before forming the insulating film in accordance with the rapid heating technique, the insulating film is formed in accordance with the electrochemical method, whereby the electron source 10 with its high electron emission efficiency and dielectric strength and the extended service life can be provided while the silicon nanocrystals are prevented from being destroyed in accordance with the rapid heating technique.

(Embodiment 3)

Hereinafter, Embodiment 3 of the present invention will be described. An electron source according to Embodiment 3 has an insulating film consisting of a silicon oxide film. In Embodiment 3, as an electrically conductive substrate (lower electrode), there is employed a single-crystalline n-type silicon substrate whose resistivity is comparatively close to a resistivity of a conductor (for example, a (100) substrate whose resistivity is 0.01 $\Omega$cm to 0.02 $\Omega$cm).

Figure 13:
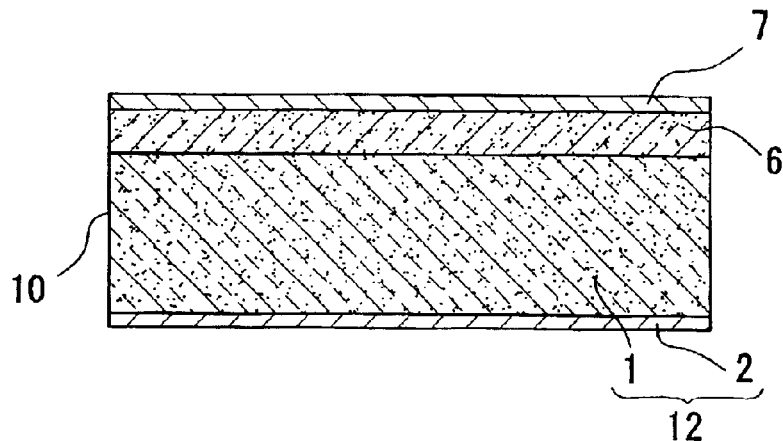
FIG. 13 is a schematic cross section showing an electron source according to Embodiment 3 of the present invention.

As shown in FIG. 13, in an electron source 10 according to the embodiment 3, a drift layer 6 consisting of an oxidized porous polycrystalline silicon layer is formed on a main surface side of an n-type silicon substrate 1 that is an electrically conductive substrate. A surface electrode 7 is formed on the drift layer 6. An ohmic electrode 2 is formed on the back surface of the n-type silicon substrate 1. Therefore, a surface electrode 7 is opposed to a lower electrode 12, and the drift layer 6 is interposed between the lower electrode 12 and the surface electrode 7. Further, porous polycrystalline silicon layer composes porous semiconductor layer A material with its small work function is employed for a material for the surface electrode 7. The thickness of the surface electrode 7 is set to 10 nm. However, the thickness thereof is not limited to this value, and may be thickness such that an electron passing through the drift layer 6 can be tunneled. The thickness of the surface electrode 7 may be set to about 3 nm to 15 nm.

The configuration and function of the drift layer 6 is similar to those of Embodiment 1. That is, the drift layer 6 is composed of, at least, grains 51, silicon oxide films 52, a number of silicon nanocrystals 63, and a number of silicon oxide films 64 (refer to FIG. 1). In addition, in the drift layer 6, the surface of each grain is made porous, and a crystalline state is maintained at the center portion of each grain. The thickness of each of the silicon oxide films 64 is set at the film thickness to an extent such that an electron tunneling phenomenon occurs (degree of mean free path of electrons), for example, about 1 nm to 3 nm.

Figure 14:
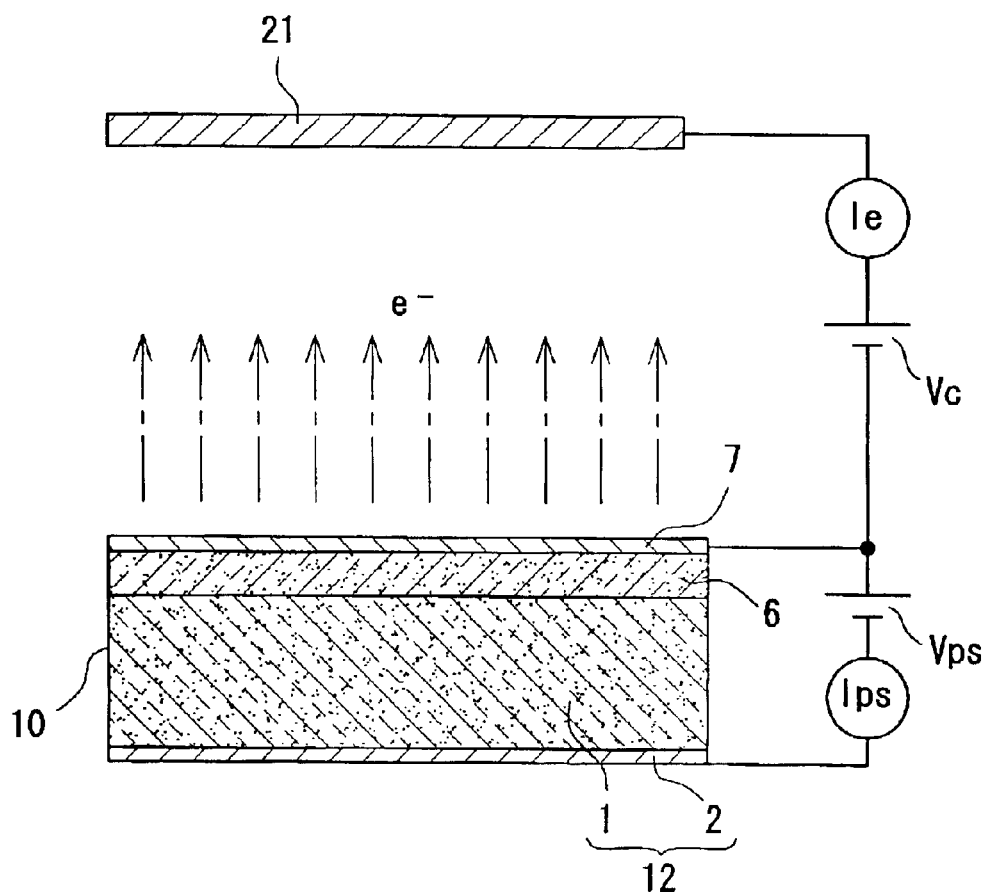
FIG. 14 is a view showing an operation of an electron source shown in FIG. 13.

As shown in FIG. 14, in an electron source 10 according to Embodiment 3 as well, it is believed that electron emission occurs in a model similar to the case of the electron source 10 according to Embodiment 1. That is, a direct current voltage Vps is applied between the surface electrode 7 and the lower electrode 12 with the surface electrode being positive in polarity, and a direct current voltage Vc is applied between the collector electrode 21 and the surface electrode 7 with the collector electrode 21 being positive in polarity, whereby the electrons "e-" injected from the lower electrode 12 into the drift layer 6 in accordance with thermal excitation drift, tunnel the surface electrode 7, and are emitted into the vacuum.

Hereinafter, a method of manufacturing the electron source 10 according to Embodiment 3 will be described with reference to FIG. 15A to FIG. 15D.

First, an ohmic electrode 2 is formed on the back surface of an n-type silicon substrate 1. Then, a non-doped polycrystalline silicon layer 3 is formed as a semiconductor layer on a main surface of the n-type silicon substrate 1, and a structure shown in FIG. 3A is obtained. As a method of film forming the polycrystalline silicon layer 3, for example, there may be employed a CVD technique (such as LPCVD technique, plasma CVD technique, or catalytic CVD technique, for example), a sputtering technique, or a CGS (Continuous Grain Silicon) technique or the like.

Figure 15A:
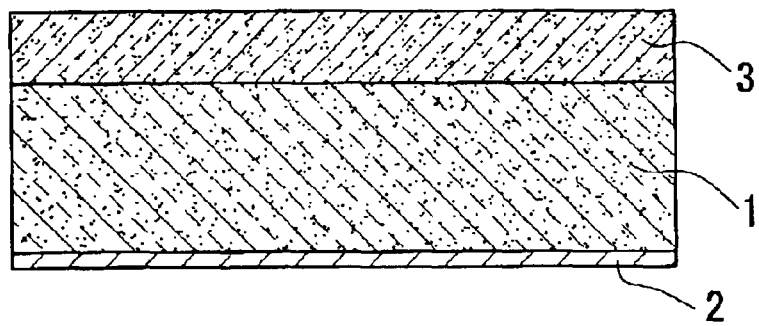
FIG. 15A to FIG. 15D are schematic cross sections each showing the electron source shown in FIG. 13 or an intermediate body in the middle of its manufacture, and show a method of manufacturing the electron source.
Figure 15B:
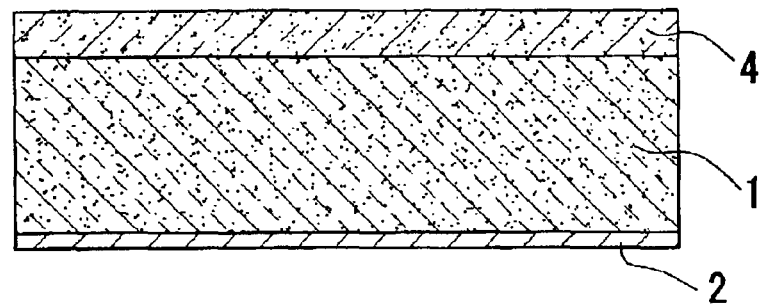

After the non-doped polycrystalline silicon layer 3 has been formed, the polycrystalline silicon layer 3 that is a semiconductor layer targeted for anodic oxidation is made porous in accordance with the anodic oxidation processing step, whereby a porous polycrystalline silicon layer 4 is formed, and a structure shown in FIG. 15B is obtained. The porous polycrystalline silicon layer 4 formed in accordance with the anodic oxidation processing step contains a number of polycrystalline silicon grains and a number of silicon nanocrystals. In the anodic oxidation processing step, there is employed a processing vessel that contains an electrolytic solution consisting of a mixture solution obtained by mixing 55 wt. % of hydrogen fluoride water solution and ethanol at substantially 1:1. Then, while light emission is carried out on the surface of the polycrystalline silicon layer 3 by employing a light source that consists of a 500 W tungsten lamp, a constant current is supplied from a power source (not shown) between the lower electrode 12 and a cathode consisting of a platinum electrode (namely, with a current density being constant). In this manner, the polycrystalline silicon layer 3 is made porous from the main surface of the polycrystalline silicon layer 3 to a depth reaching the n-type silicon substrate 1.

Figure 15C:
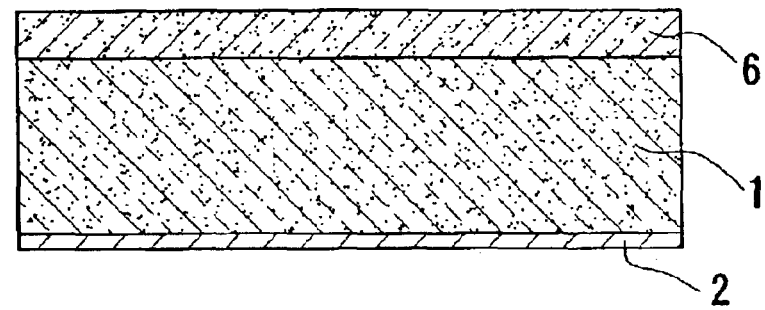

After the anodic oxidization processing step has terminated, the silicon oxide films 52 and 64 that are insulating films are formed on the surface of the semiconductor crystals (each grain and each silicon nanocrystal) contained in the porous polycrystalline silicon layer 4. In this manner, a drift layer 6 containing the grains 51, silicon nanocrystals 63, and silicon oxide films 52 and 64 is formed, and a structure shown in FIG. 15C is obtained. When the insulating film is formed, rinsing is carried out by using ethanol after terminating the anodic oxidization processing step, and then, a constant voltage is applied between the lower electrode 12 and a cathode consisting of a platinum electrode from a power source (not shown) by employing the processing vessel containing 1 M of sulfuric acid water solution. In this manner, an insulating thin film (silicon oxide film) which forms a basis is formed on the surface of each grain and each silicon nanocrystal in accordance with the electrochemical method.

Figure 16:
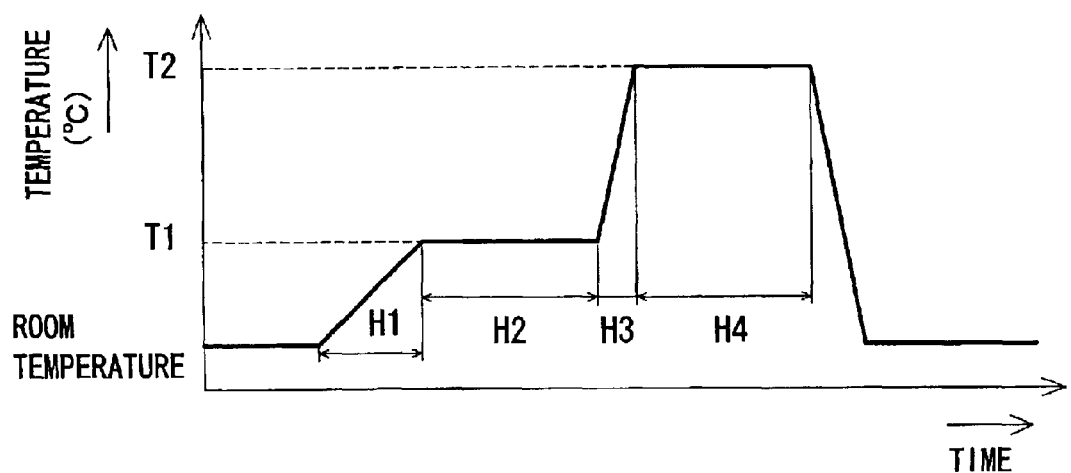
FIG. 16 is a view showing a technique of forming insulation thin films in the electron source according to Embodiment 3 of the present invention, and shows a change with an elapse of time, of a heat treatment temperature.

Next, the temperature profile heat treatment step as shown in FIG. 16 is carried out, and desired insulating films (silicon oxide films 52 and 64) are obtained. As shown in FIG. 16, in the heat treatment step, first heat treatment is carried out at a first set temperature T1 and a temperature rise velocity set so that the water contained in the insulating thin film is removed without being rapidly boiled. Then, second heat treatment is carried out at a second set temperature T2 set so as to be higher than the first set temperature T1 and so that structural alleviation of the insulating thin film occurs. In this manner, a desired insulating thin film is obtained.

In the heat treatment step, although a lamp annealing device is employed, for example, a general furnace may be employed as well. The first heat treatment is carried out in an oxygen gas atmosphere (namely, atmosphere containing oxide species). The first set temperature T1 is set to 450° C., for example, and a heat treatment time H2 is set to 1 hour, for example. In addition, the second heat treatment is carried out in an oxygen gas atmosphere (namely, atmosphere containing oxide species). The second set temperature T2 is set to 900° C., for example, and a heat treatment time H4 is set to 20 minutes, for example. In Embodiment 3, the rapid heat treatment technique is employed as a second heat treatment. The temperature rise velocity during a temperature rise period H3 at which the substrate temperature is risen from the first set temperature T1 to the second set temperature T2 is set to 150° C./sec. The temperature rise velocity during the temperature rise period H3 is set to be higher than that during the temperature rise period H1 at which a temperature is increased from room temperature to the first set temperature.

The first set temperature T1 may be set within the range of 100° C. to 700° C., and it is desirable that the temperature be set to 300° C. or more. The second set temperature T2 may be set within the range of 600° C. or more. The temperature rise velocity during the temperature rise period H3 may be set to 20° C./sec or more, and it is desirable that the velocity be set to 150° C./sec or more. It is required to set the temperature rise velocity during the temperature rise period H1 so that the water contained in the insulating thin film does not boil rapidly, and thus, it is desirable to set the velocity to 20° C./sec or less, for example.

Figure 15D:
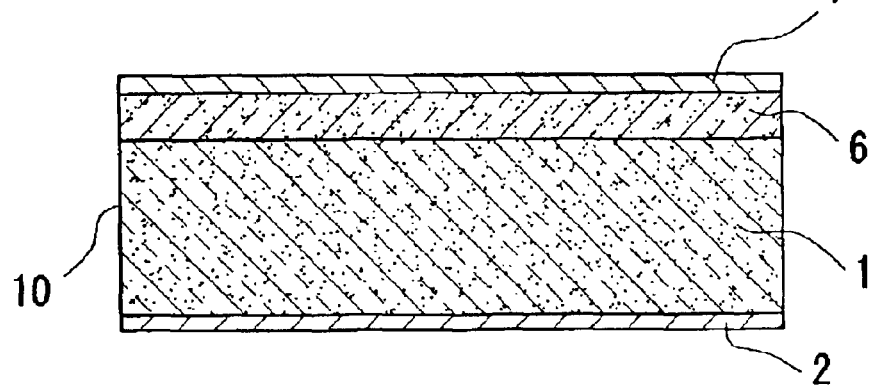

After the drift layer 6 has been formed, the surface electrode 7 consisting of a metal layer (for example, gold) is formed in accordance with a vapor deposition technique, and a electron source 10 with its structure shown in FIG. 15D is obtained. In Embodiment 3, the surface electrode 7 is formed in accordance with the vapor deposition technique. However, a method of forming the surface electrode 7 is not limited to the vapor deposition technique, and a sputtering technical may be employed, for example.

In forming the insulating films (silicon oxide films 52 and 64), first, an insulating thin film forming a basis is formed in accordance with the electrochemical method on the surface of a semiconductor crystal (a number of grains and a number of silicon nanocrystals contained in the porous polycrystalline silicon layer 4). In this manner, even in a semiconductor crystal of small size such as silicon nanocrystal (semiconductor nanocrystal) whose semiconductor crystal is in nano-meter order, the insulating thin films can be formed without destroying the silicon nanocrystals. Then, the first heat treatment is carried out at the first set temperature and temperature rise velocity set so that the water contained in the insulating thin film is removed without rapid boiling. Then, the second heat treatment is carried out at the second set temperature set so as to be higher than the first set temperature and so that structural alleviation of the insulating thin film occurs. In this manner, desired insulating films (silicon oxide films 52 and 64) can be obtained. That is, the water contained in the insulating film can be sufficiently reduced as compared with the insulating film formed in accordance with only the electrochemical method while the dielectric strength of the insulating film is prevented from being lowered due to rapid boiling of the water contained in the insulating thin film. In addition, the defect or strain and the like, which adversely affects the electrical characteristics, can be alleviated by structural alleviation. In this manner, an insulating film with its high dielectric strength and its extended service life can be formed.

In the electron source 10 manufactured in accordance with such a manufacturing method, the silicon oxide films 52 and 64 can be formed without destroying the silicon nanocrystals 63 as compare with a case in which the silicon oxide films 52 and 64 in the drift layer 6 are formed in accordance with only the rapid thermal oxidization technique. Thus, the electron emission efficiency, dielectric strength, or service life or the like can be improved. In addition, the water and strain in the silicon oxide films 52 and 64 can be reduced, and the dielectric strength and service life can be improved as compared with a case in which the silicon oxide films 52 and 64 in the drift layer 6 are formed in accordance with only the electrochemical method.

In the above manufacturing method, the first set temperature T1 is set to 700° C. or less. Thus, even in the case where the semiconductor crystals (grains and silicon nanocrystals) are formed on the surface side of a glass substrate that is lower in price and lower in heat resistance temperature as compared with the quartz glass substrate, the heat treatment time H2 of the first heat treatment can be comparatively longer. In this manner, the residual water after the first heat treatment can be reduced more remarkably. In addition, the second set temperature is set within the temperature range of 600° C. or more, and thus, the residual water in the insulating film (silicon oxide films 52 and 64) can be reduced more remarkably than the insulating thin film after the first heat treatment. Moreover, the second heat treatment is carried out in accordance with the rapid heat treatment technique, and thus, the temperature can be risen to the second set temperature within a short time. Thus, a damage that occurs with the silicon nanocrystal can be reduced.

The first heat treatment is carried out in atmosphere containing oxide species, and thus, a defect or the like occurring due to desorption of the water in the insulating thin film can be expected to be compensated for. In addition, oxygen coupling energy or reaction energy as well as thermal energy is utilized to desorb the water in the insulating thin film. In this manner, the residual water after the first heat treatment can be expected to be reduced more remarkably. Further, the second heat treatment is carried out in atmosphere containing oxide species. Thus, a thin thermally oxide film is formed on the surface side of the insulating thin film in accordance with the second heat treatment, and the dielectric strength of the insulating film is improved. In Embodiment 3, the second heat treatment is carried out after the first heat treatment. However, only the first heat treatment may be carried out without carrying out the second heat treatment. In this case as well, the dielectric strength and service life can be improved as compared with the prior art.

The first heat treatment may be carried out in a vacuum or inert gas atmosphere. The first heat treatment is carried out in a vacuum, whereby the first set temperature T1 can be set to be comparatively lower. That is, the first heat treatment is carried out in a vacuum, the water contained in the insulating thin film desorbs at a comparatively low temperature, and thus, the first set temperature T1 can be set to be comparatively low. The first heat treatment is carried out in inert gas atmosphere, thereby making it unnecessary to employ a vacuum device in order to carry out the first heat treatment. Thus, a simpler device can be employed as compared with the vacuum device, and the throughput in the device which carries out the first heat treatment can be improved.

The second heat treatment may be carried out in inert gas atmosphere, or alternatively, in atmosphere containing nitride species. The second heat treatment is carried out in inert gas atmosphere, thereby making it unnecessary to employ a vacuum device in order to carry out the second heat treatment. Thus, a simpler device can be employed as compared with the vacuum device, and the throughput in the device which carried out the second heat treatment can be improved. In addition, the film thickness of the insulating thin film is not changed by the second heat treatment, thus making it possible to control the film thickness of the insulating film under only a condition for the electrochemical method. This improves film thickness controllability of the insulating film. On the other hand, the second heat treatment is carried out in atmosphere containing nitride species, whereby a thin oxi-nitride film is formed on the surface side of the insulating thin film in accordance with the second heat treatment. In this manner, the dielectric strength of the insulating film is improved, and it can be expected that the electrical characteristics are improved due to reduction of a defect density in the insulating film.

In forming the insulating film, there may be employed a thin film forming device and an insulating film forming device comprising a first heat treatment device and a second heat treatment device. Here, a thin film forming device electrochemically forms an insulating thin film on the surface of a semiconductor crystal. The first heat treatment device carries out the first heat treatment at a first set temperature and a temperature rise velocity set so that the water contained in the insulating thin film is removed without rapid boiling. The second heat treatment device carries out the second heat treatment at the second set temperature set so as to be higher than the first set temperature and so that structural alleviation of the insulating thin film occurs, thereby forming a desired insulating film.

Although not shown, the thin film forming device comprises: a processing vessel that contains a predetermined electrolytic solution (for example, acids such as sulfuric acid, nitric acid, or aqua regia, or alternatively, an electrolytic solution obtained by dissolving a solute in an organic solvent may be employed); a cathode consisting of a platinum immersed in the electrolytic solution in the processing vessel; and a power source (for example, a constant power source) serving as power supply means for supplying power between an anode and a cathode with the anode being high in potential. In the thin film forming device, a target having a semiconductor crystal targeted for forming an insulating thin film is immersed in the electrolytic solution in the processing vessel, and an electrode (lower electrode 12 in Embodiment 3) provided in advance on the back surface of the target is utilized as an anode.

Figure 17:
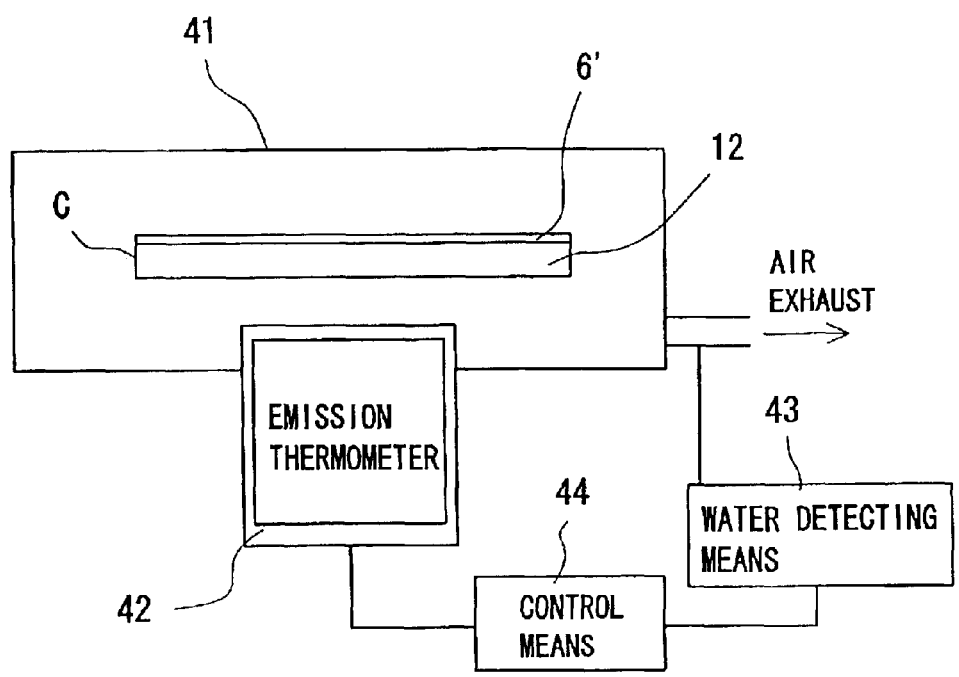
FIG. 17 is a schematic configuration of a heat treatment device employed for forming the insulation thin film shown in FIG. 13.

As shown in FIG. 17, the first heat treatment device is a lamp annealing device, and includes: an emission thermometer 42 that is temperature detecting means; and control means 44. The emission thermometer 42 detects a substrate temperature (temperature of the lower electrode 12 in Embodiment 3) in a target C set in a chamber 41 that carries out the first heat treatment. In Embodiment 3, a target layer 6' containing the grains 51, silicon nanocrystals 63, and insulating thin films is formed on the main surface side of the lower electrode 12. The control means 44 controls an output of a lamp (not shown) consisting of a halogen lamp so that the detected temperature by the emission thermometer 42 is substantially equal to the predetermined set temperature (first set temperature T1). Therefore, the first heat treatment device is compatible with the second heat treatment device. Thus, the first heat treatment and the second heat treatment can be continuously carried out in the same chamber 41.

In addition, water detecting means 43 is provided at the first heat treatment device. The water detecting means 43 is provided at the air exhaust side of the chamber 41 to detect the water caused by the insulating thin film of the target C. In the control means 44, if an amount of water detected by the water detecting means 43 is smaller than a predetermined amount, it is preferable that the first heat treatment be terminated. Doing this can prevent an occurrence of excess or shortage in heat treatment time H2 of the first heat treatment, and can improve reproducibility of the electrical characteristics of the insulating film. As the water detecting means 43, for example, a Quadruple Mass Spectrometer can be employed. The water detecting means 43 is provided at the air exhaust side of the chamber 41, whereby the water caused by the insulating thin film can be detected comparatively easily.

Figure 18:
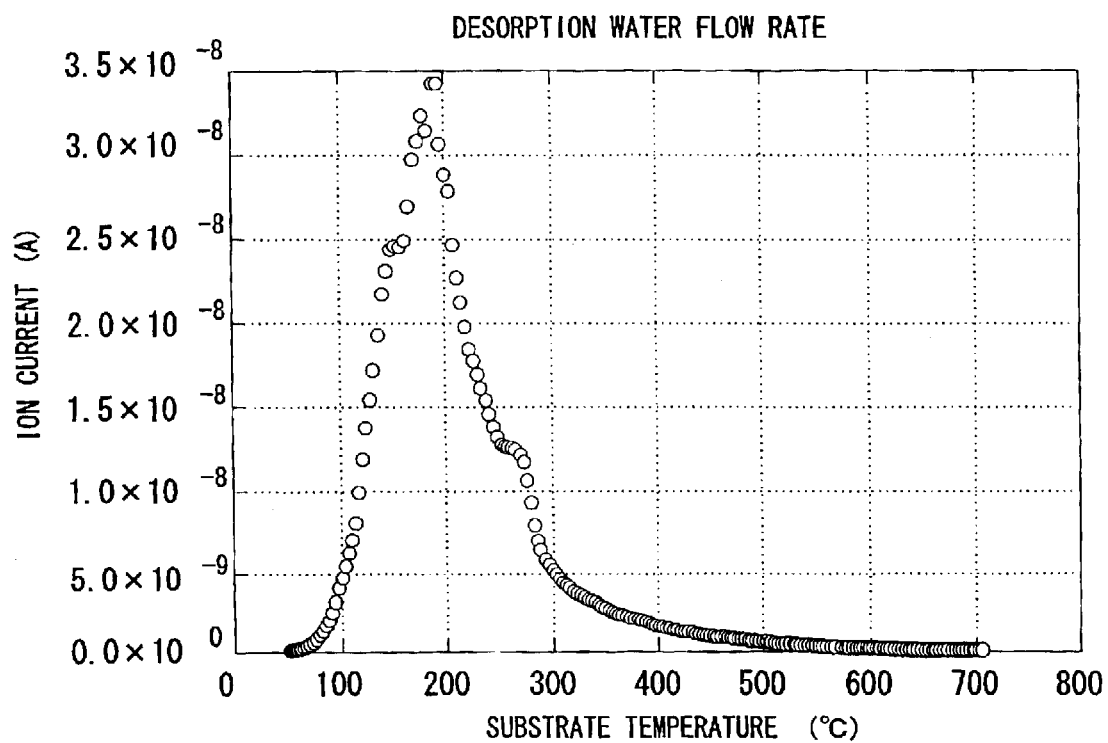
FIG. 18 is a graph showing a measurement result of temperature rise desorbing gas mass spectroscopic analysis, and shows change characteristics of an ionic current relevant to a heating temperature.

FIG. 18 shows a result obtained by measuring change characteristics of the flow rate of water that desorbs from the insulating thin film relevant to the substrate temperature, by employing Thermal Desorption Spectrometry (TDS). In FIG. 18, there is shown that the flow rate of desorbing water is in the form of an ion current. According to the result shown in FIG. 18, it can be believed that the water in the insulating thin film is fully desorbed in a temperature region in which the substrate temperature is 450° C. or more. Such a state can be believed as a substantially water-free state.

By employing such an insulating film forming device, an insulating film capable of improving the dielectric strength and extending service life can be formed with high reproducibility. The first heat treatment device is used together with the second heat treatment device, whereby the first heat treatment and the second heat treatment can be continuously carried out.

In Embodiment 3, although the drift layer 6 contains the grains 51 and silicon nanocrystals 63, this layer may be configured to be free of the grains 51. In Embodiment 3, the insulating thin film is defined as a silicon oxide film. However, the silicon nitride film may be formed instead of the silicon oxide film. In addition, although silicon is employed as a material for the semiconductor crystal, a semiconductor material other than silicon may be employed.

An insulating layer is employed instead of the drift layer 6, whereby there is provided an electron source including: a lower electrode (electrically conductive substrate); a surface electrode; and an insulating layer interposed between the lower electrode and the surface electrode so as to form the above insulating layer in accordance with the above-described method of forming the insulating thin film. In such an electron source, the dielectric strength and service life can be improved as compared with a conventional electron source with MIM type electric field emission rate.

(Embodiment 4)

Hereinafter, Embodiment 4 of the present invention will be described.

Figure 19A:
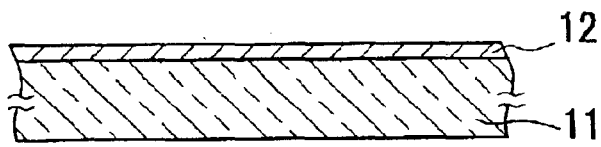
FIG. 19A to FIG. 19G are schematic sectional views each showing an electron source according to Embodiment 4 of the present invention or an intermediate body in the middle of the manufacture, and show a method of manufacturing the electron source.
Figure 19B:
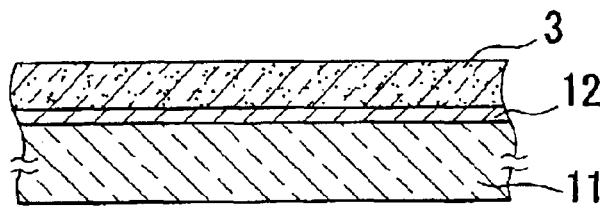
Figure 19C:
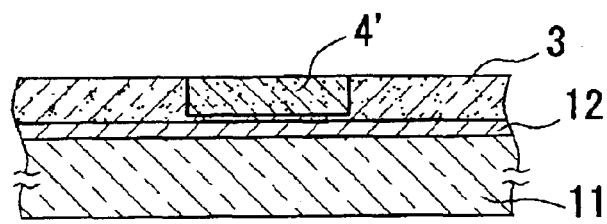
Figure 19D:
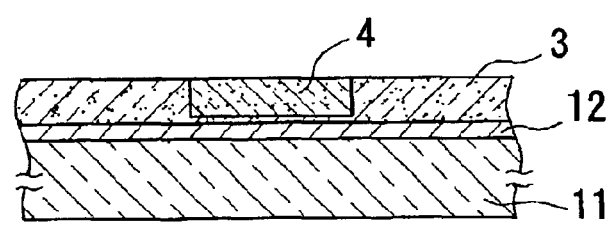
Figure 19E:
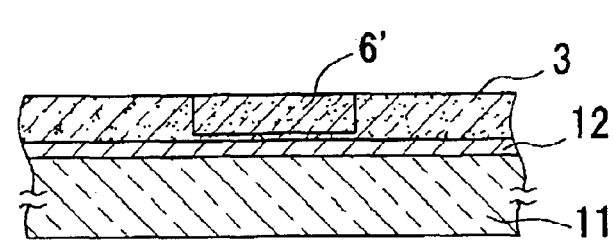
Figure 19F:
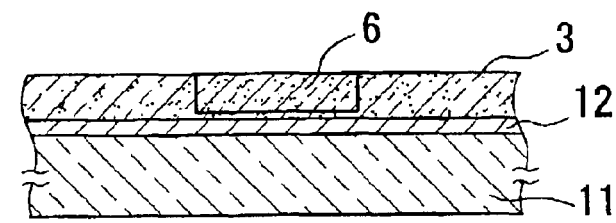
Figure 19G:
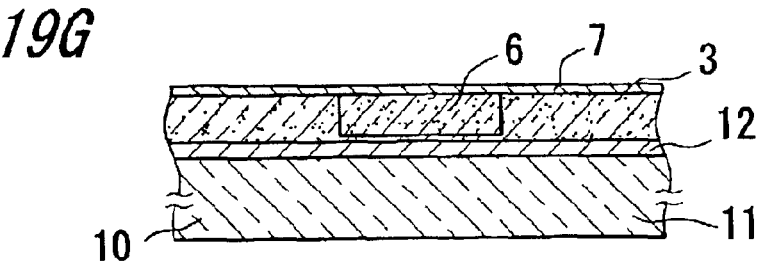

As shown in FIG. 19G, in Embodiment 4, as an electrically conductive substrate, there is employed a substrate on which an electrically conductive layer 12 (for example, a metal film such as chrome film or ITO film) is provided on one surface of an insulating substrate 11 consisting of a glass substrate. In the case where there is thus employed a substrate on which the electrically conductive layer 12 is formed on one surface side of the insulating substrate 11, it is possible to achieve a larger area for an electron source and cost reduction as compared with a case in which a semiconductor substrate is employed as an electrically conductive substrate.

Figure 40:
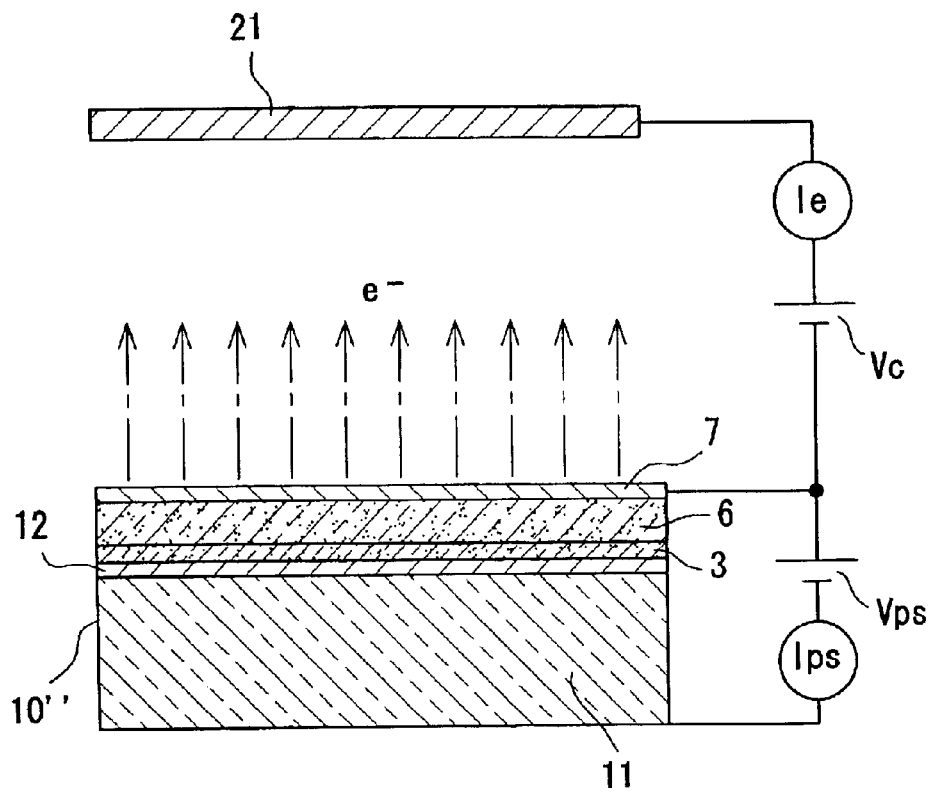
FIG. 40 is a view showing an operation of another conventional electron source.
Figure 41:
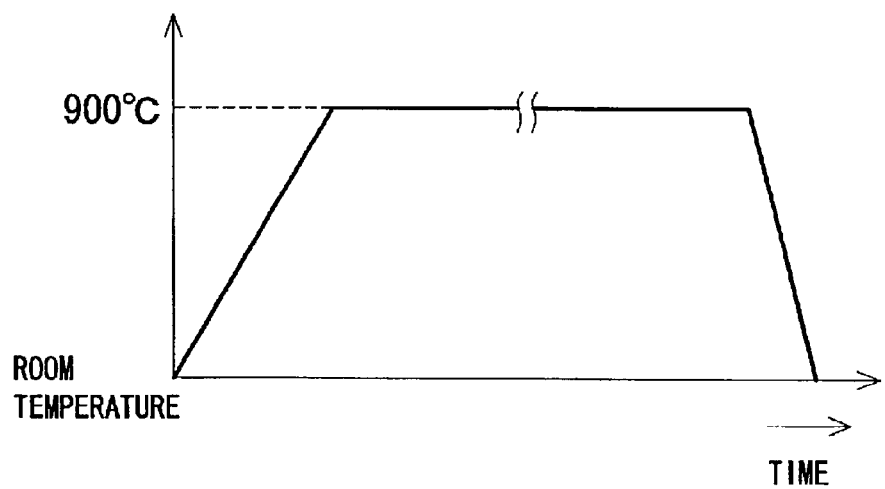
FIG. 41 is a graph depicting a change with an elapse of time, of a heat treatment temperature in a rapid heating technique.

A basic configuration of an electron source 10 according to Embodiment 4 is similar to a conventional electron source 10" shown in FIG. 40. That is, a non-doped polycrystalline silicon layer 3 is formed on the electrically conductive layer 12 on the insulating substrate 11. A drift layer 6 consisting of an oxide porous polycrystalline silicon layer is formed on the polycrystalline silicon layer 3. A surface electrode 7 is formed on the drift layer 6. A material with its small function (for example, gold) is employed for the surface electrode 7. The film thickness of the surface electrode 7 is set to about 3 nm to 15 nm. A structure of the drift layer 6 will be described later. In the electron source 10 shown in FIG. 19G, a part of the polycrystalline silicon layer 3 is interposed between the electrically conductive layer 12 and the drift layer 6. However, the drift layer 6 may be formed on the electrically conductive layer 12 without having the polycrystalline silicon layer 3 being interposed.

A process for emitting an electron from the electron source 10 is similar to that in the case of the conventional electron source 10" shown in FIG. 40. That is, a collector electrode 21 (refer to FIG. 40) is arranged so as to be opposed to the surface electrode 7, and a vacuum state is established between the surface electrode 7 and the collector electrode 21. Then, a direct current voltage Vps is applied between the surface electrode 7 and the electrically conductive layer 12 so that the surface electrode 7 becomes high in potential (positive in polarity) relevant to the electrically conductive layer 12. In addition, a direct current voltage Vc is applied between the collector electrode 21 and the surface electrode 7 so that the collector electrode 21 becomes high in potential relevant to the surface electrode 7. The direct current voltages Vps and Vc each are properly set, whereby the electrons injected from the electrically conductive layer 12 drift in the drift layer 6, and are emitted via the surface electrode 7.

Hereinafter, a method of manufacturing the electron source 10 according to Embodiment 4 will be described with reference to FIG. 19A to FIG. 19G.

First, on one surface side of the insulating substrate 11, an electrically conductive layer 12 is provided in accordance with a sputtering technique, whereby an electrically conductive substrate is formed, and a structure shown in FIG. 19A is obtained Next, a non-doped polycrystalline silicon layer 3 that is a semiconductor layer with its predetermined film thickness (for example, 1.5 μm) is formed (film formed) on one surface side of the electrically conductive substrate, and a structure shown in FIG. 19B is obtained. As a method of film forming the polycrystalline silicon layer 3, there may be employed a CVD technique (such as LPCVD technique, plasma CVD technique, or catalytic CVD technique, for example), a sputtering technique, or CGS (Continuous Grain Silicon) technique or the like.

After the non-doped polycrystalline silicon layer 3 has been formed, a mask material (not shown) for forming a polycrystalline silicon layer 4' described later in a predetermined region only is provided on the polycrystalline silicon layer 3. Then, an anodic oxidization processing vessel containing an electrolytic solution that consists of a mixture solution obtained by mixing 55 wt. % of hydrogen fluoride water solution and ethanol at substantially 1:1 is prepared. Then, with a platinum electrode (not shown) being negative in polarity and the electrically conductive layer 12 being positive in polarity, while light emission is carried out for the polycrystalline silicon layer 3, anodic oxidization processing is carried out under a predetermined condition. In this manner, a porous polycrystalline silicon layer 4' is formed. Then, the mask material is removed, and a structure shown in FIG. 19C is obtained. In the anodic oxidization processing according to Embodiment 4, the anodic oxidization processing period, the power of light emitted to the surface of the polycrystalline silicon layer 3, and the current density are made constant. However, this processing condition may be changed as required (for example, the current density may be changed).

Figure 42:
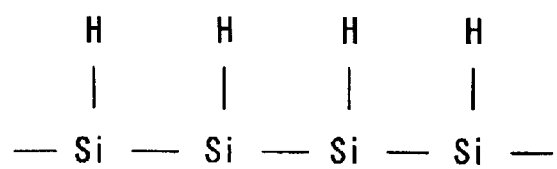
FIG. 42 is a view showing a termination aspect of a top surface of a porous polycrystalline silicon layer after the anodic oxidization processing.
Figure 43:
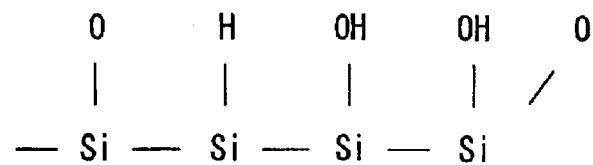
FIG. 43 is a view showing a termination aspect of the top surface of the porous polycrystalline silicon layer after the rapid heating processing.

After anodic oxidization processing has terminated, the porous polycrystalline silicon layer 4' is annealed at 400° C. in $N_2$ gas that is insert gas, whereby a structure shown in FIG. 19D is obtained. "4" in FIG. 19D indicates a porous polycrystalline silicon layer after annealed. Before annealing, the top surface of the porous polycrystalline silicon layer 4' is believed to be terminated by hydrogen atom, as shown in FIG. 42. In addition, it is believed that a fluorine atom is captured in the porous polycrystalline silicon layer 4', and further, water is adsorbed on the surface of the porous polycrystalline silicon layer 4'.

As shown in FIG. 20, by carrying out the above annealing, it is believed that the hydrogen atom, fluorine atom, and water desorb on the top surface of the porous polycrystalline silicon layer 4 after annealing. A temperature when annealing the porous polycrystalline silicon layer 4' may be properly set in the temperature range of 100° C. to 700° C. according to a material for an electrically conductive substrate or a material for a semiconductor layer. Inert gas when the porous polycrystalline silicon layer 4' is annealed is not limited to $N_2$ gas, and Ar gas or the like may be employed, for example.

Next, the porous polycrystalline silicon layer 4 after annealed is electrochemically oxidized in water solution of 1 M of sulfuric acid ($H_2SO_4$), thereby forming a drift layer 6', and a structure shown in FIG. 19G is obtained. The water solution and concentration employed for electrochemical oxidization is not particularly limited. For example, nitric acid water solution or the like may be employed.

After electrochemical oxidization has terminated, the drift layer 6' is annealed at 400° C. in $N_2$ gas that is inert gas, and a structure shown in FIG. 19F is obtained. "6" in FIG. 19F indicates a drift layer 6 after annealed. A temperature when annealing the drift layer 6' may be properly set in the temperature range of 100° C. to 700° C. according to a material for an electrically conductive substrate or a material for a semiconductor layer. Inert gas when annealing the drift layer 6' is not limited to $N_2$ gas, and Ar gas may be employed, for example. In addition, it is not required to anneal the drift layer 6' in inert gas. This annealing may be carried out in a vacuum.

After the drift layer 6 has been formed, the surface electrode 7 consisting of an electrically conductive thin film (for example, gold thin film) is formed on the drift layer 6 in accordance with a vapor deposition technique, for example, and an electron source 10 with its structure shown in FIG. 19F is obtained. A method of forming the surface electrode 7 is not limited to such a vapor deposition technique, and a sputtering technique may be employed, for example.

Figure 39:
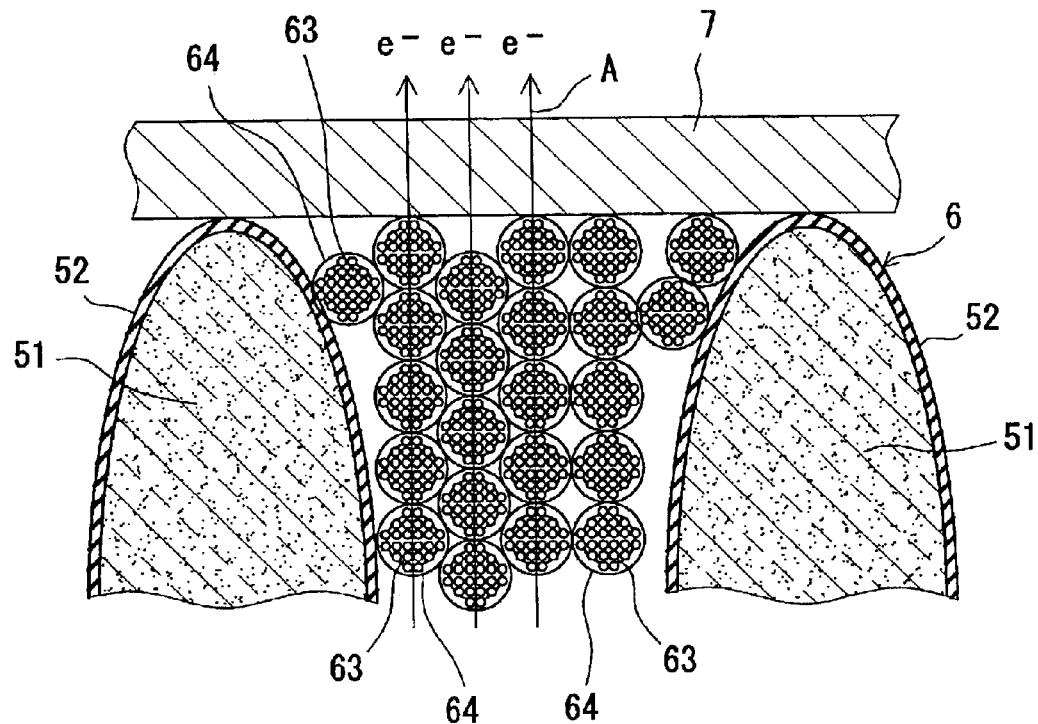
FIG. 39 is a schematic cross section showing the conventional electron source.

The drift layer 6 of the electron source 10 manufactured in accordance with such a manufacturing method is believed to be composed of: at least, columnar polycrystalline silicon grains 51; thin silicon oxide films 52; silicon nanocrystals 63 of nano-meter order; and silicon oxide films 64 as in the conventional electron source drift layer 6" shown in FIG. 39. However, the electron source 10 according to Embodiment 4 is different from the conventional electron source in the following point. That is, in this electron source 10, after the porous polycrystalline silicon layer 4' formed in anodic oxidization processing has been annealed in inert gas, the porous polycrystalline silicon layer 4' formed in accordance with anodic oxidization processing is oxidized, thereby forming the drift layer 6'. Then, the surface electrode 7 is formed after the drift layer 6' has been annealed in inert gas. Thus, a defect caused by impurities such as hydrogen or fluorine contained in the drift layer 6 can be comparatively reduced more remarkably as compared with a case in which the porous polycrystalline silicon layer has been oxidized while water or the like is adsorbed on the porous polycrystalline silicon layer immediately after anodic oxidization processing. Further, a fine oxide film close to a structure of $SiO_2$ or a structure of $SiO_2$ can be formed. In this manner, there can be provided an electron source 10 with a small change with an elapse of time, of electron emission efficiency, a high dielectric strength, and high reliability.

In the above-described manufacturing method, the porous polycrystalline silicon layer 4 after annealed is electrochemically oxidized. Thus, the porous polycrystalline silicon layer 4 after annealed can be oxidized at a comparatively low temperature. However, the step of oxidizing the porous polycrystalline silicon layer 4 after annealed is not limited to the electrochemically oxidizing step. For example, there may be employed: a dry process such as the thermal oxidizing step employing $O_2$ gas; the oxidizing step employing $O_2$ plasma, or the oxidizing step employing ozone. These steps are not a wet process such as electrochemically oxidizing step, and there is no need to always carry out annealing after the oxidizing step. Therefore, the number of steps can be reduced as compared with the case of carrying out electrochemical oxidization. Moreover, annealing processing of the porous polycrystalline silicon layer 4' and oxidization processing of the porous polycrystalline silicon layer 4 after annealed can be continuously carried out in a lamp annealing device, for example.

In Embodiment 4, as an electrically conductive substrate, there is employed a substrate on which an electrically conductive layer 12 is formed on one surface of the insulating substrate 11 consisting of a glass substrate. However, a metal substrate made of chrome or the like may be employed as an electrically conductive substrate. In addition, there may be employed a semiconductor substrate (such as an n-type silicon substrate whose resistivity is comparatively close to that of a conductor or p-type silicon substrate on which an n-type region is formed as an electrically conductive layer on one surface side, for example). As an insulating substrate 11, a ceramic substrate or the like as well as glass substrate can be employed.

In Embodiment 4, gold is employed as a material for the surface electrode 7. However, a material for the surface electrode 7 is not limited to gold, and there may be employed aluminum, chrome, tungsten, nickel, or platinum and the like, for example. In addition, the surface electrode 7 may be composed of at least two-layered thin film layer deposited in the thickness direction. In the case where the surface electrode 7 is composed of a two-layered thin film layer, for example, gold or the like can be employed as a material for an upper thin film layer. As a material for a lower thin film layer (thin film at the drift layer 6 side), for example, there can be employed chrome, nickel, platinum, titanium, indium or the like.

In addition, in Embodiment 4, the drift layer 6 is composed of the oxidized porous polycrystalline silicon layer. However, the drift layer 6 may be composed of an oxidized porous single-crystalline silicon or other oxidized porous semiconductor layer.

(Embodiment 5)

Hereinafter, Embodiment 5 of the present invention will be described.

Figure 21A:
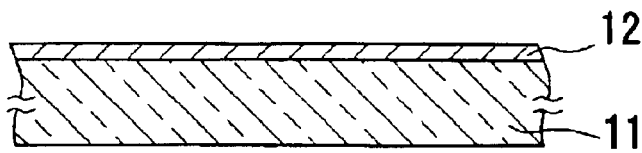
FIG. 21A to FIG. 21F are schematic cross sections each showing an electron source according to Embodiment 5 of the present invention or an intermediate body in the middle of its manufacture, and show a method of manufacturing the electron source.
Figure 21B:
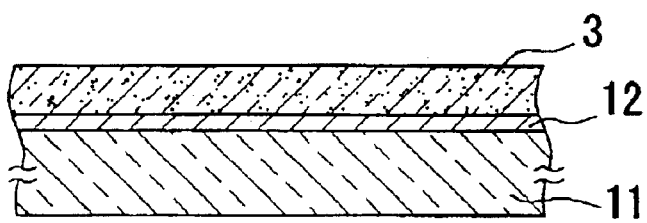
Figure 21C:
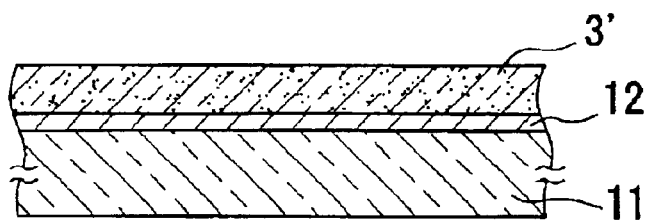
Figure 21D:
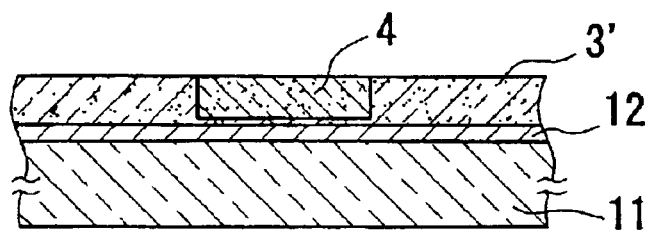
Figure 21E:
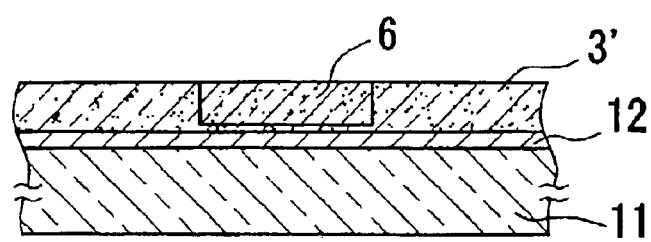
Figure 21F:
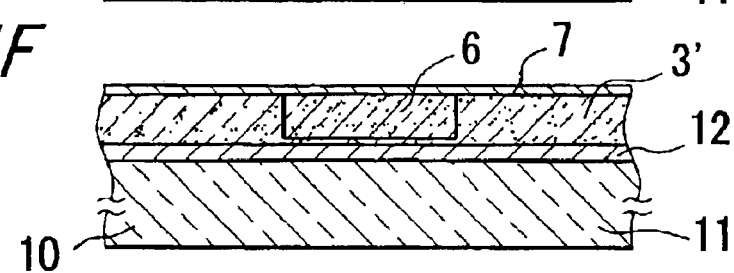

As shown in FIG. 21F, in Embodiment 5, as an electrically conductive substrate, there is employed a substrate on which an electrically conductive layer 12 (for example, a metal film such as chrome film, titanium film, tungsten film and the like, and a number of kinds of the laminated films of a metal film, or ITO film and the like) is provided on one surface of an insulating substrate 11 consisting of a glass substrate. In the case where there is thus employed a substrate on which the electrically conductive layer 12 is formed on one surface side of the insulating substrate 11, it is possible to achieve a larger area for an electron source and cost reduction as compared with a case in which a semiconductor substrate is employed as an electrically conductive substrate.

A basic configuration of an electron source 10 according to Embodiment 5 is similar to a conventional electron source 10" shown in FIG. 40. That is, a non-doped polycrystalline silicon layer 3 is formed on the electrically conductive layer 12 on the insulating substrate 11. A drift layer 6 consisting of an oxide porous polycrystalline silicon layer is formed on the polycrystalline silicon layer 3. A surface electrode 7 is formed on the drift layer 6. A material with its small function (for example, gold) is employed for the surface electrode 7. The film thickness of the surface electrode 7 is set to about 10 nm to 15 nm. A structure of the drift layer 6 will be described later. In the electron source 10 shown in FIG. 21F, a part of the polycrystalline silicon layer 3 is interposed between the electrically conductive layer 12 and the drift layer 6. However, the drift layer 6 may be formed on the electrically conductive layer 12 without having the polycrystalline silicon layer 3 being interposed.

A process for emitting an electron from the electron source 10 is similar to that in the case of the conventional electron source 10" shown in FIG. 40. That is, a collector electrode 21 (refer to FIG. 40) is arranged so as to be opposed to the surface electrode 7, and a vacuum state is established between the surface electrode 7 and the collector electrode 21. Then, a direct current voltage Vps is applied between the surface electrode 7 and the electrically conductive layer 12 so that the surface electrode 7 becomes high in potential (positive in polarity) relevant to the electrically conductive layer 12. In addition, a direct current voltage Vc is applied between the collector electrode 21 and the surface electrode 7 so that the collector electrode 21 becomes high in potential relevant to the surface electrode 7. The direct current voltages Vps and Vc each are properly set, whereby the electrons injected from the electrically conductive layer 12 drift in the drift layer 6, and are emitted via the surface electrode 7.

Hereinafter, a method of manufacturing the electron source 10 according to Embodiment 5 will be described with reference to FIG. 21A to FIG. 21F.

First, on one surface side of an insulating substrate 11, an electrically conductive layer 12 is provided in accordance with a sputtering technique, thereby forming an electrically conductive substrate, and a structure shown in FIG. 21A is obtained. Then, on one surface side (that is, on an electrically conductive layer 12) of the electrically conductive substrate, a polycrystalline silicon layer 3 of predetermined film thickness (for example, 1.5 $\mu$m) is formed (film formed) as a layered semiconductor layer consisting of polycrystalline silicon that is a polycrystalline semiconductor, and a structure shown in FIG. 21B is obtained. As a method of film forming the polycrystalline silicon layer 3, for example, there may be employed a CVD technique (such as LPCVD technique, plasma CVD technique, or catalytic CVD technique, for example), a sputtering technique, or a CGS (Continuous Grain Silicon) technique. When the film forming temperature is set to 600° C. or less, as an insulating substrate 11, for example, there can be employed a comparatively inexpensive glass substrate such as non-alkali glass substrate, low alkali glass substrate, soda lime glass substrate, and cost reduction can be achieved.

After the non-doped polycrystalline silicon layer 3 has been formed, the polycrystalline silicon layer 3 is subjected to annealing at a predetermined time (for example, 1 hour) at a predetermined annealing temperature (for example, 100° C. to 700° C., and desirably 500° C. to 600° C.) in $N_2$ gas that is inert gas. In this manner, the crystalline properties are improved, a defect is reduced, and a structure shown in FIG. 21C is obtained. 3' in FIG. 21C indicates a polycrystalline silicon layer after annealed. In Embodiment 5, a polycrystalline silicon layer 3' after annealed configures a polycrystalline semiconductor layer. Inert gas when annealing the polycrystalline silicon layer 3 is not limited to $N_2$ gas, and Ar gas may be employed, for example. The polycrystalline silicon layer 3 may not be annealed in inert gas, and may be annealed in a vacuum. When annealing is carried out in inert gas or vacuum, inert impurities can be restricted from being introduced into the polycrystalline silicon layer 3 during annealing. It is desirable that the temperature in annealing the polycrystalline silicon layer 3 be set at a comparatively high temperature considering a heat resistance temperature such as a material for an electrically conductive substrate.

After annealing has been carried out, a mask material (not shown) for forming the porous polycrystalline silicon layer 4 in a predetermined region only is provided on the polycrystalline silicon layer 3'. Then, an anodic oxidization processing vessel containing an electrolytic solution that consists of a mixture solution obtained by mixing 55 wt. % of hydrogen fluoride water solution and ethanol at substantially 1:1 is prepared. Then, with a platinum electrode (not shown) being negative in polarity and the electrically conductive layer 12 being positive in polarity, while light emission is carried out for the polycrystalline silicon layer 3, anodic oxidization processing is carried out under a predetermined condition. In this manner, a porous polycrystalline silicon layer 4' is formed. Then, the mask material is removed, and a structure shown in FIG. 21D is obtained. In the anodic oxidization processing according to Embodiment 5, the anodic oxidization processing period, the power of light emitted to the surface of the polycrystalline silicon layer 3, and the current density are made constant. However, this processing condition may be changed as required (for example, the current density may be changed).

After anodic oxidization processing has terminated, the porous polycrystalline silicon layer 4' is electrochemically oxidized in water solution of 1M of sulfuric acid ($H_2SO_4$), thereby forming a drift layer 6' and a structure shown in FIG. 21E is obtained. The water solution and concentration employed for electrochemical oxidization is not particularly limited. For example, the nitric acid water solution or the like may be employed.

After the drift layer 6 has been formed, a surface electrode 7 consisting of an electrically conductive thin film (for example, gold thin film) is formed on the drift layer 6 in accordance with a vapor deposition technique, for example, and an electron source 10 shown in FIG. 2 IF is obtained. A method of forming the surface electrode 7 is not limited to the vapor deposition technique, and a sputtering technique may be employed, for example.

The drift layer 6 of the electron source 10 manufactured by such a manufacturing method is believed to be composed of: at least, polycrystalline silicon grains 51; thin silicon oxide films 52; silicon nanocrystals 63 of nano-meter order; and silicon oxide films 64 as in a drift layer 6" of the conventional electron source shown in FIG. 39. However, the electron source 10 according to Embodiment 5 is different from the conventional electron source in the following point. That is, in the electron source 10, after annealing the polycrystalline silicon layer 3, the porous polycrystalline silicon layer 4 formed in accordance with anodic oxidization processing is oxidized, thereby forming the drift layer 6. Thus, a polycrystalline silicon layer 3' that is a polycrystalline silicon layer is formed by annealing the polycrystalline silicon layer 3 that is a layered semiconductor layer.

In this manner, while the polycrystalline silicon layer 3' is formed at a comparatively low temperature (600° C. or less), a compound layer or alloy layer consisting of a semiconductor and a metal can be formed with the crystalline properties of the polycrystalline silicon layer 3' being on a critical surface between the polycrystalline silicon layer 3 the electrically conductive layer 12. In addition, the polycrystalline silicon layer 3 is almost crystallized on the critical surface, and a low resistance can be achieved as compared with the conventional polycrystalline silicon layer 3 formed at a comparatively low temperature. As this result, a barrier layer or high resistance layer between the polycrystalline silicon layer 3 and the electrically conductive layer 12 can be reduced. Thus, there can be provided an electron source 10 capable of improving electron emission efficiency and reliability. In the electron source 10 manufactured in accordance with such a manufacturing method, as in a conventional electron source 10' shown in FIG. 38, an electron can be constantly emitted while the dependency of degree of vacuum in electron emission characteristics is small, and while a popping phenomenon is not generated during electron emission.

Figure 22A:
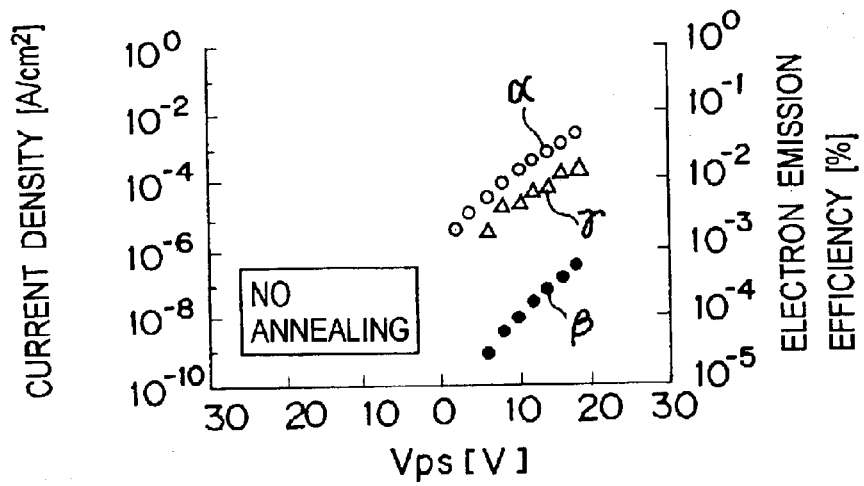
FIG. 22A to FIG. 22C are graphs depicting change characteristics of a current density of an electron source relevant to the direct current voltage Vps when the annealing processing is not carried out, when the annealing processing is carried out at 500° C., and when the annealing processing is carried out at 550° C., respectively.
Figure 22B:
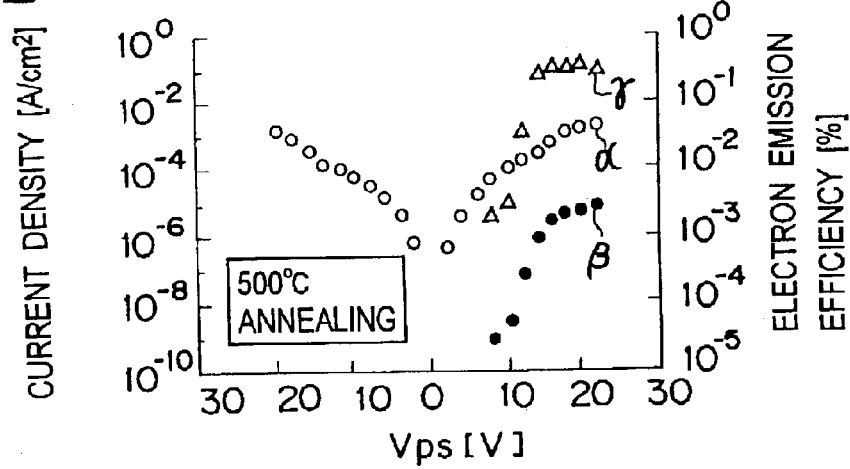
Figure 22C:
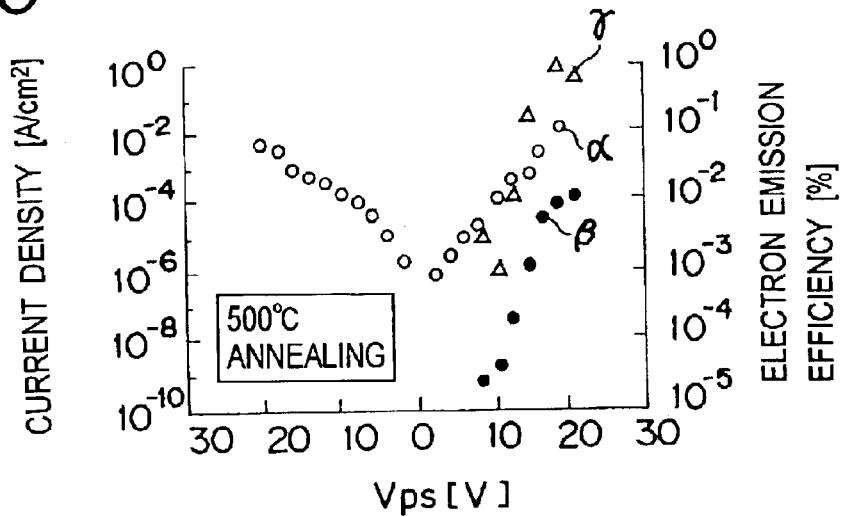

FIG. 22A to FIG. 22C each show a result obtained when electron emission characteristics (such as emission current Ie or electron emission efficiency) have been measured with respect to the electron source 10 manufactured in accordance with the conventional electron source 10" (refer to FIG. 40) and the electron source manufactured in accordance with the manufacturing method according to Embodiment 5. FIG. 22A shows a measurement result of the conventional electron source 10" (Conventional example: No annealing). FIG. 22B shows a measurement result of the electron source 10 according to Embodiment 5 when an annealing temperature is set to 500° C. (Embodiment 1). FIG. 22C shows a measurement result of the electron source 10 according to Embodiment 5 when an annealing temperature is set to 550° C. (Embodiment 2).

The horizontal axis of FIG. 22A to FIG. 22C indicates the direct current voltage Vps, and the vertical axis on the left side indicates the current density. "α" indicates the current density of the diode current Ips, and "β" indicates the current density of the emission current Ie. In addition, the vertical axis on the left side of FIG. 22A to FIG. 22C each indicates the electron emission efficiency. "γ" indicates electron the emission efficiency. The direct current voltage Vc is 100V which is constant. The electron emission efficiency is a value obtained as (Ie/Ips)×100[%]. In any of the prior art, Example 1 and Example 2, the polycrystalline silicon layer 3 was deposited on the electron conductive substrate in accordance with a plasma CVD technique.

Referring to FIG. 22A to FIG. 22C, in Examples 1 and 2 in which annealing was carried out, it is found that the emission current Ie and electron emission efficiency is significantly improved as compared with the prior art in which no annealing was carried out. In addition, in comparing Example 1 with Example 2, it is found that Example 2 in which an annealing temperature is high is improved as compared with Example 1 in both of emission current Ie and electron emission efficiency.

In the above-described manufacturing method, a layered semiconductor layer is composed of the polycrystalline silicon layer 3 consisting of polycrystalline silicon. However, such a layered semiconductor layer may be composed of a semiconductor nanocrystal such as silicon nanocrystal, for example. In this case, after forming a layered semiconductor layer consisting of a silicon nanocrystal, the semiconductor layer is polycrystallized by annealing, whereby the polycrystalline silicon layer 3' may be formed.

In Embodiment 5, as an electrically conductive substrate, there is employed a substrate on which an electrically conductive layer 12 is formed on one surface of an insulating substrate 11 consisting of a glass substrate. However, as an electrically conductive substrate, a metal substrate made of chrome or the like may be employed. Alternatively, there may be employed a semiconductor substrate (for example, n-type silicon substrate layer whose resistivity is comparatively close to that of a conductor or p-type silicon on which n-type region is formed as an electrically conductive layer on one surface side). As an insulating substrate 11, a ceramic substrate or the like as well as a glass substrate can be employed.

In Embodiment 5, gold is employed as a material for the surface electrode 7. However, the material for the surface electrode 7 is not limited to gold, and aluminum, chrome, tungsten, nickel, platinum or the like may be employed, for example.

In addition, the surface electrode 7 may be composed of at least two-layered thin film layer deposited in the thickness direction. In this case, gold or the like, for example, can be employed as a material for an upper thin film layer. Chrome, nickel, platinum, titanium, or indium and the like can be employed as a material for a lower thin film layer (thin film layer on the drift layer 6 side).

In Embodiment 5, the drift layer 6 is composed of an oxide porous polycrystalline silicon layer. However, the drift layer 6 may be composed of the other oxide porous polycrystalline semiconductor layer.

(Embodiment 6)

Hereinafter, Embodiment 6 of the present invention will be described.

As shown in FIG. 23, in an electron source 10 according to Embodiment 6, as an electrically conductive substrate, there is employed a single-crystalline n-type silicon substrate 1 whose resistivity is comparatively close to a resistivity of a conductor (for example, a (100) substrate whose resistivity is 0.01 Ωcm to 0.02 Ωcm).

In this electron source 10, a drift layer 6 consisting of an oxide porous polycrystalline silicon layer is formed on a main surface side of an n-type silicon substrate 1. A surface electrode 7 is formed on the drift layer 6. An ohmic electrode 2 is formed on the back surface of the n-type silicon substrate 1. A lower electrode 12 is composed of the n-type silicon substrate 1 and ohmic electrode 2. Therefore, the surface electrode 7 is opposed to the lower electrode 12, and the drift layer 6 is interposed between the lower electrode 12 and the surface electrode 7.

The surface electrode 7 may be formed of metal films and laminated films of these metal films, each of which consists of a chemically stable metal with its small work function and high oxidization resistance such as gold (Au), platinum (Pt), or chrome (Cr), for example. The thickness of the surface electrode 7 may be set in the range of about 3 nm to 15 nm.

The configuration and function of the drift layer 6 is similar to those of Embodiment 1. That is, the drift layer 6 is composed of, at least, grains 51, silicon oxide films 52, a number of silicon nanocrystals 63, and a number of silicon oxide films 64 (refer to FIG. 1). In addition, in the drift layer 6, the surface of each grain is made porous, and a crystalline state is maintained at the center portion of each grain. Each grain 51 extends in the thickness direction of the lower electrode 12. In addition, a detailed description of the insulating films 52 and 64 will be given when a description of a manufacturing method which will be described later is given.

As shown in FIG. 24, in an electron source 10 according to Embodiment 6 as well, it is believed that electron emission occurs in a model similar to a case of the electron source 10 according to Embodiment 1 or Embodiment 3 That is, the direct current voltage Vps is applied between the surface electrode 7 and the lower electrode 12, and the direct current voltage Vc is applied between the collector electrode 21 (for example, a transparent electrically conductive film such as ITO film) and the surface electrode 7 with the collector electrode 21 being positive in polarity, whereby the electrons "e-" injected from the lower electrode 12 into the drift layer 6 in accordance with thermal excitation drift, tunnel the surface electrode 7, and are emitted into the vacuum.

Hereinafter, a method of manufacturing the electron source 10 according to Embodiment 6 will be described with reference to FIG. 25A to FIG. 25D.

Figure 25A:
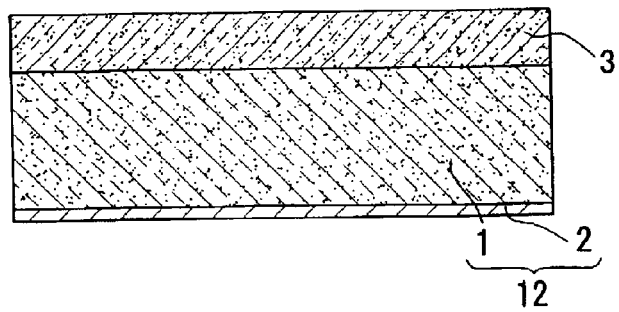
FIG. 25A to FIG. 25D are schematic cross sections each showing the electron source according to Embodiment 6 of the present invention or an intermediate body in the manufacture, and show a method of manufacturing the electron source.

First, an ohmic electrode 2 is formed on the back surface of an n-type silicon substrate 1. Then, the film forming step of forming a non-doped polycrystalline silicon layer 3 as a semiconductor layer on a main surface (one surface) of the n-type silicon substrate 1 is carried out, and a structure shown in FIG. 25A is obtained. As a method of film forming the polycrystalline silicon layer 3, for example, there may be employed a CVD technique (such as LPCVD technique, plasma CVD technique, or catalytic CVD technique, for example), a sputtering technique, or a CGS (Continuous Grain Silicon) technique or the like.

Figure 25B:
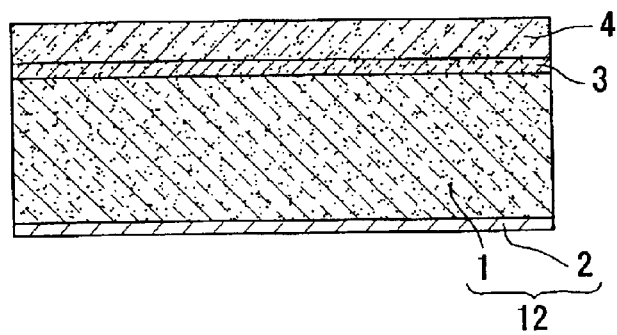

After the non-doped polycrystalline silicon layer 3 has been formed, the polycrystalline silicon layer 3 is made porous in accordance with the anode oxidization processing step. In this manner, a porous polycrystalline silicon layer 4 that is a porous semiconductor layer is formed, and a structure shown in FIG. 25B is obtained. The porous polycrystalline silicon layer 4 formed by the anode oxidization processing step contains a number of grains 51 of polycrystalline silicon (refer to FIG. 1) and a number of silicon nanocrystals 63 (refer to FIG. 1). In the anodic oxidization processing step, there is employed an anodic oxidization processing vessel that contains an electrolytic solution consisting of a mixture solution obtained by mixing 55 wt. % of hydrogen fluoride water solution and ethanol at substantially 1:1. Then, while light emission is carried out on the surface of the polycrystalline silicon layer 3 by a light source consisting of a 500W tungsten lamp, a current is supplied between the lower electrode 12 and a cathode consisting of a platinum electrode. In this manner, the polycrystalline silicon layer 3 is made porous to a predetermined depth from the main surface (in Embodiment 6, although this layer is set a depth which does not reach the lower electrode 12, it may be set to a depth which reaches the lower electrode 12)

Figure 25C:
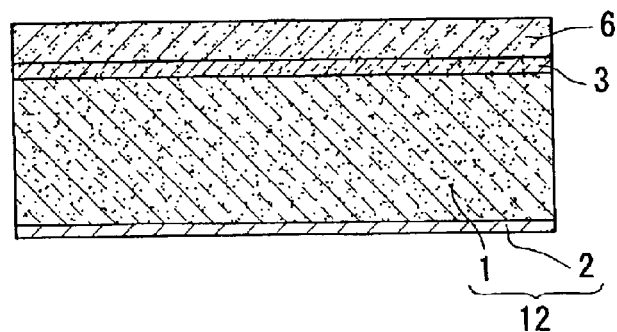

After the anodic oxidization processing step has terminated, rinsing is carried out using ethanol. Then, the insulating film forming step of forming the insulating films 52 and 64 on the surface of each grain 51 and each silicon nanocrystal 63 contained in the porous polycrystalline silicon layer 4 is carried out. In this manner, a drift layer 6 containing the grains 51, silicon nanocrystals 63, and the insulating films 52 and 64 is formed, and a structure shown in FIG. 25C is obtained. The insulating film forming step will be described later.

Figure 25D:
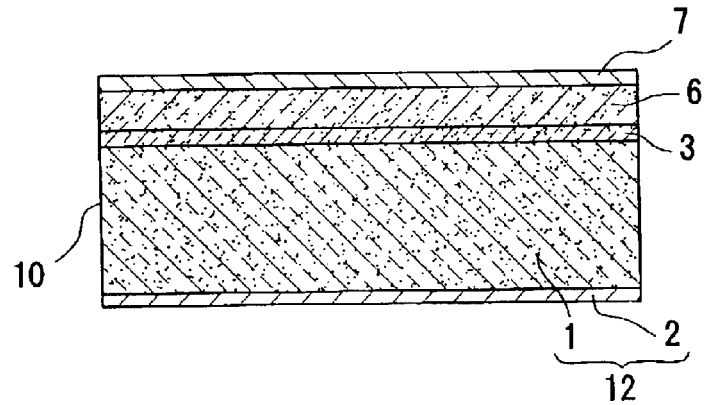

After the drift layer 6 has been formed, the surface electrode 7 consisting of a metal layer (for example, gold) is formed in accordance with a vapor deposition technique, and a electron source 10 with its structure shown in FIG. 25D is obtained. In Embodiment 6, the surface electrode 7 is formed in accordance with the vapor deposition technique. However, a method of forming the surface electrode 7 is not limited to the vapor deposition technique, and a sputtering technical may be employed, for example.

In the insulating film forming step, oxidization processing and nitriding processing are carried out. In the oxidization processing, an oxide film (silicon oxide film) with film thickness to an extent such that an electron tunneling phenomenon occurs on the surface of each silicon nanocrystal 63 (thin film that is smaller than the crystalline particle size of the silicon nanocrystal 63) is formed in accordance with processing capable of restricting an occurrence of the damage to each silicon nanocrystal 63. In nitriding processing, the film quality of each oxide film (silicon oxide film) is improved in accordance with processing capable of restricting an occurrence of the damage to each silicon nanocrystal 63.

The oxidization processing consists of the oxidizing step of forming an oxide film with film thickness to an extent such that an electron tunneling phenomenon occurs on the surface of each silicon nanocrystal 63 at a heat treatment time (hereinafter, referred to as "first predetermined heat treatment time") capable of restricting an occurrence of the damage to each silicon nanocrystal 63 in accordance with the rapid thermal oxidization technique. In this oxidizing step, by employing a lamp annealing device, for example, in oxygen gas atmosphere, oxidization is carried out at a first predetermined heat treatment temperature (for example, 900° C.) by the first predetermined heat treatment time (for example, 5 minutes). That is, the first predetermined heat treatment time is remarkably reduced as compared with a predetermined heat treatment time (1 hour) in accordance with the oxidizing step using the conventional rapid heat oxidization technique. It is verified that the first predetermined heat treatment time is desirable set within 5 minutes from a measurement result of electron emission characteristics of the manufactured electron source 10. However, the temperature rise velocity of a temperature rise period in which a substrate temperature is risen to the first predetermined heat treatment temperature is set to 20° C./sec or more, and desirably to 150° C./sec or more.

The nitriding processing consists of the nitriding step of nitriding each oxide film at a heat treatment time (hereinafter, referred to as "second predetermined heat treatment time") capable of restricting an occurrence of the damage to each silicon nanocrystal 63 in accordance with the rapid heat nitriding technique. In this nitriding step, by employing a lamp annealing device, for example, in $N_2O$ gas atmosphere, nitriding is carried out at a second predetermined heat treatment temperature (for example, 900° C.) for a second predetermined heat treatment time (for example, 5 minutes). It is verified that the second predetermined heat treatment time is desirably set within 5 minutes from a measurement result of electron emission characteristics of the manufactured electron source 10. However, the temperature rise temperature of the temperature rise period in which a substrate temperature is risen to the second specified heat treatment temperature is set to 20° C./sec or more, desirably to 150° C./sec or more. In Embodiment 6, $N_2O$ gas is employed in the nitriding step, and thus, oxidization advances at the same time when each oxide film is nitride. As a result, the insulating films 52 and 64 each are provided as an oxi-nitride film (silicon oxi-nitride film). The gas employed in the nitriding step is not limited to $N_2O$ gas, and a gas containing NO gas, $NH_3$ gas, or $N_2$ gas may be employed, for example.

According to this manufacturing method, in the insulating film forming step of forming the insulating films 52 and 64, an oxide film with film thickness to an extent such that an electron tunneling phenomenon occurs on the surface of each silicon nanocrystal 63 in accordance with processing capable of restricting an occurrence of the damage to each silicon nanocrystal 63. In addition, an oxide film is formed on the surface of the grain 51, and each oxide film is nitride in accordance with processing capable of restricting an occurrence of the damage to each silicon nanocrystal 63, thereby improving the film quality. Thus, the stability with an elapse of time, of the electron emission characteristics, is improved as compared with the case in which the insulating films 52 and 64 each are formed within a comparatively long heat treatment time (for example, 1 hour) in accordance with the rapid thermal oxidation technique as in the prior art. Moreover, the heat treatment time at a high temperature caused by forming the insulating films 52 and 64 can be reduced. Thus, in the case where the lower electrode 12 is formed on the insulating substrate 11 such as a glass substrate as in the conventional electron source 10" shown in FIG. 40, it becomes possible to employ as a glass substrate a non-alkali glass substrate which is comparatively inexpensive as compared with a quartz glass or a glass substrate with its comparatively low heat resistance temperature such as low alkali glass substrate, and cost reduction can be achieved. In Embodiment 6, oxidization processing and nitriding processing can be carried out in the same device, thus making it possible to prevent impurities from adhering between the oxidization processing and the nitriding processing.

Figure 26:
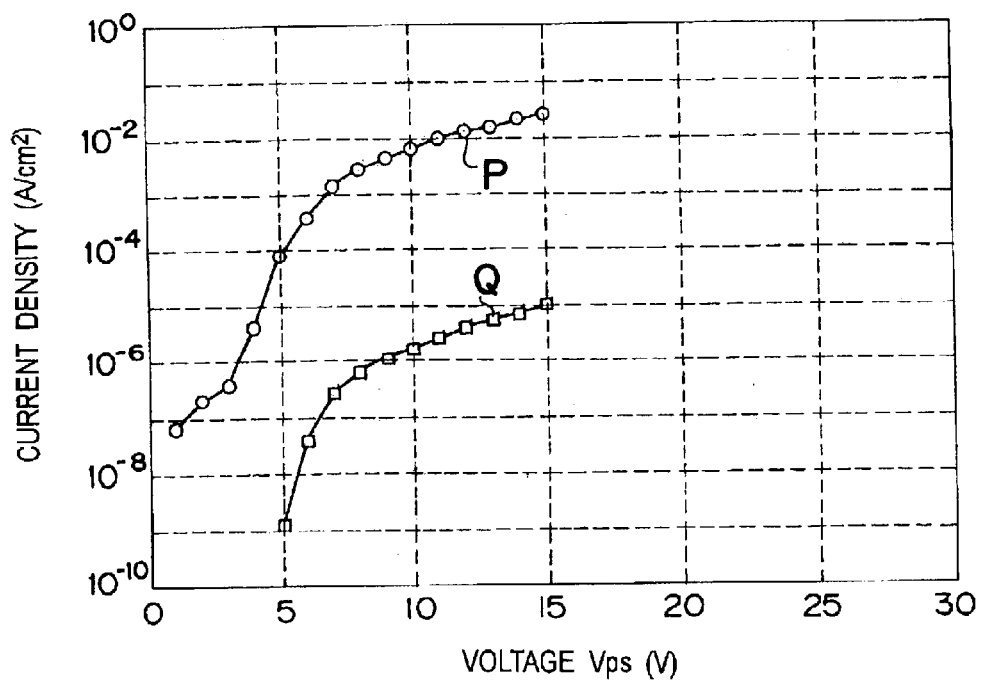
FIG. 26 is a graph depicting change characteristics of the current density relevant to the direct current voltage Vps in the electron source shown in FIG. 23.
Figure 27:
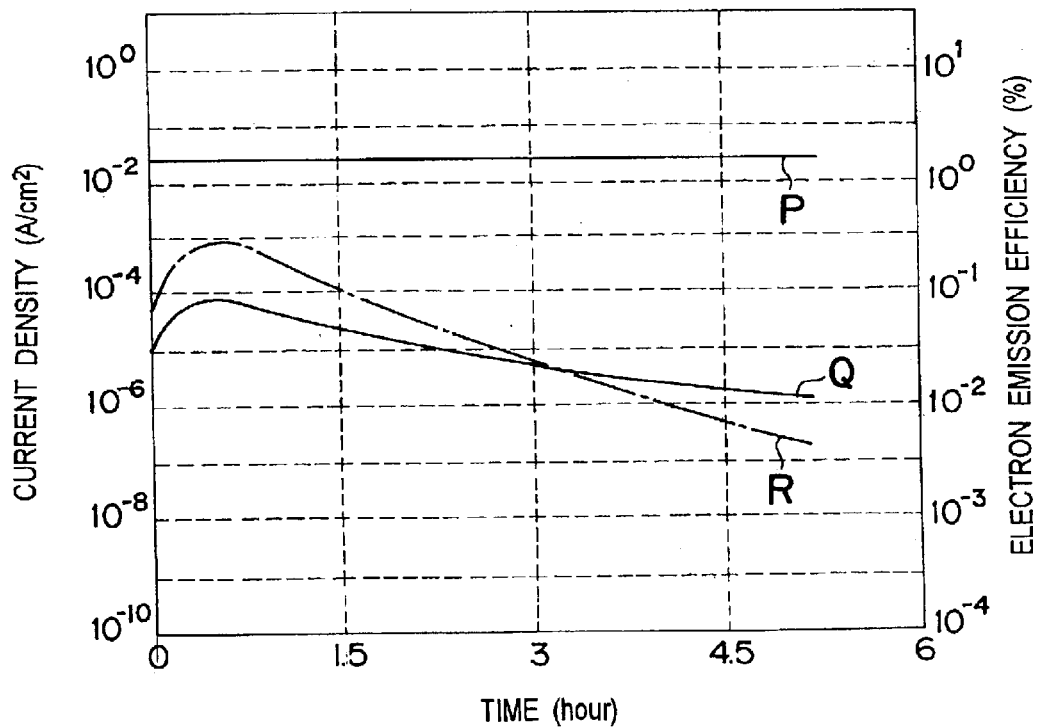
FIG. 27 is a graph depicting change characteristics of the current density relevant to a time in the electron source shown in FIG. 23.

FIG. 26 and FIG. 27 each show a result obtained by measuring electron emission characteristics of the electron source 10 manufactured in accordance with the above-described manufacturing method and a change with an elapse of time, of electron emission characteristics.

Figure 28:
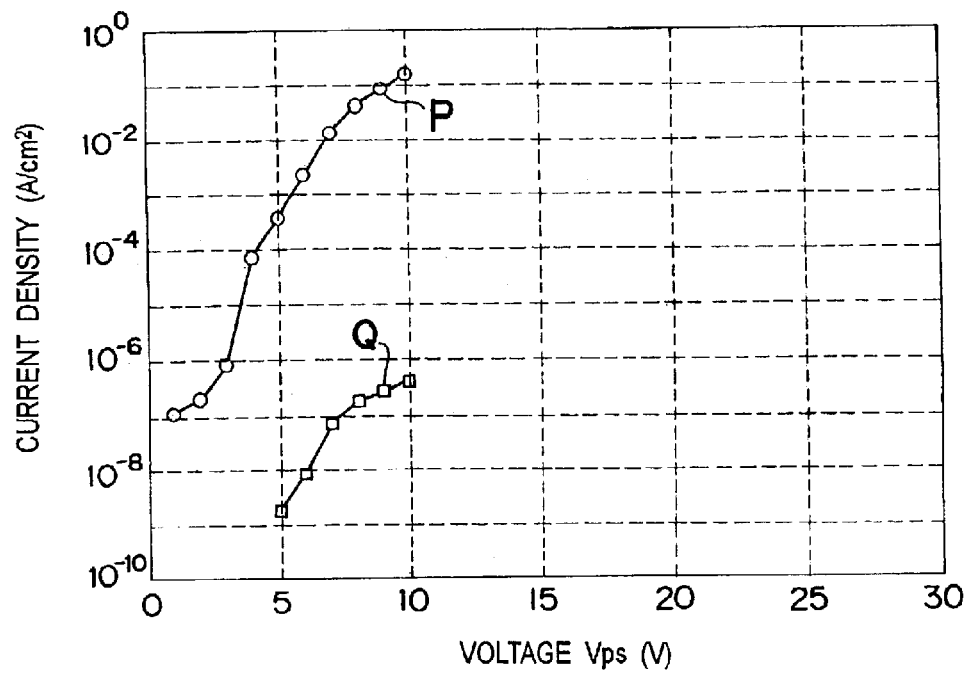
FIG. 28 is a graph depicting change characteristics of the current density relevant to the direct current voltage Vps in an electron source according Comparative Example.
Figure 29:
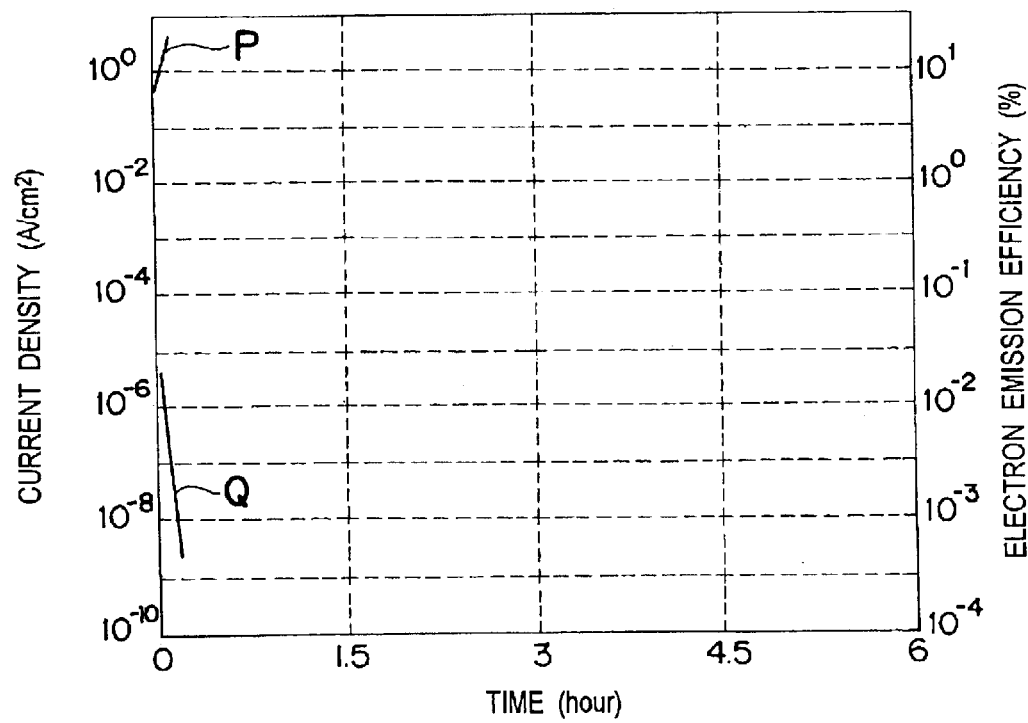
FIG. 29 is a graph depicting change characteristics of the current density relevant to a time in an electron source according to Comparative Example identical to the case of FIG. 28.

FIG. 28 and FIG. 29 show a result by measuring: the electron emission characteristics of an electron source according to Comparative Example 1 in which a heat treatment temperature is set to 900° C. by employing only the rapid thermal nitriding technique in the insulating film forming step, and the heat treatment time is set to 5 minutes; and the change with an elapse of time, of electron emission characteristics.

Figure 30:
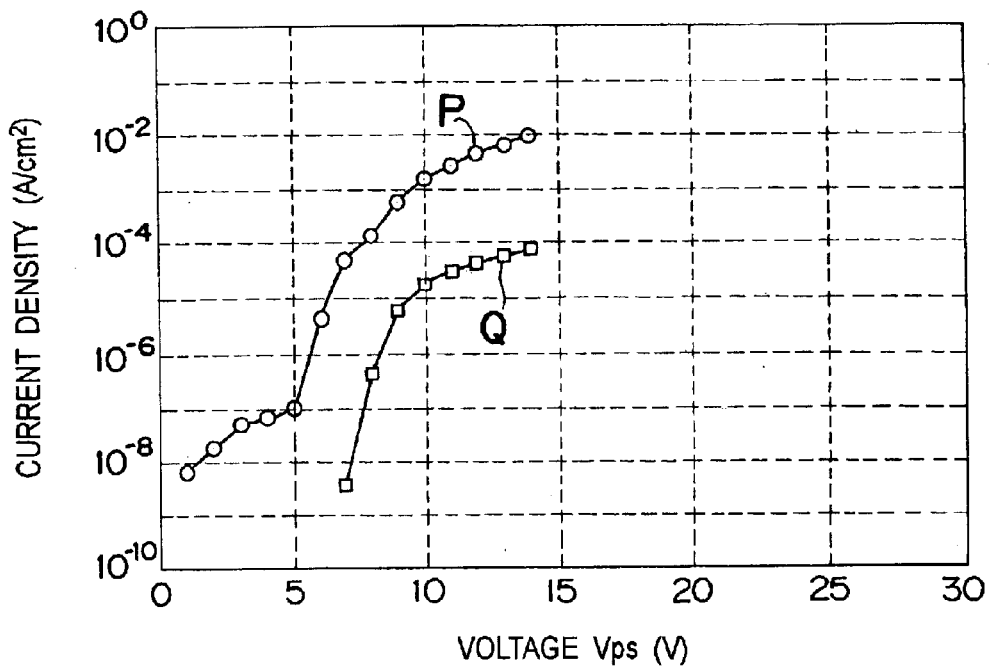
FIG. 30 is a graph depicting change characteristics of the current density relevant to the direct current voltage Vps in an electron source according another Comparative Example.
Figure 31:
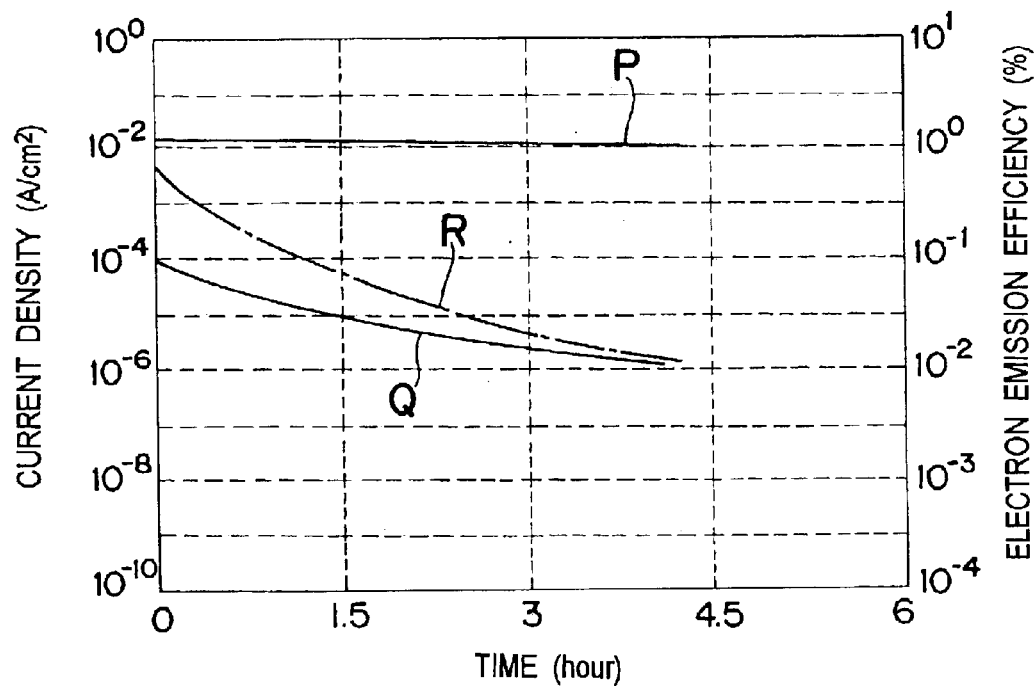
FIG. 31 is a graph depicting change characteristics of the current density relevant to a time in an electron source according to Comparative Example identical to the case of FIG. 30.

FIG. 30 and FIG. 31 each show a result by measuring: the electron emission characteristics of an electron source according to Comparative Example 2 in which a heat treatment temperature is set to 900° C. by employing only the rapid thermal nitriding technique in the insulating film forming step, and a heat treatment time is set to 60 minutes; and a change with an elapse of time, of electron emission characteristics.

Figure 38:
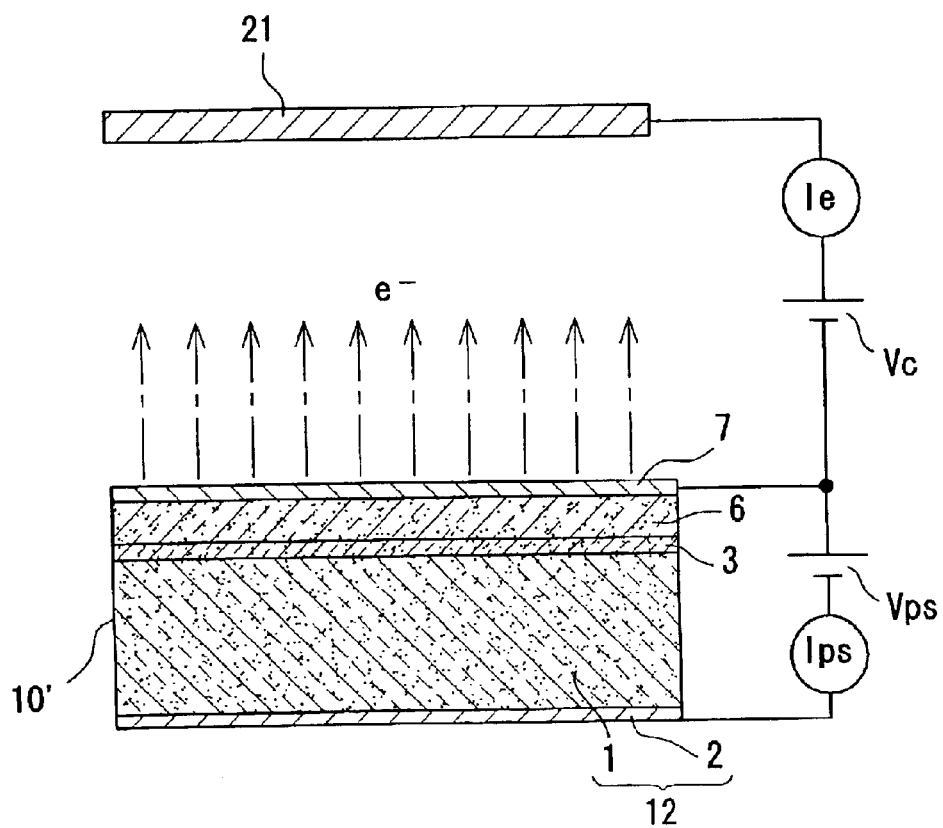
FIG. 38 is a view showing an operation of a conventional electron source.

Measurement of the electron emission characteristics of the electron source 10 and the electron sources according to Comparative Examples 1 and 2 were carried out as follows. That is, the electron source 10 and the electron sources according to Comparative Examples 1 and 2 were introduced into a vacuum chamber (not shown). Then, as shown in FIG. 38, a collector electrode 21 was disposed in opposite to the surface electrode 7. Further, the direct current voltage Vps was applied with the surface electrode 7 being high in potential relevant to the lower electrode 12, and the direct current voltage Vc was applied with the collector electrode 21 being high in potential relevant to the surface electrode 7.

FIG. 26, FIG. 28 and FIG. 30 show a measurement result of electron emission characteristics when the direct current voltage Vc is constant at 100 V, and the degree of vacuum in the vacuum chamber is set to $5 \times 10^{-5}$ Pa. In these figures each, the horizontal axis indicates a direct current voltage Vps, and the vertical axis indicates the current density. "P" indicates the current density of the diode current Ips, and "Q" indicates the current density of the emission current Ie.

FIG. 27, FIG. 29 and FIG. 31 show a measurement result of electron emission characteristics when the direct current voltage Vc is constant at 100 V, and the degree of vacuum in the vacuum chamber is set to $5 \times 10^{-5}$ Pa. In these figures each, the horizontal axis indicates an elapse of time from the start of driving, the vertical axis on the left side indicates the current density, and the vertical axis on the right side indicates the electron emission efficiency. "P" indicates the current density of the diode current Ips, "Q" indicates the current density of the emission current Ie, and "R" indicates the electron emission efficiency. However, FIG. 27 shows a measurement result when the direct current voltage Vps is constant at 15V. FIG. 29 shows a measurement result when the direct current voltage is constant at 11V. FIG. 31 shows a measurement result when the direct current voltage Vps is constant at 15V.

Referring to FIG. 26 to FIG. 31, in the electron source 10 according to Embodiment 6, it is found that the stability with an elapse of time, of the electron emission characteristics is improved as compared with the electron sources according to Comparative Examples 1 and 2.

In Embodiment 6, the lower electrode 12 is composed of the n-type silicon substrate 1 and ohmic electrode 2. However, the lower electrode 12 consisting of a metal material or densely doped polycrystalline silicon layer may be formed on one surface side of an insulating substrate (such as glass substrate or ceramic substrate, for example). In addition, a part of the surface side of the n-type silicon substrate 1 is made porous in accordance with the anode oxidization processing step, whereby a porous silicon layer that is a porous semiconductor layer is formed so as to carry out the insulating film forming step for this porous silicon layer.

(Embodiment 7)

Hereinafter, Embodiment 7 of the present invention will be described. A method of manufacturing an electron source according to Embodiment 7 is merely different from that according to Embodiment 6 in the insulating film forming step. Thus, the insulating film forming step will be primarily described. In Embodiment 7 as well, as in Embodiment 6, oxidization processing and nitriding processing are carried out in the insulating film forming step.

The oxidization processing in Embodiment 7 consists of the oxidizing step and annealing step. In the oxidizing step, an oxide film is formed on the surface of each silicon nanocrystal 63 in accordance with an electrochemical method. The annealing step is carried out after the oxidizing step, and each oxide film is annealed.

Specifically, in the oxidizing step, after the end of the anodic oxidation processing step, rinsing using ethanol is carried out. Then, an electrochemical method of applying a constant voltage between the lower electrode 12 and a cathode consisting of a platinum electrode by employing a processing vessel that contains a sulfuric acid water solution of a predetermined concentration (for example, 1 mol/l=1 M) is utilized. In this manner, an oxide film with film thickness to an extent such that an electron tunneling phenomenon occurs is formed on the surface of each grain 51 and each silicon nanocrystal 63. An electrolytic solution employed in the oxidizing step is not limited to a sulfuric acid water solution, and a sulfuric acid water solution or aqua regia and the like may be employed, for example. Alternatively, an electrolytic solution obtained by dissolving a solute in an organic solvent may be employed.

In the annealing step, for example, by employing a lamp annealing device (a general furnace is also available), in $N_2O$ gas atmosphere, annealing is carried out at a predetermined annealing temperature (for example, 450° C.) for a predetermined annealing time (for example, 1 hour). The annealing temperature may be set to 700° C. or less, and it is preferable that the temperature be set to 600° C. or less. According to the electrochemical method, an oxide film can be formed at room temperature. Thus, the annealing temperature is set to 700° C. or less, whereby heat treatment at a high temperature in the oxidizing step (for example, 900° C. or less) can be eliminated as compared with Embodiment 6. In addition, the annealing temperature is set to 700° C. or less, whereby, in the case where the lower electrode 12 is formed on the insulating substrate 11 such as glass substrate as in the conventional electron source 10" shown in FIG. 40, an effect of the oxidizing step on the glass substrate can be eliminated.

The nitriding processing consists of the nitriding step of nitriding each oxide film at a heat treatment time capable of restricting an occurrence of the damage to each silicon nanocrystal 63 (hereinafter, referred to as second predetermined heat treatment time as in Embodiment 1). In the nitriding step, by employing a lamp annealing device, for example, in $N_2O$ gas atmosphere, nitriding is carried out at a second predetermined heat treatment temperature (for example, 900° C.) for a predetermined heat treatment time (for example, 5 minutes). It is verified that the second predetermined heat treatment time be desirably set within 5 minutes from a measurement result of electron emission characteristics of the manufactured electron source 10. However, the temperature rise velocity at which the substrate temperature is risen to the second predetermined heat treatment temperature is set to 20° C. or more, desirably 150° C. or more. In Embodiment 7, $N_2O$ gas is employed in the nitriding step, and thus, oxidization advances at the same time when each oxide film is nitride. As a result, the insulating films 52 and 64 each are provided as oxi-nitride films (silicon oxi-nitride films). The gas employed in the nitriding step is not limited to $N_2O$ gas, and a gas containing nitrogen such as NO gas, $NH_3$ gas, or $N_2$ gas, for example, may be employed.

With a method of manufacturing the electron source 10 according to Embodiment 7, an operation/advantageous effect similar to that of Embodiment 6 is obtained. That is, in this manufacturing method, in the insulating film forming step, an oxide film with film thickness to an extent such that an electron tunneling phenomenon occurs is formed on the surface of each silicon nanocrystal 63 in accordance with processing capable of restricting an occurrence of the damage to each silicon nanocrystal 63. In addition, an oxide film is formed on the surface of each of the grains 51, nitriding each oxide film in accordance with processing capable of restricting an occurrence of the damage to each silicon nanocrystal 63, and the film quality is improved. Thus, unlike the conventional electron source, the stability with an elapse of time, of the electron emission characteristics, is improved as compared with a case in which the insulating films 52 and 64 each are formed at a comparatively long heat treatment time (for example, 1 hour) in accordance with the rapid heat oxidization technique. Moreover, the heat treatment time at a high temperature caused by forming the insulating films 52 and 64 each can be reduced. Thus, in the case where the lower electrode 12 is formed on the insulating substrate 11 such as a glass substrate as in the conventional electron source 10" shown in FIG. 40, it becomes possible to employ a comparatively inexpensive non-alkali glass substrate or low alkali glass substrate or the like as a glass substrate, and cost reduction can be achieved. In addition, the heat treatment time at a high temperature (for example, 900° C.) in the insulating film forming step can be reduced more remarkably as compared with Embodiment 1. Further, each silicon nanocrystal 63 is formed in accordance with a wet type anodic oxidization processing, thus making it possible to form an oxide film on the surface of each silicon nanocrystal 63 and each grain 51 in the oxidizing step without exposing the oxide film to the air after the anodic oxidization processing. Thus, a natural oxide film can be prevented from being formed on the surface of each silicon nanocrystal 63 and grain 51. This makes it possible to form a good quality oxide film on the surface of each silicon nanocrystal 63 and each grain 51 in the oxidizing step.

Figure 32:
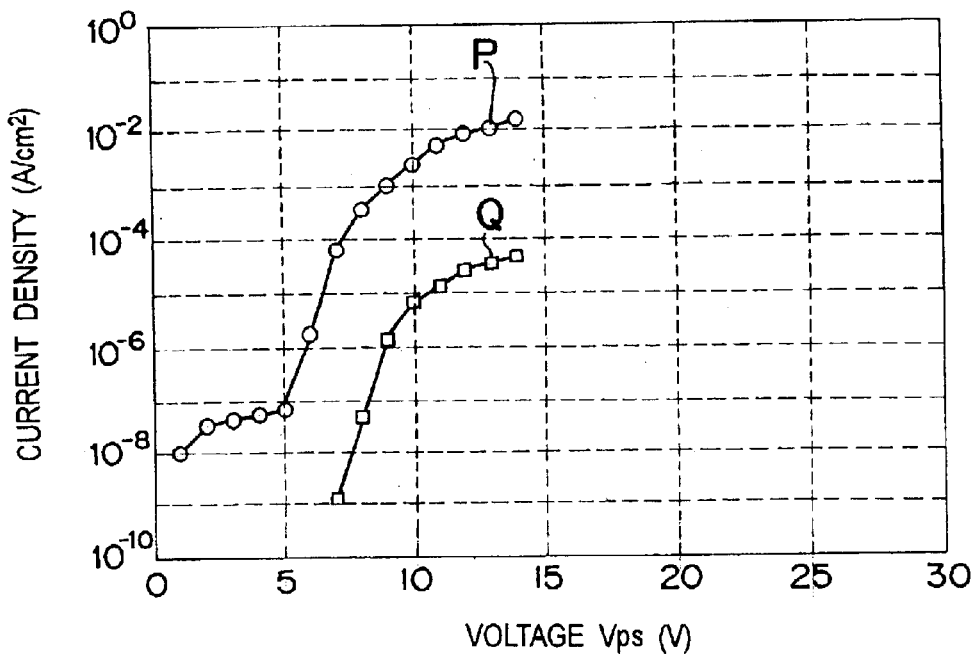
FIG. 32 is a graph depicting change characteristics of the current density relevant to the direct current voltage Vps in an electron source according to Embodiment 7 of the present invention.
Figure 33:
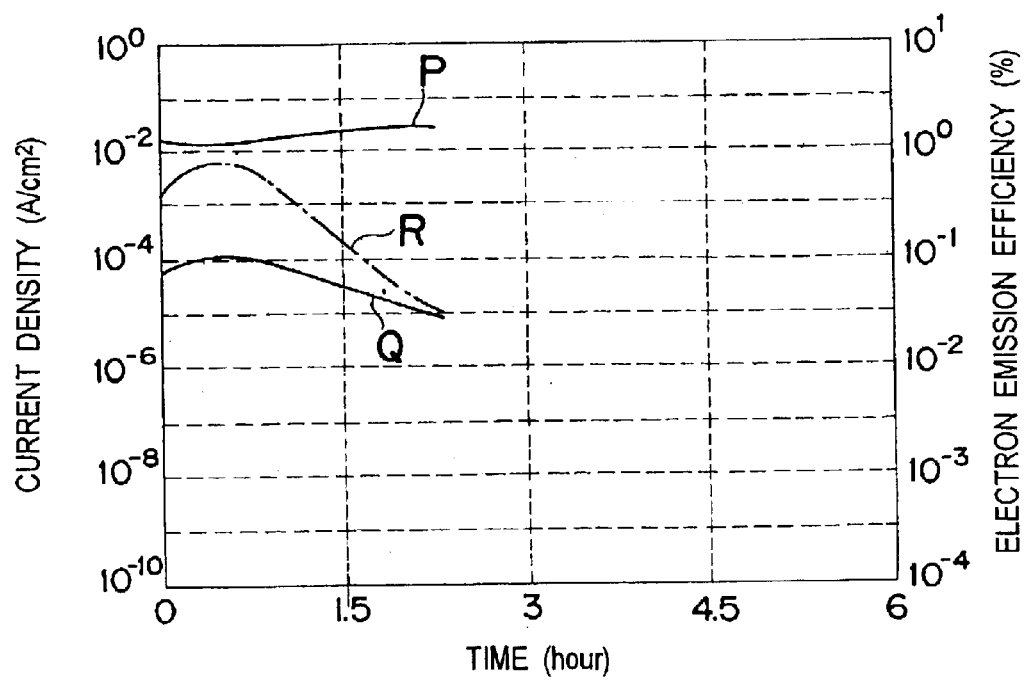
FIG. 33 is a graph depicting change characteristics of the current density relevant to a time in the electron source according to Embodiment 7 of the present invention.

FIG. 32 and FIG. 33 each show a result obtained by measuring: the electron emission characteristics of the electron source 10 manufactured in the manufacturing method according to Embodiment 7; and a change with an elapse of time, of the electron emission characteristics.

Measurement of the electron emission characteristics of the electron source 10 according to Embodiment 7 were carried out as follows. That is, the electron source 10 was introduced into a vacuum chamber (not shown). Then, as shown in FIG. 38, a collector electrode 21 was disposed in opposite to the surface electrode 7. Further, a direct current voltage Vps was applied with the surface electrode 7 being high in potential relevant to the lower electrode 12, and a direct current voltage Vc was applied with the collector electrode 21 being high in potential relevant to the surface electrode 7.

FIG. 32 shows a measurement result of electron emission characteristics when the direct current voltage Vc is constant at 100 V, and the degree of vacuum in the vacuum chamber is set to $5 \times 10^{-5}$ Pa. In these figures each, the horizontal axis indicates the direct current voltage Vps, and the vertical axis indicates the current density. "P" indicates the current density of the diode current Ips, and "Q" indicates the current density of the emission current Ie.

FIG. 33 shows a measurement result of electron emission characteristics when the direct current voltage Vc is constant at 100 V, and the degree of vacuum in the vacuum chamber is set to $5 \times 10^{-5}$ Pa. In FIG. 33, the horizontal axis h indicates the elapse of time from the start of driving, the vertical axis on the left side indicates the current density, and the vertical axis on the right side indicates the electron emission efficiency. "P" indicates the current density of the diode current Ips, "Q" indicates the current density of the emission current Ie, and "R" indicates the electron emission efficiency.

Referring to FIG. 32 and FIG. 33 and FIG. 28 to FIG. 31 each showing a measurement result concerning Comparative Examples 1 and 2 described in Embodiment 6, in the electron source 10 according to Embodiment 7, it is found that the stability with an elapse of time, of the electron emission characteristics, is improved as compared with the electron source according to Comparative Examples 1 and 2 each.

(Embodiment 8)

Hereinafter, Embodiment 8 of the present invention will be described. A method of measuring an electron source according to Embodiment 8 is merely different from that according to Embodiment 6 in the insulating film forming step. Thus, the insulating film forming step will be primarily described. In Embodiment 8 as well, as in Embodiment 6, oxidization processing and nitriding processing are carried out in the insulating film forming step.

The oxidization processing in Embodiment 8 consists of the first oxidizing step, annealing step, and the second oxidizing step. In the first oxidizing step, an oxide film is formed on the surface of each silicon nanocrystal 63 in accordance with an electrochemical method. The annealing step is carried out after the first oxidizing step, and each oxide film is annealed. The second oxidizing step is carried out after the annealing step, and each oxide film is oxidized furthermore at a heat treatment time capable of restricting an occurrence of the damage to each silicon nanocrystal 63 in accordance with the rapid heat oxidization technique.

Specifically, in the oxidizing step, after the end of the anodic oxidization processing step, rinsing using ethanol is carried out. Then, an electrochemical method of applying a constant voltage between the lower electrode 12 and a cathode consisting of a platinum electrode by employing a processing vessel that contains a sulfuric acid water solution of a predetermined concentration (for example, 1 mol/l=1 M) is utilized. In this manner, an oxide film with film thickness to an extent such that an electron tunneling phenomenon occurs is formed on the surface of each grain 51 and each silicon nanocrystal 63. An electrolytic solution employed in the oxidizing step is not limited to a sulfuric acid water solution, and a sulfuric acid water solution or aqua regia and the like may be employed, for example. Alternatively, an electrolytic solution obtained by dissolving a solute in an organic solvent may be employed.

In the annealing step, for example, by employing a lamp annealing device (a general furnace is available), in $N_2O$ gas atmosphere, annealing is carried out at a predetermined annealing temperature (for example, 450° C.) for a predetermined annealing time (for example, 1 hour). The annealing temperature may be set to 700° C. or less, and it is preferable that the temperature be set to 600° C. or less. The annealing temperature is set to 700° C. or less, whereby, in the case where the lower electrode 12 is formed on the insulating substrate 11 such as glass substrate as in the conventional electron source 10" shown in FIG. 40, an effect of the oxidizing step on the glass substrate can be eliminated.

In the second oxidizing step, by employing a lamp annealing device, for example, in oxygen gas atmosphere, oxidization is carried out at a first determined heat treatment temperature (for example, 900° C.) for a first predetermined heat treatment time (for example, 5 minutes). The first predetermined heat treatment time is reduced remarkably as compared with a predetermined heat treatment time (1 hour) in the oxidizing step using the conventional rapid thermal oxidization technique. It is verified that the first predetermined heat treatment time is desirably set within 5 minutes from a measurement result of the electron emission characteristics of the manufactured electron source 10. However, a temperature rise velocity during a temperature rise period in which a substrate temperature is risen to the first predetermined heat treatment temperature is set to 20° C./sec or more, and desirably to 150° C./sec or more.

The nitriding processing consists of the nitriding step of nitriding each oxide film at a heat treatment time (that is, "second predetermined heat treatment time") capable of restricting an occurrence of the damage to each silicon nanocrystal 63 in accordance with the rapid heat nitriding technique. In this nitriding step, by employing a lamp annealing device, for example, in $N_2O$ gas atmosphere, nitriding is carried out at a second predetermined heat treatment temperature (for example, 900° C. for a second predetermined heat treatment time (for example, 5 minutes). It is verified that the second predetermined heat treatment time is desirably set within 5 minutes from a measurement result of electron emission characteristics of the manufactured electron source 10. However, the temperature rise temperature of the temperature rise period in which a substrate temperature is risen to the second specified heat treatment temperature is set to 20° C./sec or more, desirably to 150° C./sec or more. In Embodiment 8, $N_2O$ gas is employed in the nitriding step, and thus, oxidization advances at the same time when each oxide film is nitride. As a result, the insulating films 52 and 64 each are provided as an oxi-nitride film (silicon oxi-nitride film). The gas employed in the nitriding step is not limited to $N_2O$ gas, and a gas containing NO gas, $NH_3$ gas, or $N_2$ gas may be employed, for example.

With a manufacturing method according to Embodiment 8, an operation/advantageous effect similar to that of Embodiment 6 is obtained. That is, in the insulating film forming step, an oxide film with film thickness to an extent such that an electron tunneling phenomenon occurs on the surface of each silicon nanocrystal 63 in accordance with processing capable of restricting an occurrence of the damage to each silicon nanocrystal 63, and an oxide film is formed on the surface of each of the grains 51. Then, each oxide film is nitride in accordance with processing capable of restricting an occurrence of the damage to each silicon nanocrystal 63, thereby improving the film thickness. Thus, the stability with an elapse of time, of the electron emission characteristics, is improved as compared with a case in which the insulating films 52 and 64 each are formed within a comparatively long heat treatment time (for example, 1 hour) in accordance with the rapid thermal oxidization technique as in the prior art. Moreover, the heat treatment time at a high temperature caused by forming of the insulating films 52 and 64 each can be reduced. Thus, in the case where the lower electrode 12 is formed on the insulating substrate 11 such as glass substrate as in the conventional electron source 10" shown in FIG. 40, it becomes possible to employ a comparatively inexpensive non-alkali glass substrate or a low alkali glass substrate as a glass substrate, and cost reduction can be achieved. In addition, a defect in the insulating films 52 and 64 each can be reduced as compared with the manufacturing method according to Embodiment 7, and the electron emission characteristics can be improved. In addition, each silicon nanocrystal 63 is formed in accordance with wet type anode oxidization processing, thus making it possible to form an oxide film on the surface of each silicon nanocrystal 63 and each grain 51 in the first oxidizing step without exposing the oxide film to the air after the anodic oxidization processing. Thus, a natural oxide film can be prevented from being formed on the surface of each silicon nanocrystal 63 and grain 51. Therefore, it becomes possible to form a good quality oxide film on the surface of each silicon nanocrystal 63 and each grain 51 in the first oxidizing step.

(Embodiment 9)

Hereinafter, Embodiment 9 of the present invention will be described. A method of manufacturing an electron source according to Embodiment 9 is merely different from that according to Embodiment 6 in the insulating film forming step. Hereinafter, the insulating film forming step will be principally described. In Embodiment 9 as well, as in Embodiment 6, oxidization processing and annealing processing are carried out in the insulating film forming step.

The oxidization processing in Embodiment 9 consists of the oxidizing step of forming an oxide film on the surface of each silicon nanocrystal 63 in accordance with an electrochemical method. In the oxidizing step, rinsing using ethanol is carried out after the end of the anodic processing step. Then, there is utilized an electrochemical method of applying a constant voltage between the lower electrode 12 and a cathode consisting of a platinum electrode by employing a processing vessel that contains a sulfuric acid water solution of a predetermined concentration (for example, 1 mol/l=1 M). In this manner, an oxide film of film thickness to an extent such that an electron tunneling phenomenon occurs is formed on the surface of each grain 51 and each silicon nanocrystal 63. An electrolytic solution employed in the oxidizing step is not limited to a sulfuric acid water solution, and a nitric acid water or aqua regia may be employed, for example. Alternatively, an electrolytic solution obtained by dissolving a solute in an organic solvent may be employed.

Annealing processing consists of the annealing step of annealing each oxide film in $N_2O$ gas atmosphere. In the annealing step, for example, by employing a lamp annealing device (a general furnace is also available), in $N_2O$ gas atmosphere, annealing is carried out at a predetermined annealing temperature (for example, 450° C.) for a predetermined annealing time (for example, 1 hour). The annealing temperature may be set to 700° C. or less, and it is preferable that the temperature be set to 600° C. or less. The annealing temperature is set to 700° C. or less, whereby, in the case where the lower electrode 12 is formed on the insulating substrate 11 such as glass substrate as in the conventional electron source 10" shown in FIG. 40, an effect of the annealing step on the glass substrate can be eliminated.

With a method of manufacturing the electron source 10 according to Embodiment 9, an operation/advantageous effect similar to that of Embodiment 6 is basically obtained. That is, in the insulating film forming step, an oxide film with film thickness to an extent such that an electron tunneling phenomenon occurs is formed on the surface of each silicon nanocrystal 63 in accordance with processing capable of restricting an occurrence of the damage to each silicon nanocrystal 63, and an oxide film is formed on the surface of the grain 51. Then, defect compensation for each oxide film is carried out in accordance with processing capable of restricting an occurrence of the damage to each silicon nanocrystal 63, and the film quality is improved. Thus, the stability with an elapse of time, of the electron emission characteristics, is improved as compared with the case of forming the insulating films 52 and 64 each within a comparatively long heat treatment time (for example, 1 hour) in accordance with the rapid thermal oxidization technique as in the prior art. Moreover, a heat treatment time at a high temperature caused by forming the insulating films 52 and 64 each can be reduced. Thus, in the case where the lower electrode 12 is formed on the insulating substrate 11 such as glass substrate as in the conventional electron source 10" shown in FIG. 40, it becomes possible to employ a comparatively inexpensive non-alkali glass substrate or a low alkali glass substrate and the like as a glass substrate, and cost reduction can be achieved. In addition, a defect in the insulating films 52 and 64 each can be reduced as compared with the manufacturing method according to Embodiment 7, and the electron emission characteristics can be improved. In addition, each silicon nanocrystal 63 is formed in accordance with wet type anode oxidization processing, thus making it possible to form an oxide film on the surface of each silicon nanocrystal 63 and each grain 51 in the oxidizing step without exposing the oxide film after the anodic oxidization processing. Thus, a natural oxide film can be prevented from being formed on the surface of each silicon nanocrystal 63 and grain 51. Therefore, it becomes possible to form a good quality oxide film on the surface of each silicon nanocrystal 63 and each grain 51 in the oxidizing step.

(Embodiment 10)

Hereinafter, Embodiment 10 of the present invention will be described. A method of manufacturing an electron source according to Embodiment 10 is merely different from that according to Embodiment 6 in the insulating film forming step. Hereinafter, the insulating film forming step will be principally described. In Embodiment 10 as well, as in Embodiment 6, oxidization processing and nitriding processing are carried out in the insulating film forming step.

The oxidization processing in Embodiment 10 consists of the oxidizing step of forming an oxide film on the surface of each silicon nanocrystal 63 in accordance with an electrochemical method. In the first oxidizing step, rinsing using ethanol is carried out after the end of the anodic processing step. Then, there is utilized an electrochemical method of applying a constant voltage between the lower electrode 12 and a cathode consisting of a platinum electrode by employing a processing vessel that contains a sulfuric acid water solution of a predetermined concentration (for example, 1 mol/l=1 M). In this manner, an oxide film of film thickness to an extent such that an electron tunneling phenomenon occurs is formed on the surface of each grain 51 and each silicon nanocrystal 63. An electrolytic solution employed in the first oxidizing step is not limited to a sulfuric acid water solution, and a nitric acid water or aqua regia may be employed, for example. Alternatively, an electrolytic solution obtained by dissolving a solute in an organic solvent may be employed.

In the annealing step, for example, by employing a lamp annealing device (a general furnace is also available), in $N_2O$ gas atmosphere, annealing is carried out at a predetermined annealing temperature (for example, 450° C.) for a predetermined annealing time (for example, 1 hour). The annealing temperature may be set to 700° C. or less, and it is preferable that the temperature be set to 600° C. or less. The annealing temperature is set to 700° C. or less, whereby, in the case where the lower electrode 12 is formed on the insulating substrate 11 such as glass substrate as in the conventional electron source 10″ shown in FIG. 40, an effect of the annealing step on the glass substrate can be eliminated.

The insulating firm forming step in the manufacturing method according to Embodiment 10 includes: the second oxidizing step of further oxidizing each oxide film within a heat treatment time capable of restricting an occurrence of the damage to each silicon nanocrystal 63 in accordance with the rapid thermal oxidization technique after annealing processing; and the nitriding step of nitriding each oxide film within a heat treatment time capable of restricting an occurrence of the damage to each silicon nanocrystal 63 in accordance with the rapid thermal nitriding technique after the second oxidizing step.

In the second oxidizing step, by employing a lamp annealing device, for example, in oxygen gas atmosphere, oxidization is carried out at the first predetermined heat treatment temperature (for example, 900° C.) by the first predetermined heat treatment time (for example, 5 minutes). That is, the first predetermined heat treatment time is remarkably reduced as compared with a predetermined heat treatment time in accordance with the oxidizing step using the conventional rapid heat oxidization technique. It is verified that the first predetermined heat treatment time is desirably set within 5 minutes from a measurement result of electron emission characteristics of the manufactured electron source 10. However, the temperature rise velocity of a temperature rise period in which a substrate temperature is risen to the first predetermined heat treatment temperature is set to 20° C./sec or more, and desirably to 150° C./sec or more.

The nitriding processing consists of the nitriding step of nitriding each oxide film at a heat treatment time (that is, "second predetermined heat treatment time") capable of restricting an occurrence of the damage to each silicon nanocrystal 63 in accordance with the rapid heat nitriding technique. In this nitriding step, by employing a lamp annealing device, for example, in $N_2O$ gas atmosphere, nitriding is carried out at the second predetermined heat treatment temperature (for example, 900° C. for the second predetermined heat treatment time (for example, 5 minutes). It is verified that the second predetermined heat treatment time is desirably set within 5 minutes from a measurement result of electron emission characteristics of the manufactured electron source 10. However, the temperature rise velocity of the temperature rise period in which a substrate temperature is risen to the second specified heat treatment temperature is set to 20° C./sec or more, desirably to 150° C./sec or more. In Embodiment 10, $N_2O$ gas is employed in the nitriding step, and thus, oxidization advances at the same time when each oxide film is nitride. As a result, the insulating films 52 and 64 each are provided as an oxi-nitride film (silicon oxi-nitride film). The gas employed in the nitriding step is not limited to $N_2O$ gas, and a gas containing NO gas, $NH_3$ gas, or $N_2$ gas may be employed, for example.

With a method of manufacturing according to Embodiment 10, an operation/advantageous effect similar to that of Embodiment 6 is basically obtained. That is, in the insulating film forming step, an oxide film with film thickness to an extent such that an electron tunneling phenomenon occurs is formed on the surface of each silicon nanocrystal 63 in accordance with processing capable of restricting an occurrence of the damage to each silicon nanocrystal 63, and an oxide film is formed on the surface of the grain 51. Then, each oxide film is nitrided in accordance with processing capable of restricting an occurrence of the damage to each silicon nanocrystal 63, and the film quality is improved. Thus, the stability with an elapse of time, of the electron emission characteristics, is improved as compared with the case of forming the insulating films 52 and 64 each within a comparatively long heat treatment time (for example, 1 hour) in accordance with the rapid thermal oxidization technique as in the prior art. Moreover, the heat treatment time at a high temperature caused by forming the insulating films 52 and 64 each can be reduced. Thus, in the case where the lower electrode 12 is formed on the insulating substrate 11 such as glass substrate as in the conventional electron source 10″ shown in FIG. 40, it becomes possible to employ a comparatively inexpensive non-alkali glass substrate or a low alkali glass substrate and the like as a glass substrate, and cost reduction can be achieved. In addition, a defect in the insulating films 52 and 64 each can be reduced as compared with the manufacturing method according to Embodiment 7, and the electron emission characteristics can be improved. In addition, each silicon nanocrystal 63 is formed in accordance with wet type anodic oxidization processing, thus making it possible to form an oxide film on the surface of each silicon nanocrystal 63 and each grain 51 in the first oxidizing step without exposing the oxide film after the anodic oxidization processing. Thus, a natural oxide film can be prevented from being formed on the surface of each silicon nanocrystal 63 and grain 51. Therefore, it becomes possible to form a good quality oxide film on the surface of each silicon nanocrystal 63 and each grain 51 in the first oxidizing step.

Figure 34:
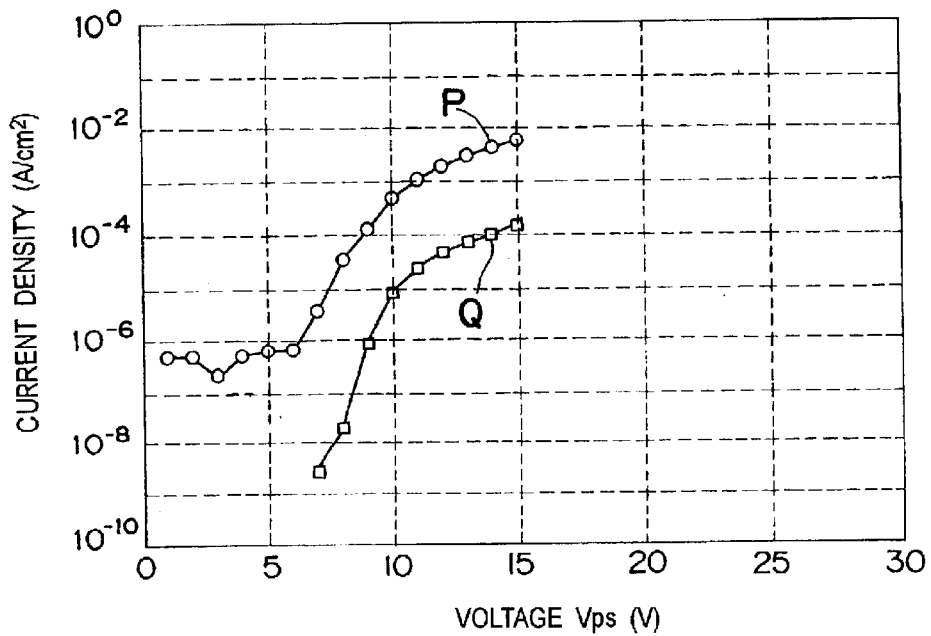
FIG. 34 is a graph depicting change characteristics of the current density relevant to the direct current voltage Vps in an electron source according to Embodiment 10 of the present invention.
Figure 35:
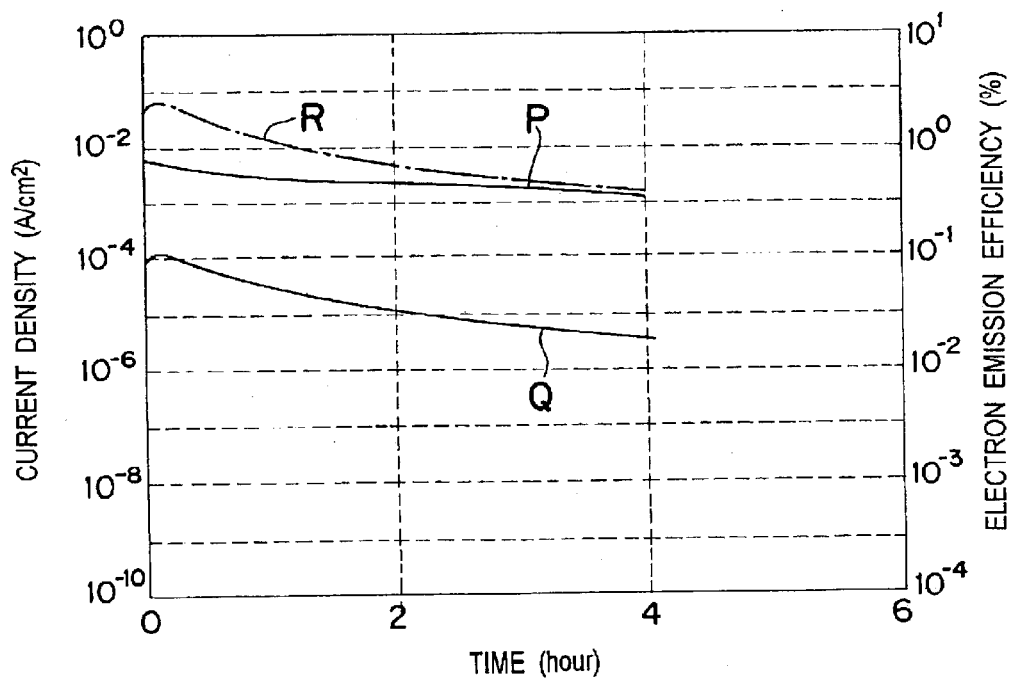
FIG. 35 is a graph depicting change characteristics of the current density relevant to a time in the electron source according to Embodiment 10 of the present invention.

FIG. 34 and FIG. 35 each show a result obtained by measuring: electron emission characteristics of the electron source 10 manufactured in accordance with the manufacturing method according to Embodiment 10; and a change with an elapse of time, of the electron emission characteristics.

Measurement of the electron emission characteristics of the electron source 10 were carried out as follows. That is, the electron source 10 were introduced into a vacuum chamber (not shown). Then, as shown in FIG. 38, the collector electrode 21 was disposed in opposite to the surface electrode 7. Further, a direct current voltage Vps was applied with the surface electrode 7 being high in potential relevant to the lower electrode 12, and the direct current voltage Vc was applied with the collector electrode 21 being high in potential relevant to the surface electrode 7.

FIG. 34 shows a measurement result of electron emission characteristics when the direct current voltage Vc is constant at 100 V, and the degree of vacuum in the vacuum chamber is set to $5\times10^{-5}$ Pa. In FIG. 34, the horizontal axis indicates the direct current voltage Vps, and the vertical axis indicates the current density. "P" indicates the current density of the diode current Ips, and "Q" indicates the current density of the emission current Ie.

FIG. 35 shows a measurement result of a change with an elapse of time, of electron emission characteristics when the direct current voltage Vc is constant at 100 V, and the direct current voltage Vps is constant at 15V, and the degree of vacuum in the vacuum chamber is set to $5\times10^{-5}$ Pa. In FIG. 35, the horizontal axis indicates an elapse of time from the start of driving, the vertical axis on the left side indicates the current density, and the vertical axis on the right side indicates the electron emission efficiency. "P" indicates the current density of the diode current Ips, "Q" indicates the current density of the emission current Ie, and "R" indicates the electron emission efficiency.

Referring FIG. 34 and FIG. 35 and FIG. 28 to FIG. 31 each showing a measurement result concerning Comparative Examples 1 and 2 each described in Embodiment 6, in the electron source 10 according to Embodiment 10, the stability with an elapse of time, of the electron emission characteristics, is improved as compared with the electron sources according to Comparative Examples 1 and 2.

(Embodiment 11)

Hereinafter, Embodiment 11 of the present invention will be described. A method of manufacturing an electron source according to Embodiment 11 is merely different from that according to Embodiment 6 in the insulating film forming step. Hereinafter, the insulating film forming step will be principally described. In Embodiment 11 as well, as in Embodiment 6, oxidization processing and nitriding processing are carried out in the insulating film forming step.

The oxidization processing in Embodiment 11 consists of the first oxidizing step of forming an oxide film on the surface of each silicon nanocrystal 63 in accordance with an electrochemical method. In the first oxidizing step, rinsing using ethanol is carried out after the end of the anodic processing step. Then, there is utilized an electrochemical method of applying a constant voltage between the lower electrode 12 and a cathode consisting of a platinum electrode by employing a processing vessel that contains a sulfuric acid water solution of a predetermined concentration (for example, 1 mol/1=1 M). In this manner, an oxide film of film thickness to an extent such that an electron tunneling phenomenon occurs is formed on the surface of each grain 51 and each silicon nanocrystal 63. An electrolytic solution employed in the first oxidizing step is not limited to a sulfuric acid water solution, and a nitric acid water or aqua regia may be employed, for example. Alternatively, an electrolytic solution obtained by dissolving a solute in an organic solvent may be employed.

Nitriding processing includes the annealing step of annealing each oxide film in $N_2O$ gas atmosphere, and nitriding step of nitriding each oxide film at a heat treatment time capable of restricting an occurrence of the damage to each silicon nanocrystal 63 in accordance with the rapid heat nitriding technique after the annealing step.

In the annealing step, for example, by employing a lamp annealing device (a general furnace is also available), in $N_2O$ gas atmosphere, annealing is carried out at a predetermined annealing temperature (for example, 450° C.) for a predetermined annealing time (for example, 1 hour). The annealing temperature may be set to 700° C. or less, and it is preferable that the temperature is set to 600° C. or less. The annealing temperature is set to 700° C. or less, whereby, in the case where the lower electrode 12 is formed on the insulating substrate 11 such as glass substrate as in the conventional electron source 10" shown in FIG. 40, an effect of the annealing step on the glass substrate can be eliminated.

In the nitriding step, by employing a lamp annealing device, for example, in $N_2O$ gas atmosphere, nitriding is carried out at the second predetermined heat treatment temperature (for example, 900° C.) for the second predetermined heat treatment time (for example, 5 minutes). It is verified that the second predetermined heat treatment time be desirably set within 5 minutes from a measurement result of electron emission characteristics of the manufactured electron source 10. However, the temperature rise velocity of a temperature rise period in which the substrate temperature is risen to the second predetermined heat treatment temperature is set to 20° C./sec or more, desirably 150° C./sec or more. In Embodiment 11, $N_2O$ gas is employed in the nitriding step, and thus, oxidization advances at the same time when each oxide film is nitride. As a result, the insulating films 52 and 64 each are provided as oxi-nitride films (silicon oxi-nitride films). The gas employed in the nitriding step is not limited to $N_2O$ gas, and a gas containing nitrogen such as NO gas, $NH_3$ gas, or $N_2$ gas, for example, may be employed.

With a method of manufacturing the electron source 10 according to Embodiment 11, an operation/advantageous effect similar to that of Embodiment 6 is obtained. That is, in the insulating film forming step, an oxide film with film thickness to an extent such that an electron tunneling phenomenon occurs on the surface of each silicon nanocrystal 63 in accordance with processing capable of restricting an occurrence of the damage to each silicon nanocrystal 63, and an oxide film is formed on each of the surface of the grains 51. Then, each oxide film is nitride in accordance with processing capable of restricting an occurrence of the damage to each silicon nanocrystal 63, thereby improving the film quality. Thus, the stability with an elapse of time, of the electron emission characteristics, is improved as compared with the case in which the insulating films 52 and 64 each are formed within a comparatively long heat treatment time (for example, 1 hour) in accordance with the rapid thermal oxidization technique as in the prior art. Moreover, the heat treatment time at a high temperature caused by forming of the insulating films 52 and 64 each can be reduced. Thus, in the case where the lower electrode 12 is formed on the insulating substrate 11 such as glass substrate as in the conventional electron source 10" shown in FIG. 40, it becomes possible to employ a comparatively inexpensive non-alkali glass substrate or a low alkali glass substrate as a glass substrate, and cost reduction can be achieved. In addition, a defect in the insulating films 52 and 64 each can be reduced as compared with the manufacturing method according to Embodiment 7, and the electron emission characteristics can be improved. In addition, each silicon nanocrystal 63 is formed in accordance with wet type anodic oxidization processing, thus making it possible to form an oxide film on the surface of each silicon nanocrystal 63 and each grain 51 in the first oxidizing step without exposing the oxide film to the air after the anode oxidization processing. Thus, a natural oxide film can be prevented from being formed on the surface of each silicon nanocrystal 63 and grain 51. Therefore, it becomes possible to form a good quality oxide film on the surface of each silicon nanocrystal 63 and each grain 51 in the first oxidizing step.

(Embodiment 12)

Hereinafter, Embodiment 12 of the present invention will be described. A method of manufacturing an electron source according to Embodiment 12 is merely different from that according to Embodiment 6 in the insulating form forming step. Hereinafter, the insulating film forming step will be primarily described.

In the insulating form forming step according to Embodiment 12, insulating films 52 and 64 each are formed by repeating the basic step that consists of: oxidization processing within a heat treatment time capable of restricting an occurrence of the damage to each silicon nanocrystal (semiconductor nanocrystal) 63 in accordance with a rapid thermal oxidization technique; and nitriding processing within a heat treatment time capable of restricting an occurrence of the damage to each silicon nanocrystal (semiconductor nanocrystal) 63 in accordance with a rapid thermal nitriding technique after oxidization processing a plurality of times. In the oxidization processing, the surface side of each of the silicon nanocrystals 63 is oxidized, and a film quality is improved in nitriding processing.

In the oxidization processing, by employing a lamp annealing device, for example, in oxygen gas atmosphere, oxidization is carried out at the first predetermined heat treatment temperature (for example, 900° C.) for the first predetermined heat treatment time (for example, 5 minutes). The first predetermined heat treatment time is remarkably reduced as compared with a predetermined heat treatment time (1 hour) in the oxidization step in accordance with the conventional rapid thermal oxidization technique. However, a temperature rise velocity of a temperature rise period in which a substrate temperature is risen to the first predetermined heat treatment temperature is set to 20° C./sec or more, and desirably to 150° C./sec or more.

The nitriding processing nitrides each oxide film within a heat treatment time capable of restricting an occurrence of the damage to each silicon nanocrystal 63 in accordance with a rapid nitriding technique (that is, a second predetermined heat treatment time). In this nitriding processing, by employing a lamp annealing device, for example, in $N_2O$ gas atmosphere, nitriding is carried out at the second predetermined heat treatment temperature (for example, 900° C.) for the second predetermined heat treatment time (for example, 5 minutes). However, a temperature rise velocity of a temperature rise period in which a substrate temperature is risen to a second predetermined heat treatment temperature is set to 20° C./sec or more, desirably 150° C./sec or more. In Embodiment 12, in the nitriding processing, $N_2O$ gas is employed, and thus, oxidization advances at the same time when each oxide film is nitride. As a result, the insulating films 52 and 64 each is to be an oxi-nitride film (silicon oxi-nitride film). The gas employed during nitriding processing is not limited to $N_2O$ gas, and a gas containing nitrogen such as NO gas, $NH_3$ gas, or $N_2$ gas.

With a method of manufacturing the electron source 10 according to Embodiment 12, an operation/advantageous effect similar to that of Embodiment 6 is basically obtained. That is, the stability with an elapse of time, of the electron emission characteristics is improved as compared with the case where the insulating films 52 and 64 each are formed within a comparatively long heat treatment time (for example, 1 hour) in accordance with the rapid thermal oxidization technique, as in the prior art. Moreover, the heat treatment time at a high temperature caused by forming the insulating layers 52 and 64 each can be reduced. Thus, in the case where the lower electrode 12 is formed on an insulating substrate 11 such as glass substrate, as in the conventional electron source 10" shown in FIG. 40, it is possible to employ a non-alkali glass substrate or low alkali glass substrate and the like as a glass substrate, and cost reduction can be achieved. In addition, a defect in the insulating films 52 and 64 each can be reduced, and electron emission characteristics can be improved, as compared with the manufacturing method according to Embodiment 7.

(Embodiment 13)

Hereinafter, Embodiment 13 of the present invention will be described.

Figure 36A:
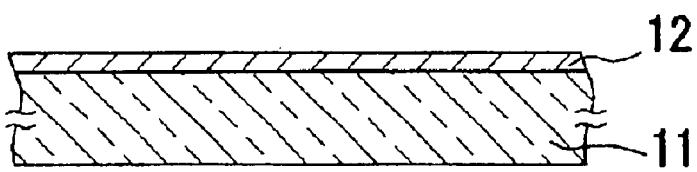
FIG. 36A to FIG. 36F are schematic cross sections each showing an electron source according to Embodiment 13 of the present invention or an intermediate body in the middle of the manufacture, and show a method of manufacturing the electron source.
Figure 36B:
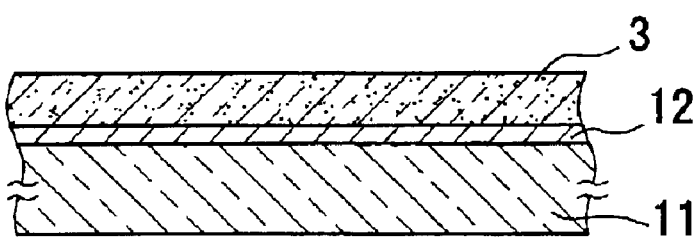
Figure 36C:
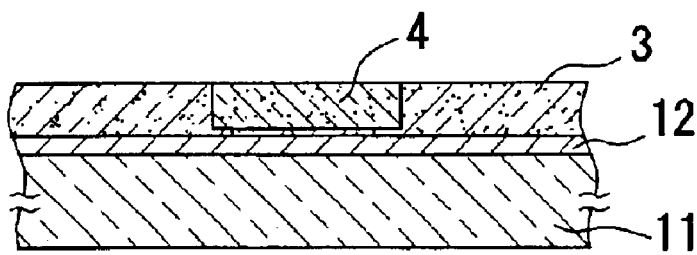
Figure 36D:
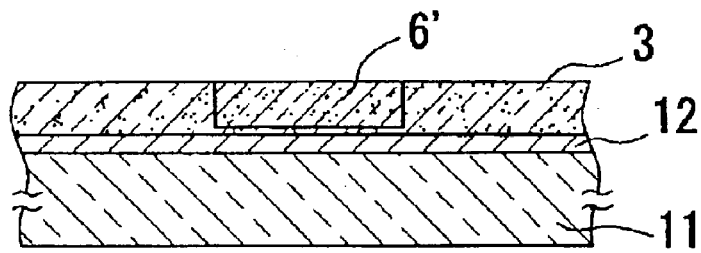
Figure 36E:
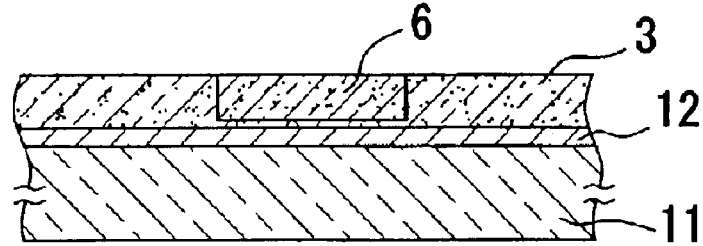
Figure 36F:
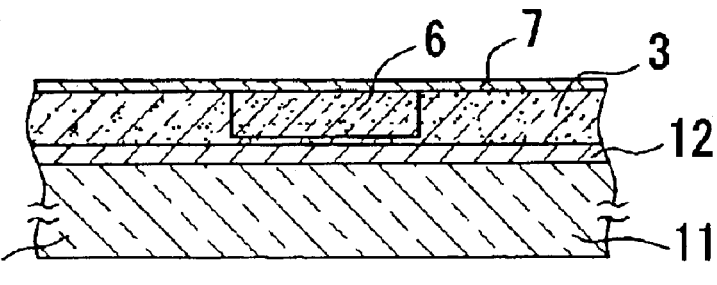

As shown in FIG. 36F, in Embodiment 13, as an electrically conductive substrate, there is employed a substrate on which an electrically conductive layer (such as metal film or ITO film such as chrome film) 12 is provided on one surface of the insulating substrate 11 consisting of a glass substrate. In the case where a substrate having an electrically conductive layer 12 formed thereon is thus employed on one surface side of the insulating substrate 11, a large area of the electron source and cost reduction can be achieved as compared with the case of employing a semiconductor substrate as an electrically conductive substrate.

A basic configuration of an electron source 10 according to Embodiment 13 is substantially identical to a conventional electron source 10" shown in FIG. 40. That is, a non-doped polycrystalline silicon layer 3 that is a polycrystalline semiconductor layer is formed on the electrically conductive layer 12 on the insulating substrate 11. A drift layer 6 consisting of an oxide porous polycrystalline silicon layer is formed on the polycrystalline silicon layer 3. A surface electrode 7 is formed on the drift layer 6. A material with its small work function (for example, gold) is employed on the surface electrode 7. The film thickness of the surface electrode 7 is set to about 3 nm to 15 nm. A structure of the drift layer 6 will be described later. In the electron source 10 shown in FIG. 36F, a part of the polycrystalline silicon layer 3 is interposed between the electrically conductive layer 12 and the drift layer 6. However, the drift layer 6 may be formed on the electrically conductive layer 12 without having the polycrystalline silicon layer 3 interposed.

A process for emitting an electron from the electron source 10 is similar to the conventional electron source 10" shown in FIG. 40. That is, by setting the collector electrode 21 facing to the surface electrode 7 (refer to FIG. 40) a vacuum state is established between the surface electrode 7 and the electrode collector 21. Then, the direct current voltage Vps is applied between the surface electrode 7 and the electrically conductive layer 12 so that the surface electrode 7 becomes high in potential (positive in polarity) relevant to the electrically conductive layer 12. Further, the direct current voltage Vc is applied between the collector electrode 21 and the surface electrode 7 so that the collector electrode 21 becomes high in potential relevant to the surface electrode 7. The direct current voltages Vps and Vc each are set properly, whereby the electrons injected from the electrically conductive layer 12 drift in the drift layer 6, and are emitted via the surface electrode 7.

Hereinafter, a method of manufacturing the electron source 10 according to Embodiment 13 will be described with reference to FIG. 36A to FIG. 36F.

First, on one surface side of the insulating substrate 11, an electrically conductive layer 12 is provided in accordance with a sputtering technique, whereby an electrically conductive substrate is formed, and a structure shown in FIG. 36A is obtained. Then, on a main surface side of the electrically conductive substrate (on the electrically conductive layer 12), a polycrystalline silicon layer 3 is formed which is a semiconductor layer of the predetermined film thickness (for example, 1.5 μm), and a structure shown in FIG. 36B is obtained. As a method of film forming the polycrystalline silicon layer 3, for example, there may be employed a CVD technique (such as LPCVD technique, plasma CVD technique, or catalytic CVD technique), a sputtering technique, or a CGS (Continuous Grain Silicon) technique. By setting the film forming temperature to 600° C. or less, as the insulating substrate 11, for example, a comparatively inexpensive glass substrate such as non-alkali glass substrate, low alkali glass substrate, or soda lime glass substrate can be employed, and cost reduction can be achieved.

Next, a mask material (not shown) for forming a porous polycrystalline silicon layer 4 described later in only a predetermined region is provided on a polycrystalline silicon layer 3. Then, by employing an anodic oxidization processing vessel that contains an electrolytic solution consisting of a mixture solution obtained by mixing substantially 1:1 between 55 wt. % of hydrogen fluoride water solution and ethanol, with a platinum electrode (not shown) being negative in polarity and an electrically conductive layer 12 being positive in polarity, while light emission is carried out for the polycrystalline silicon layer 3, the anodic oxidization processing is carried out under a predetermined condition. In this manner, the porous polycrystalline silicon layer 4 is formed. Then, a mask material is removed, and a structure shown in FIG. 36C is obtained. During anodic oxidization processing of Embodiment 13, the anodic oxidization processing period, power of light to be emitted on the surface of the polycrystalline silicon layer 3, and the current density are made uniform. However, this processing condition may be changed as required (for example, a current density may be changed).

After the anodic oxidization processing has terminated, the porous polycrystalline silicon layer 4 is electrochemically oxidized in 1 M of sulfuric acid ($H_2SO_4$) water solution, thereby forming the drift layer 6', and a structure shown in FIG. 36D is obtained. The water solution and concentration employed for electrochemical oxidization is not limited in particular, and a nitric acid water solution or the like may be employed, for example.

After the drift layer 6' has been formed, hydrogen radicals are emitted onto the top surface on one surface side of an electrically conductive substrate (here, surface of the drift layer 6'), whereby a defect existing in the drift layer 6' is made passive, and a structure shown in FIG. 36E is obtained. 6 in FIG. 36E indicates a drift layer after hydrogen radical emission. In the hydrogen radical emission step of emitting a hydrogen radical onto the surface of the drift layer 6', the hydrogen radical in hydrogen plasma is emitted onto the top surface on one surface side of the electrically conductive substrate. Thus, a process temperature of the hydrogen radical emission step can be lowered (a process temperature of 600° C. or less can be obtained). In addition, a larger area for the electron source 10 can be easily achieved. In addition, by applying high frequency or microwave to hydrogen gas so as to be plasmatic, a general semiconductor manufacturing device capable of generating hydrogen plasma can be used, and cost reduction can be achieved.

After the hydrogen plasma emission step has terminated, a surface electrode 7 consisting of an electrically conductive thin film (for example, gold thin film) is formed on the drift layer 6 in accordance with a vapor deposition technique, for example, and a electron source 10 with its structure shown in FIG. 36F is obtained. The method of forming the surface electrode 7 is not limited to the vapor deposition technique, and the sputtering method may be employed, for example.

The drift layer 6 of the electron source 10 manufactured in accordance with the above-described manufacturing method is believed to be composed of: at least, columnar polycrystalline silicon grains 51; thin silicon oxide films 52; silicon nanocrystals 63 of nano-meter order; and silicon oxide films 64. However, in the electron source 10 according to Embodiment 13, the hydrogen radicals are emitted on the surface of the drift layer 6' formed by oxidizing the porous polycrystalline silicon layer 4, thereby forming the drift layer 6. Thus, a defect existing in the drift layer 6' (for example, defect on the surface of silicon oxide films 52 and 64 or silicon nanocrystal 63) can be made passive or can be reduced. In this manner, the electron source 10 with improved electron emission characteristics and reliability can be obtained. In the electron source 10 manufactured in accordance with the above-described manufacturing method, as in the conventional electron source 10' shown in FIG. 38, the dependency of the degree of vacuum in electron emission characteristics is small, a popping phenomenon does not occur during electron emission, and electrons can be constantly emitted.

In the method of manufacturing the above-described electron source 10, after the porous polycrystalline silicon layer 4 is oxidized to form the drift layer 6', thereby hydrogen plasma emission processing is carried out. However, the hydrogen plasma emission step may be carried out before the anodic oxidization processing. Alternatively, the hydrogen plasma emission step may be carried out after the anodic oxidization processing. In addition, in annealing processing in hydrogen gas as well, as in the above-described hydrogen radical emission, a defect existing in the drift layer 6' (for example, defect on the surface of the silicon oxide films 52 and 64 or silicon nanocrystal 63) can be made passive or can be reduced. The annealing temperature may be set to 700° C. or less, and it is preferable that the temperature be set to 600° C. or less. In addition, even if hydrogen gas is 100%, it may be a mixture gas with another gas.

In the method of manufacturing the above-described electron source 10, after the porous polycrystalline silicon layer 4 is oxidized to form the drift layer 6', the hydrogen plasma emission step is carried out. However, the hydrogen plasma emission step may be carried out before anodic oxidization processing. Alternatively, the hydrogen plasma emission step may be carried out after the anode oxidization processing.

In addition, in the method of manufacturing the above-described electron source 10, the hydrogen radical in the hydrogen plasma is emitted onto the top surface on one surface of the electrically conductive substrate in the hydrogen plasma emission step.

Figure 37:
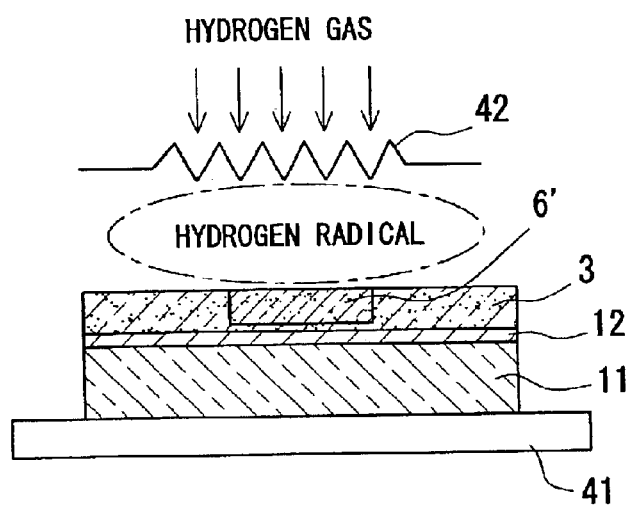
FIG. 37 is a view showing a processing technique in a hydrogen radical emission step in a method of manufacturing the electron source according to Embodiment 13 of the present invention.

However, as shown in FIG. 37, the hydrogen radical generated by utilizing catalytic decomposition reaction with a catalytic body 42 that consists of hydrogen gas and tungsten based wire may be emitted onto the top surface on one surface of the electrically conductive substrate (surface of the drift layer 6' in a example shown in FIG. 37). In this case, the catalytic body 42 is heated at a proper temperature by supplying a current from a current source (not shown). The electrically conductive substrate is installed on a substrate holder 41, and the substrate holder 41 is heated at 100° C. to 700° C. by a heater (not shown) as required. However, in the case where, as an electrically conductive substrate, there is employed a substrate on which the electrically conductive layer 12 is formed on one surface of the insulating substrate 11 that consists of a glass substrate, it is required to set a temperature of the substrate holder 41 so that the temperature of the insulating substrate 11 does not reach a heat resistance temperature of the insulating substrate 11.

In the meantime, in the hydrogen radical emission step, in the case where the hydrogen radical in hydrogen plasma is emitted onto the top surface on one surface of the electrically conductive substrate, the drift layer 6 may be damaged to the plasma as a result of the emission. However, in the hydrogen radical emission step, the hydrogen radical generated by decomposition utilizing the hydrogen gas catalytic body 42 is emitted onto the top surface on one surface side of the electrically conductive substrate, thereby making it possible to prevent the damage due to the hydrogen radical emission step from being generated on the drift layer 6. Therefore, the electron source 10 with its improved electron emission characteristics and reliability can be obtained as compared with the case of emitting the hydrogen radical in hydrogen plasma. In the hydrogen radical emission step, the hydrogen radical generated by thermal decomposition or optical decomposition of hydrogen gas may be emitted onto one surface side of the electrically conductive substrate. In this case as well, the electron source 10 with its improved electron emission characteristics and reliability can be obtained as compared with the case of emitting the hydrogen radical in hydrogen plasma.

In Embodiment 13, as an electrically conductive substrate, there is employed a substrate on which the electrically conductive layer 12 is formed on one surface of the insulating substrate 11 consisting of a glass substrate. However, a metal substrate made of chrome may be employed as an electrically conductive substrate. Alternatively, there may be employed a semiconductor substrate (such as n-type silicon substrate whose resistivity is comparatively close to that of a conductor or p-type silicon substrate on which n-type region is formed as an electrically conductive layer on one surface). A ceramic substrate or the like can be employed as an insulating substrate 11 as well as glass substrate.

In Embodiment 13, gold is employed as a material for the surface electrode 7. However, the material for the surface electrode 7 is not limited to gold, and aluminum, chrome, tungsten, or platinum and the like may be employed, for example. In addition, the surface electrode 7 may be composed of at least two-layered thin film layer deposited in the thickness direction. In the case where the surface electrode 7 is composed of a two-layered thin film layer, gold may be employed as an upper thin film layer, for example, and chrome, nickel, platinum, titanium, or indium and the like may be employed as a material for a lower thin film layer (thin film layer on the drift layer 6 side).

In Embodiment 13, the drift layer 6 is composed of the oxidized porous polycrystalline silicon layer. However, the drift layer 6 may be composed of the nitride porous polycrystalline silicon layer or oxi-nitride porous polycrystalline silicon layer. Alternatively, this layer may be composed of the other oxide, nitride or oxi-nitride porous semiconductor layer. In the case where the drift layer 6 is provided as a porous polycrystalline silicon layer, the nitriding step may be employed instead of the step of oxidizing the porous polycrystalline silicon layer 4. In this case, both of the silicon oxide films 52 and 64 are provided as silicon nitride films. In the case where the drift layer 6 is provided as the oxi-nitride porous polycrystalline silicon layer, the oxidizing-nitriding step may be employed instead of the step of oxidizing the porous polycrystalline silicon layer 4. In this case, both of the silicon oxide films 52 and 64 are provided as the silicon oxi-nitride films.

In the foregoing, although the present invention has been described in connection with its specific embodiments, it would be obvious to one skilled in the art that a number of modifications and alternations can occur. Therefore, the present invention is not limited to such embodiments, and should be limited by the accompanying claims.

INDUSTRIAL APPLICABILITY

As has been described above, a field emission-type electron source and a manufacturing method thereof according to the present invention are particularly effective to improve electron emission efficiency and reliability, and is suitably employed as an electron source such as planar light source, flat display element, or solid vacuum device.

What is claimed is:
1. A field emission-type electron source comprising:
an electrically conductive substrate;
a strong field drift layer formed on said electrically conductive substrate; and
a surface electrode formed on said strong field drift layer, in which
said strong field drift layer has a number of semiconductor nanocrystals of nano-meter order formed partly in a semiconductor layer configuring said strong field drift layer, and a number of insulating films, each of which is formed on a surface of each of said semiconductor nanocrystals and has a thickness smaller than a crystalline particle size of each of said semiconductor nanocrystals, wherein
a voltage can be applied between said surface electrode and said electrically conductive substrate so that said surface electrode becomes higher in potential, whereby electrons injected from said electrically conductive substrate into said strong field drift layer drift in said strong field drift layer, and are emitted through said surface electrode, and
each of said insulating films formed on each of the surface of each of said semiconductor nanocrystals has such a thickness that an electron tunneling phenomenon occurs.

2. The field emission-type electron source according to claim 1, wherein water content of said insulating film formed on the surface of each of said semiconductor nanocrystals is substantially zero.

3. The field emission-type electron source according to claim 1, wherein a compound layer or an alloy layer composed of a semiconductor and a metal is interposed at an interface between said semiconductor layer configuring said strong field drift layer and said electrically conductive substrate.

4. The field emission-type electron source according to claim 1, wherein said semiconductor layer is almost crystallized at the interface between said semiconductor layer configunng said strong field drift layer and said electrically conductive substrate.

5. A method of manufacturing a field emission-type electron source having:
an electrically conductive substrate;
a strong field drift layer formed on said electrically conductive substrate; and
a surface electrode formed on said strong field drift layer, in which
said strong field drift layer has a number of semiconductor nanocrystals of nano-meter order formed partly in a semiconductor layer configuring said strong field drift layer, and a number of insulating films, each of which is formed on a surface of each of said semiconductor nanocrystals and has such a thickness that an electron tunneling phenomenon occurs, wherein
a voltage can be applied between said surface electrode and said electrically conductive substrate so that said surface electrode becomes higher in potential, whereby electrons injected from said electrically conductive substrate into said strong field drift layer drift in said strong field drift layer and is emitted through said surface electrode, said method being characterized in that
each of said insulating films is formed on the surface of each of said semiconductor nanocrystals by any one of an electrochemical process, a rapid thermal oxidization process, a rapid thermal nitriding process, and a rapid thermal oxidization and nitriding process, or alternatively, a combination of those processes.

6. The method of manufacturing the field emission-type electron source according to claim 5, wherein annealing processing at a temperature of 700° C. or less is carried out in a vacuum, in an inert gas, in a foaming gas, or in a nitride gas after said insulating films have been formed on the surfaces of said semiconductor nanocrystals.

7. The method of manufacturing the field emission-type electron source according to claim 5, wherein a heat treatment by a rapid heating process at a temperature of 600° C. or more is carried out in an atmosphere containing an oxide species or a nitride species after said insulating firms have been formed on the surfaces of said semiconductor nanocrystals.

8. The method of manufacturing the field emission-type electron source according to claim 5, wherein annealing processing by a rapid heating process at a temperature of 600° C. or more is carried out in an inert gas atmosphere after said insulating films have been formed on the surfaces of said semiconductor nnanocrystal.

9. The method of manufacturing the field emission-type electron source according to claim 5, wherein annealing processing is carried out in a vacuum or in an inert gas after said semiconductor nanocrystals have been formed.

10. The method of manufacturing the field emission-type electron source according to claim 5, wherein annealing processing is carried out in a vacuum or in an inert gas after said semiconductor layer has been formed on said electrically conductive substrate.

11. The method of manufacturing the field emission-type electron source according to claim 5, wherein after said insulating films have been formed on the surfaces of said semiconductor nanocrystals, there are carried out one or more than once at least two processes of:

a first processing comprising carrying out at least one of annealing processing at a temperature of 700° C. or less and annealing processing by gas species capable of defect compensation in a vacuum, in an inert gas or in a foaming gas;

a second processing comprising carrying out a heat treatment by a rapid heating process at a temperature of 600° C. or more in an atmosphere containing an oxide species or a nitride species; and a third processing comprising carrying out annealing processing by a rapid heating process at a temperature of 600° C. or more in an inert gas atmosphere.

12. The method of manufacturing the field emission-type electron source according to claim 5, wherein annealing processing in hydrogen, hydrogen radical emission processing, or hydrogen radical emission annealing processing is carried out during at least one of a period after forming said semiconductor layer, a period after forming said semiconductor nanocrystals, and a period after forming said insulating films on the surfaces of said semiconductor nanocrystals.

13. The field emission-type electron source according to claim 1, wherein the thickness of each of said insulating films is in the range of 1 nm to 3 nm.

* * * * *

UNITED STATES PATENT AND TRADEMARK OFFICE
CERTIFICATE OF CORRECTION

PATENT NO. : 6,844,664 B2
DATED : January 18, 2005
INVENTOR(S) : T. Komoda et al.

It is certified that error appears in the above-identified patent and that said Letters Patent is hereby corrected as shown below:

Column 55,
Line 15, "nnanocrystal" should be -- nanocrystals --.

Signed and Sealed this

Twelfth Day of July, 2005

JON W. DUDAS
*Director of the United States Patent and Trademark Office*